(12) United States Patent
Perry et al.

(10) Patent No.: US 7,441,219 B2
(45) Date of Patent: *Oct. 21, 2008

(54) METHOD FOR CREATING, MODIFYING, AND SIMULATING ELECTRICAL CIRCUITS OVER THE INTERNET

(75) Inventors: Jeffrey Robert Perry, Cupertino, CA (US); Martin Garrison, San Jose, CA (US); Khang Nguyen, San Jose, CA (US); Richard Levin, Sunnyvale, CA (US); Wanda Carol Garrett, Morgan Hill, CA (US); Phillip Gibson, Sunnyvale, CA (US); Benjamin H. Lee, Saratoga, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/603,493

(22) Filed: Jun. 24, 2003

(65) Prior Publication Data

US 2004/0268283 A1 Dec. 30, 2004

(51) Int. Cl.
*G06F 17/50* (2006.01)
(52) U.S. Cl. .................... 716/11; 716/4; 703/16
(58) Field of Classification Search .................. 716/11; 709/202, 203; 340/7.29; 370/395.52; 379/88.17; 703/16

See application file for complete search history.

(56) References Cited

U.S. PATENT DOCUMENTS

| 4,675,832 | A | * | 6/1987 | Robinson et al. | 345/441 |
|---|---|---|---|---|---|
| 5,526,517 | A | * | 6/1996 | Jones et al. | 707/8 |
| 5,673,198 | A | * | 9/1997 | Lawman et al. | 716/11 |
| 5,883,807 | A | * | 3/1999 | Fanjoy | 716/8 |
| 6,070,195 | A | * | 5/2000 | Yamamoto | 709/247 |
| 6,115,034 | A | * | 9/2000 | Tanaka et al. | 715/700 |
| 6,230,305 | B1 | * | 5/2001 | Meares | 716/11 |
| 6,401,230 | B1 | * | 6/2002 | Ahanessians et al. | 716/1 |
| 6,449,762 | B1 | * | 9/2002 | McElvain | 716/18 |
| 6,502,229 | B2 | * | 12/2002 | Lee et al. | 716/12 |
| 6,530,065 | B1 | * | 3/2003 | McDonald et al. | 716/4 |
| 6,539,533 | B1 | * | 3/2003 | Brown et al. | 716/17 |
| 6,546,536 | B1 | * | 4/2003 | Nolan | 716/11 |
| 6,564,365 | B1 | * | 5/2003 | Argyres | 716/11 |
| 6,609,227 | B2 | * | 8/2003 | Bradley et al. | 716/1 |
| 6,615,400 | B1 | * | 9/2003 | Lukanc | 716/11 |
| 6,675,366 | B1 | * | 1/2004 | Nolan | 716/11 |

(Continued)

OTHER PUBLICATIONS

Markelov et al., "Aspects of using WML while Developing the Micro-PC Schematic 2003", Proceedings of the 7th International Conference on CAD Systems in Microelectronics, Feb. 18-22, 2003.*

(Continued)

*Primary Examiner*—Phallaka Kik
(74) *Attorney, Agent, or Firm*—Merchant & Gould

(57) ABSTRACT

The present invention enables a user to create, modify, simulate and save an electrical circuit using an Internet browser over an Internet connection. The user can change the connectivity of the circuit as well as add and/or remove components in a free form manner. The schematic is displayed within a web page on the user's machine with which the user may interact. Block symbols may be used to represent at least a portion of the schematic.

22 Claims, 64 Drawing Sheets

U.S. PATENT DOCUMENTS

| | | | | |
|---|---|---|---|---|
| 6,678,877 | B1* | 1/2004 | Perry et al. | 716/15 |
| 6,751,781 | B2* | 6/2004 | Lin et al. | 716/1 |
| 6,810,425 | B2* | 10/2004 | Yamamoto | 709/233 |
| 6,851,094 | B1* | 2/2005 | Robertson et al. | 716/1 |
| 6,904,571 | B1* | 6/2005 | Schmidt et al. | 716/2 |
| 6,907,583 | B2* | 6/2005 | Abt et al. | 716/1 |
| 6,931,369 | B1* | 8/2005 | Perry et al. | 703/18 |
| 6,948,145 | B2* | 9/2005 | Brown et al. | 716/12 |
| 6,957,413 | B1* | 10/2005 | McKeone et al. | 716/18 |
| 6,980,211 | B2* | 12/2005 | Lin et al. | 345/440 |
| 7,133,819 | B1* | 11/2006 | Hutton | 703/19 |
| 7,136,796 | B2* | 11/2006 | Jakatdar et al. | 703/13 |
| 7,168,041 | B1* | 1/2007 | Durrill et al. | 715/700 |
| 7,171,642 | B2* | 1/2007 | Weber | 716/11 |
| 2001/0001881 | A1* | 5/2001 | Mohan et al. | 716/1 |
| 2002/0078421 | A1* | 6/2002 | Bradley et al. | 716/1 |
| 2002/0083400 | A1* | 6/2002 | Chung et al. | 716/3 |
| 2002/0138817 | A1* | 9/2002 | Lee et al. | 716/12 |
| 2002/0144228 | A1* | 10/2002 | Uchida et al. | 716/15 |
| 2003/0079010 | A1* | 4/2003 | Osborn | 709/224 |
| 2003/0121019 | A1* | 6/2003 | Brown et al. | 716/12 |
| 2003/0140321 | A1* | 7/2003 | Lin et al. | 716/4 |
| 2003/0163295 | A1* | 8/2003 | Jakatdar et al. | 703/14 |
| 2004/0066922 | A1* | 4/2004 | Castro et al. | 379/115.01 |
| 2005/0278670 | A1* | 12/2005 | Brooks et al. | 716/5 |
| 2006/0195510 | A1* | 8/2006 | McNally | 709/203 |

OTHER PUBLICATIONS

Yen et al., "A Web-Based, Collaborative, Computer-Aided Sequential Control Design Tool", IEEE Control Systems Magazine, vol. 23, No. 2, Apr. 2003, pp. 14-19.*

Dalpasso et al., "Specification and Validation of Distributed IP-Based Designs with JavaCAD", Proceedings of Design, Automation and Test in Europe Conference and Exhibition, Mar. 9, 1999, pp. 684-688.*

Lee et al., "CADIC: Computer-Aided Design on Internet with Cryptosystem", 1998 IEEE International Conference on Systems, Man, and Cybernetics, vol. 3, Oct. 11, 1998, pp. 2670-2674.*

Rao et al., "Web-Based Network Analysis and Design", ACM Transactions on Modeling and Computer Simulation, vol. 10, No. 1, Jan. 2000, pp. 18-38.*

Benini et al., "Distributed EDA Tool Integration: the PPP Paradigm", 1996 IEEE International Conference on Computer Design: VLSI in Computers and Processors, Oct. 7, 1996, pp. 448-453.*

Chan et al., "WELD—an Environment for Web-based Electronic Design", Proceedings of 1998 Design Automation Conference, Jun. 15, 1998, pp. 146-151.*

Saha et al., "Web-based Distributed VLSI Design", 1998 Proceedings of the Eleventh International Conference on VLSI Design, Jan. 4, 1998, pp. 449-454.*

Wirthlin et al., "IP Delivery for FPGAs Using Applets and JHDL", 2002 Proceedings of 39th Design Automation Conference, Jun. 10, 2002, pp. 2-7.*

Marinova et al., "A Distributed System for Circuit Simulation", 2001 TELSIKS 5th International Conference on Telecommunications in Modern Satellite, Cable and Broadcasting Service, vol. 2, Sep. 19, 2001, pp. 467-470.*

Brglez et al., "A Universal Client for Distributed Networked Design and Computing", DAC, Jun. 18, 2001, pp. 401-406.*

Petrenko, "Teleworking in Computer-Aided Circuit Design", CADSM 2003, Feb. 18, 2003, pp. 25-29.*

Drofenik et al., "Interactive Power Electronics Seminar IiPES)-a Web-based Introductory Power Electronics Course Employing Java-Applets", 2002 IEEE 33rd Annual Power Electronics Specialists Conference, vol. 2, Jun. 23, 2002, pp. 443-448.*

Geppert, "IC Design on the World Wide Web", IEEE Spectrum, vol. 35, No. 6, Jun. 1998, pp. 45-50.*

Lin, "Computing Brokerage and Its Application in VLSI Design", Proceedings of the ASP-DAC '97, Asia and South Pacific Design Automation Conference, Jan. 28, 1997, pp. 65-69.*

* cited by examiner

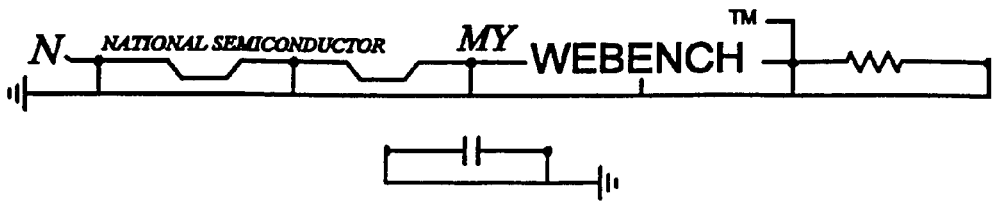

Welcome to your power Webench™!

"Tools for the power design engineer"

START HERE ~ 605
to design a power supply.

How to use Webench

Just four easy steps to design a power supply! Just click on the items below for help on that step.

┌─ 620
│ > 1 Choose a Part > choose a specific part or input your system specifications to find those devices that fit.
│ ┌─ 630
│ > 2 Create a Design > a design will be created for you including any necessary passive components and important calculated operating values.
(610
│ ┌─ 640
│ > 3 Analyze a Design > use WebSim™, the online power simulator, to validate your design electrically, and WebTHERM™, the online thermal simulator to visualize the thermal behavior of your design.
│ ┌─ 650
│ > 4 Build It! > buy a part, a kit of parts, or an evaluation board.
└─

See Our Disclaimer

Features

WebSIM™, is a browser-based simulator which allows you to probe points in the

My Designs

Your Last 4 Designs:
- Design #6
- Design #5
- Design #4      } ~ 660
- Design #3

670 ─┐
*MY* Designs Shows all of your Designs

My WebSIM™ Simulations ~ 680

My WebTHERM™ Simulations — 690

My BuildIt Order — 695

Other Power Webench Tools

Switchers Made Simple™ is downloadable software that enables you to develop a complete power supply design on your local PC. This covers Simple Switcher devices and includes discrete component and manufacturer selection.

- SMS 6.1 (for LM267x and LM259x buck regulators, and LM258x and LM2577 boost & flyback regulators) updated!
- SMS 3.3 (for LM257X)

Wireless Webench Tools

- Wireless Easy PLL Design Assistant

Figure 6

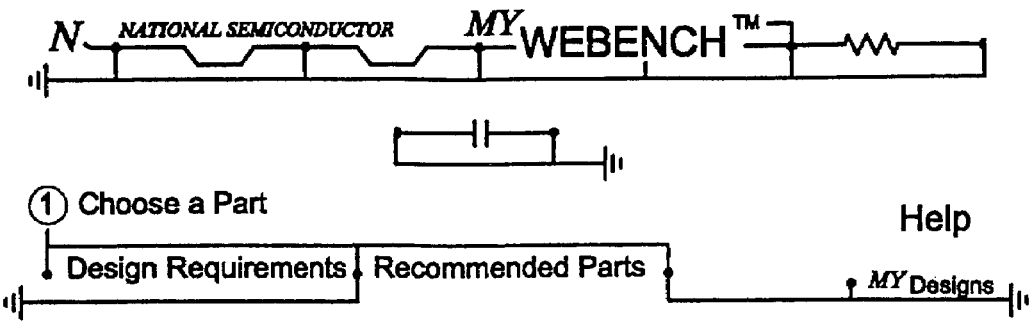

Your Design Specifications

| VinMin : 20.0 V<br>VinMax : 22.0 V | Output #1<br>Vout = 5.00 V<br>Iout = 5.00 A |
|---|---|

Suggested Switching Regulators - Buck Topology

| Product Folder | Webench Tools | Max Curr. | Typ. Eff. | On/Off | Err. Pin | Other Features | Freq. kHz | Est. Price |
|---|---|---|---|---|---|---|---|---|
| LM2678-5.0 | Create Design<br>WebTHERM™ Enabled Build It — 806<br>- Custom Kit — 808 | 5.0A | 84% | Y | Y | | 260 | $3.84 |
| LM2678-ADJ | Create Design<br>WebTHERM™ Enabled Build It — 800<br>- Custom Kit | 5.0A | 84% | Y | Y | Adj. Vout | 260 | $3.84 |
| LM2679-5.0 | Create Design<br>WebTHERM™ Enabled Build It — 806<br>- Custom Kit | 5.0A | 84% | Y | Y | SoftStart,<br>Adj. Peak<br>Current limit | 260 | $4.07 |
| 804 — LM2679-ADJ | Create Design<br>WebTHERM™ Enabled Build It — 806<br>- Custom Kit | 5.0A | 84% | Y | Y | SoftStart,<br>Adj. Peak<br>Current Limit,<br>Adj. Vout | 260 | $4.07 |

Suggested Switching Regulators - Flyback Topology

| Product Folder | Webench Tools | Max Curr. | Typ. Eff. | On/Off | Err. Pin | Other Features | Freq. kHz | Est. Price |
|---|---|---|---|---|---|---|---|---|
| LM2585-5.0 | Create Design | 3.0A | 93% | N | N | SoftStart | 100 | $3.42 |
| LM2585-ADJ | Create Design | 3.0A | 80% | N | N | SoftStart, Adj. Vout | 100 | $3.42 |
| LM2586-5.0 | Create Design | 3.0A | 80% | Y | N | Sync, SoftStart | 100 | $3.45 |
| LM2586-ADJ | Create Design | 3.0A | 80% | Y | N | Sync, SoftStart, Adj. Vout | 100 | $3.45 |
| LM2587-5.0 | Create Design | 5.0A | 80% | N | N | SoftStart | 100 | $4.51 |
| LM2587-ADJ | Create Design | 5.0A | 80% | N | N | SoftStart, Adj. Vout | 100 | $4.51 |
| LM2588-5.0 | Create Design | 5.0A | 80% | Y | N | Sync, SoftStart | 100 | $4.61 |
| LM2588-ADJ | Create Design | 5.0A | 80% | Y | N | Sync, SoftStart, Adj. Vout | 100 | $4.61 |
| LM2577-ADJ | Create Design | 3.0A | 80% | N | N | SoftStart, Adj. Vout | 52 | $3.15 |

Figure 8B

Design - Purchasing - Quality - Company - Jobs

📁 Products > Analog - Regulators > Simple Switchers > LM2679

Product Folder

905 ⟶ ( Live Simulation )

Buy LM2679-5.0 Evaluation Board

LM2679 SIMPLE SWITCHER 5A Step-Down Voltage Regulator with Adjustable Current Limit Generic P/N 2679

Contents

902 ⟶
- General Description
- Features
- Applications
- Datasheet
- Package Availability, Models, Samples & Pricing
- Design Tools

| Parametric Table | |
|---|---|
| Multiple Output Capability | No |
| On/Off Pin | Yes |
| Error Flag | Yes |
| Input Voltage, min (Volt) | 8, 15 |
| Input Voltage, max (Volt) | 40 |
| Output Current, max | 5 Amps |
| Output Voltage (Volt) | 5, 12, 3.30 |
| Adjustable Output Voltage | No, Yes |
| Switching Frequency (Hz) | 260000 |
| Adjustable Switching Frequency | No |
| Sync Pin | No |
| Efficiency (%) | 84, 92, 82 |
| Flyback | No |
| Step-up | No |
| Step-down | Yes |

| IC | National Semi-conductor | LM2679S-ADJ | ADJV,Buck | | Select Alternate part |
|---|---|---|---|---|---|
| L1 | Coiltronics | UP4B-150 | 15.000 uH, 0.0200 Ohms | | Select Alternate part |
| Rfb1 | Vishay-Dale | CRCW1206-1001FRT1 | 1000 Ohms | Y | Select Alternate part |
| Rfb2 | Vishay-Dale | CRCW1206-3161FRT1 | 3160 Ohms | Y | Select Alternate part |
| Rilim | Vishay-Dale | CRCW1206-4991FRT1 | 4990 Ohms | Y | Select Alternate part |

\* Components marked "Y" are not required for Thermal Simulation.

Quick Search   Parametric Search   See Our Disclaimer   Product Tree   Back to Webench

Figure 10B

N NATIONAL SEMICONDUCTOR   MY WEBENCH™

> 1 Choose a Part > ② Create a Design > 3 Analyze a Design > 4 Build It!

Components | Operating Values | Schematic | MY Designs

Help

Design: Design #7
Device: LM2679         Mar 17 2001 3:39PM     ID: 266796_7
Design Requirements    Output #1
VinMin = 20.00 V       Vout = 5.00 V
VinMax = 22.00 V       Iout = 5.00 A

Select Alternate for Component D1

Please select from the list of available alternates below. Click on the " Update BOM " buttom when you are done.   Update - BOM 1102
                                                                              1108

| Alternates | Part # Manufacturer | Thermally Modelled | Forward Voltage Drop | Max Rated Current | Max Voltage Rating | x,y,z in mm | Price | Quantity Available |
|---|---|---|---|---|---|---|---|---|
| Custom ○ | | N | Limit = 0.00 ☐V | 1110 Limit >= 5.00 | 1112 Limit >= 26.4 | | | |
| 1 ○ | 6CWQ03FN International Rectifier | | 0.45000V | 7.000A | 30.00V | 10.42 6.73 2.38 | $0.85 | >10 in stock |
| 2 ○ | 50WQ03FN International Rectifier | | 0.46000V | 5.500A | 30.00V | 10.42 6.73 2.38 | $1.83 | >10 in stock |
| 3 ○ | 12CWQ03-FNTRL International Rectifier | | 0.47000V | 12.00A | 30.00V | 10.42 6.73 2.38 | $0.82 | >10 in stock |
| 4 ○ | 50WQ04FN International Rectifier | | 0.51000V | 5.500A | 40.00V | 10.42 6.73 2.38 | $1.33 | >10 in stock |

Figure 11A

| 5 ⊙ | 12CWQ04FN International Rectifier |  | 0.52000V | 12.00A | 40.00V | 10.42 6.73 2.38 | $1.48 | >10 in stock |
| 6 ○ | 6CWQ04FN International Rectifier |  | 0.53000V | 7.000A | 40.00V | 10.42 6.73 2.38 | $1.00 | >10 in stock |
| 7 ○ | 50WQ06FN International Rectifier |  | 0.57000V | 5.500A | 60.00V | 10.42 6.73 2.38 | $1.07 | >10 in stock |
| 8 ○ | 12CWQ06FN International Rectifier |  | 0.61000V | 12.00A | 60.00V | 10.42 6.73 2.38 | $0.72 | >10 in stock |
| 9 ○ | 6CWQ06-FNTR International Rectifier |  | 0.61000V | 7.000A | 60.00V | 10.42 6.73 2.38 | $1.08 | >10 in stock |
Figure 11B

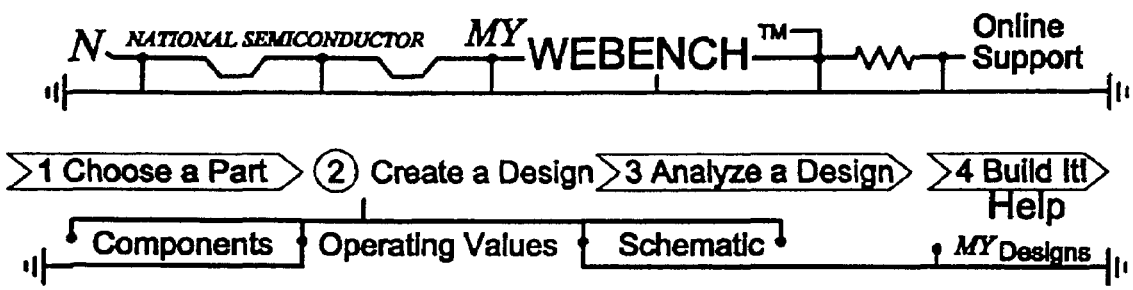

> 1 Choose a Part > ② Create a Design > 3 Analyze a Design > > 4 Build It >
Help
> Components | Operating Values | Schematic • | MY Designs Design: Design #7  
Device: LM2679  
Mar 17 2001  
3:39:00:000PM  
ID: 266796_7

Design Requirements  
Output #1  
VinMin = 20.00 V   Vout = 5.00 V  
VinMax = 22.00 V   Iout = 5.00 A Choose Operation Copy
Rename, Add Notes
Print, XML
Share this Design Vin: [22.00] V   Iout [5.00] A   [SUBMIT]

Operating Values

| # | Description | Parameter | Value |
|---|---|---|---|
| 1 | Pulse Width Modulation (PWM) Frequency | Frequency | 260 kHz |
| 2 | Continuous or Discontinuous Conduction Mode, Inductor current goes to zero in Discontinuous Conduction | Mode | Cont |
| 3 | Total Output Power | Pout | 25.0W |
| 4 | Vin operating point | Vin Op | 22.00V |
| 5 | Iout operating point | Iout Op | 5.00A |

Operating Point at Vin = 22.00 V, 5.00 A

| # | Description | Parameter | Value |
|---|---|---|---|
| 1 | Bode Plot Crossover Frequency, indication of bandwidth of supply | Cross Freq | 97.7 kHz |
| 2 | Steady State PWM Duty Cycle, range limits from 0 to 100 | Duty Cycle | 25.8% |
| 3 | Steady State Efficiency | Efficiency | 85.3% |
| 4 | IC Junction Temperature | IC Tj | 120 °C |
| 5 | IC Junction to Ambient Thermal Resistance | ICThetaJA | 34.9 °C/W |
| 6 | Bode Plot Phase Margin | Phase Marg | 71.0 Deg |
| 7 | Peak-to-peak ripple voltage | Vout p-p | 0.07 V |

Figure 12A

| Current Analysis | | | |
|---|---|---|---|
| # | Description | Parameter | Value |
| 1 | Input Capacitor RMS ripple current | Cin IRMS | 2.2 A |
| 2 | Output Capacitor RMS ripple current | Cout IRMS | 0.20 A |
| 3 | Peak Current in IC for Steady State Operating Point | IC Ipk | 5.5 A |
| 4 | ICs Maximum rated peak current | IC Ipk Max | 7.4 A |
| 5 | Average input current | Iin Avg | 2.3 A |
| 6 | Inductor ripple current, peak-to-peak Value | L Ipp | 1.1 A |

| Power Dissipation Analysis | | | |
|---|---|---|---|
| # | Description | Parameter | Value |
| 1 | Input Capacitor Power Dissipation | Cin Pd | 0.43 W |
| 2 | Output Capacitor Power Dissipation | Cout Pd | 0.0026 W |
| 3 | Diode Power Dissipation | Diode Pd | 1.9 W |
| 4 | IC Power Dissipation | IC Pd | 1.4 W |
| 5 | Inductor Power Dissipation | L Pd | 0.50 W |

Quick Search    Parametric Search    See Our Disclaimer    Product Tree    Back to Webench About Languages. Website Guide. About "Cookies". National Is QS 9000 Certified
Site Terms & Conditions of Use. Copyright 2001 © National Semiconductor Corporation
Privacy/Security Statement. MY: Preferences. Feedback

Figure 12B

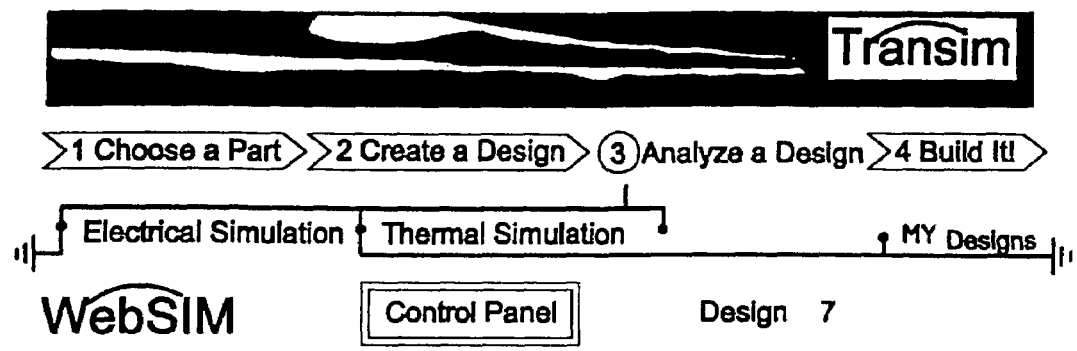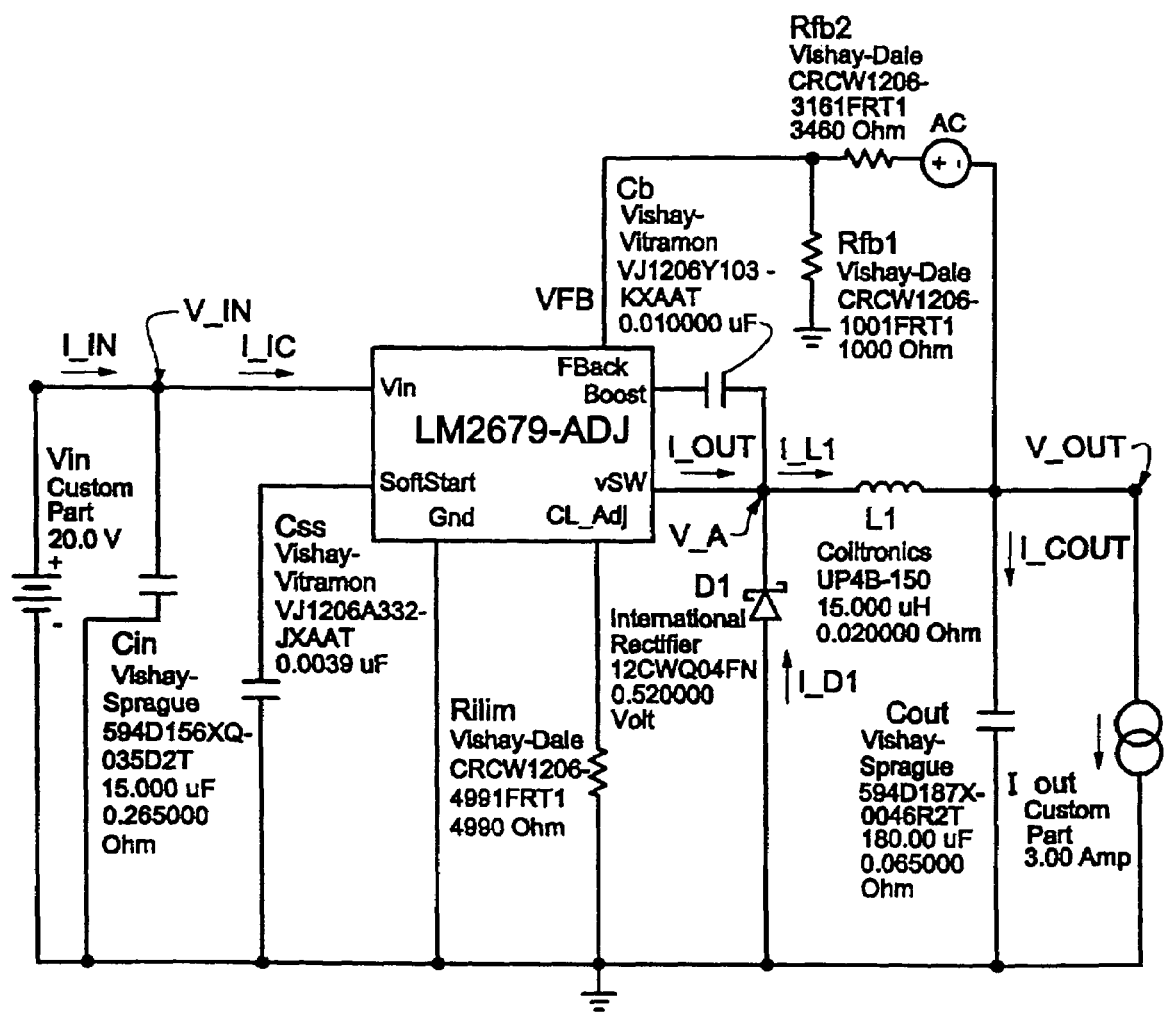
Figure 13

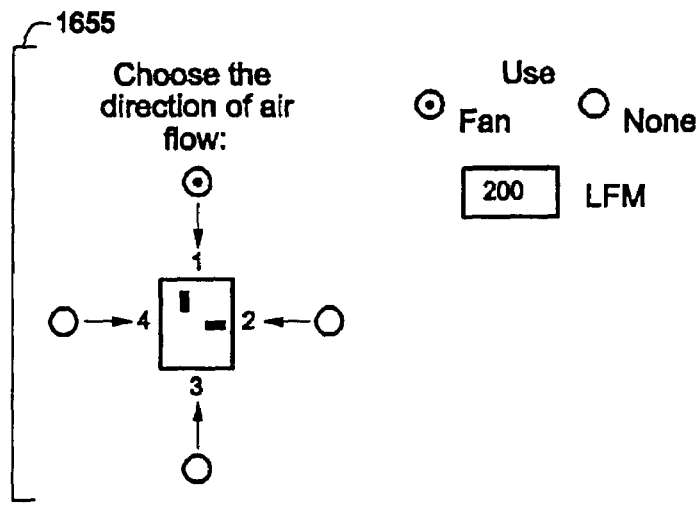

| BOM | | | |
|---|---|---|---|
| Component | Power Dissipation | Manufacturer | Part# |
| Cin | 0.43 W | Vishay-Sprague | 594D156X0035D2T |
| Cout | 0.0026 W | Vishay-Sprague | 594D187X0016R2T |
| D1 | 1.9 W | International Rectifier | 12CWQ04FN |
| IC | 1.4 W | National Semiconductor | LM2679 |
| L1 | 0.50 W | Coiltronics | UP4B-150 |

Design Assistant Messages

All components fit!

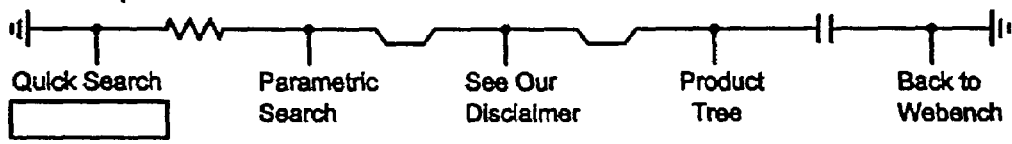

| Quick Search | Parametric Search | See Our Disclaimer | Product Tree | Back to Webench |

About Languages. Website Guide. About "Cookies". National is QS 9000 Certified
Site Terms & Conditions of Use. Copyright 2001 © National Semiconductor Corporation
Privacy/Security Statement. MY: Preferences. Feedback

Figure 16B

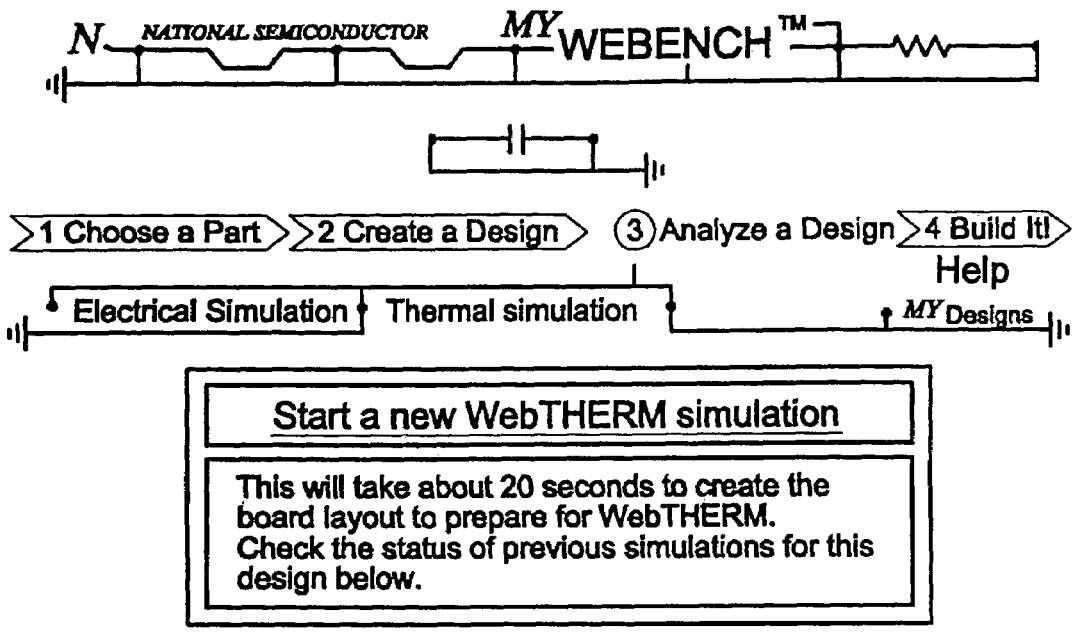

Start a new WebTHERM simulation

This will take about 20 seconds to create the board layout to prepare for WebTHERM.
Check the status of previous simulations for this design below.

WebTHERM™ Simulations :

| ID | Simulation Name (click to view) | Status | Date | Comments |
|---|---|---|---|---|
| 7 = Design ID | Simulations for Design ID : 7 | | | Design ID : 7 |
| 1 | Simulation for Design 7 | queued | Mar 17 2001 5 : 05 : 45 PM | |

/— 1710

Please click Refresh to get updated status of your simulations.

We will also send you email notification when your simulations are complete. It will contain a URL which can be clicked for viewing your simulations.

Queued time is dependent on the number of requests in the queue.
Processing time for each simulation is estimated about 2-3 minutes.

About Languages. Website Guide. About "Cookies". National is QS 9000 Certified
Site Terms & Conditions of Use. Copyright 2001 © National Semiconductor Corporation
Privacy/Security Statement. MY: Preferences. Feedback

Figure 17

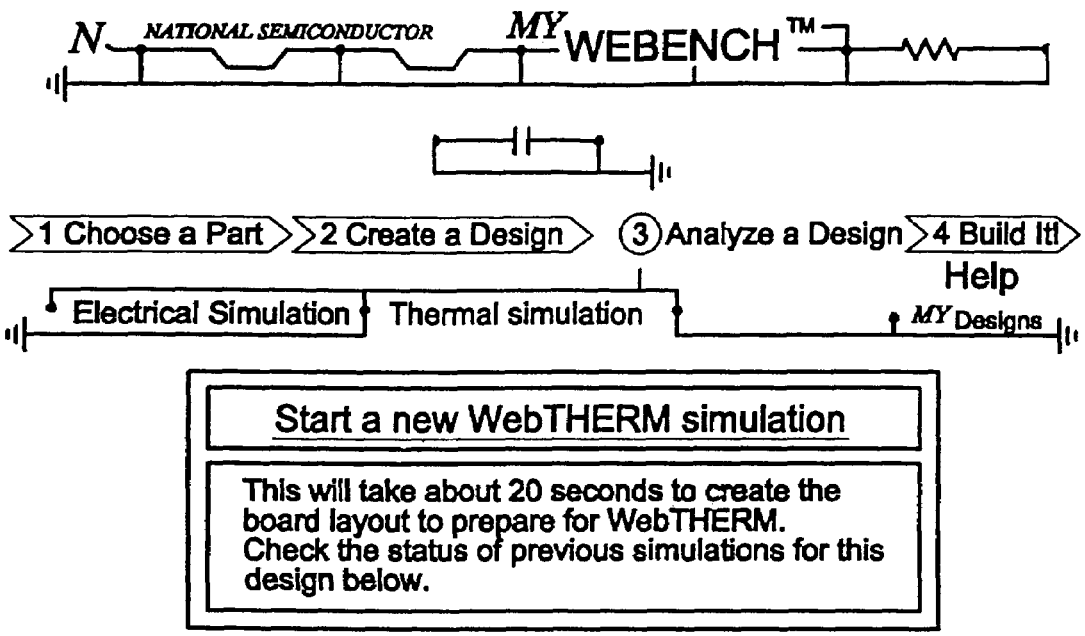

Start a new WebTHERM simulation

This will take about 20 seconds to create the board layout to prepare for WebTHERM.
Check the status of previous simulations for this design below.

WebTHERM™ Simulations :
Simulation

| ID | Name (click to view) | Status | Date | Comments |
|---|---|---|---|---|
| 7 = Design ID | Simulations for Design I D : 7 | | | Design ID : 7 |
| 1 | Simulation for Design 7 | Processing | Mar 17 2001 5 : 05 : 57 PM | |

⌐ 1710

Please click Refresh to get updated status of your simulations.

We will also send you email notification when your simulations are complete. It will contain a URL which can be clicked for viewing your simulations.

Queued time is dependent on the number of requests in the queue.

Processing time for each simulation is estimated about 2-3 minutes.

About Languages. Website Guide. About "Cookies". National is QS 9000 Certified
Site Terms & Conditions of Use. Copyright 2001 © National Semiconductor Corporation
Privacy/Security Statement. MY: Preferences. Feedback

Figure 18

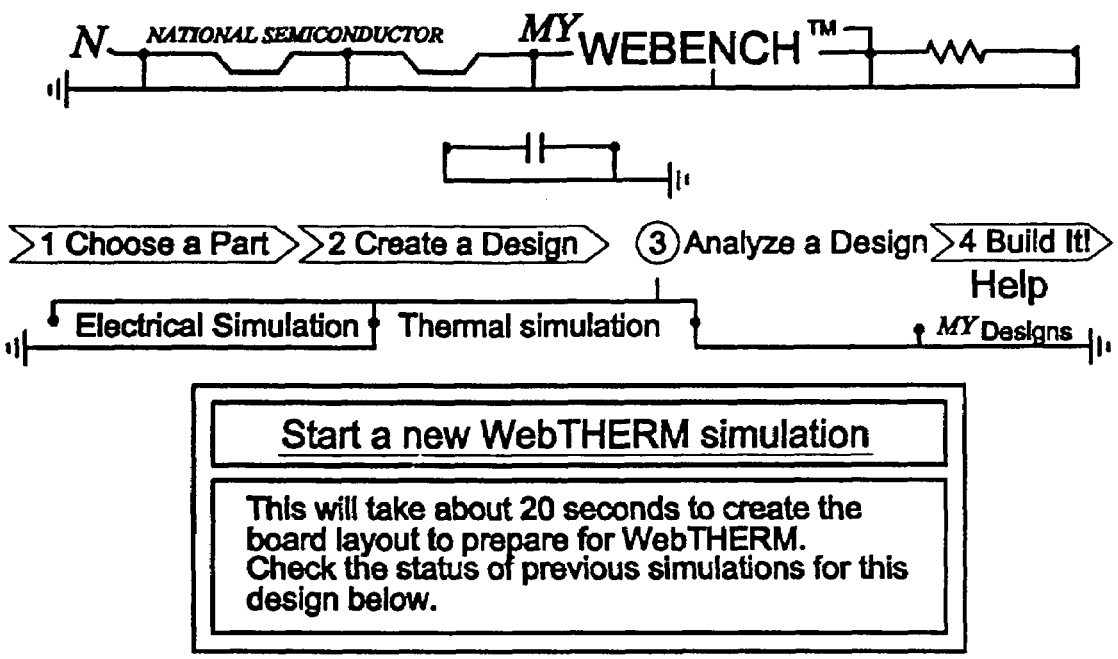

WebTHERM™ Simulations :
    Simulation

| ID | Name | Status | Date | Comments |
|----|------|--------|------|----------|
|    | (click to view) | | | |
| 7 = Design ID | | Simulations for Design D : 7 | | Design ID : 7 |
| 1 | Simulation for Design 7 | Completed | Mar 17 2001 5 : 10 : 22 PM | |

Please click Refresh to get updated status of your simulations.

We will also send you email notification when your simulations are complete, It will contain a URL which can be clicked for viewing your simulations.
Queued time is dependent on the number of requests in the queue.
Processing time for each simulation is estimated about 2-3 minutes.

About Languages. Website Guide. About "Cookies". National Is QS 9000 Certified
Site Terms & Conditions of Use. Copyright 2001 © National Semiconductor Corporation
Privacy/Security Statement. MY: Preferences. Feedback

| Operating Temperatures | | | | |
|---|---|---|---|---|
| Layer | Max Temp. | Manufacturer | Part # | Warnings |
| Cin | 82 °C | Vishay-Sprague | 594D156X0035D2T | |
| Cout | 92 °C | Vishay-Sprague | 594D187X0016R2T | |
| D1 - Diode | 188 °C | International Rectifier | 12CWQ04FN | |
| IC - Die | 174 °C | National Semiconductor | LM2679 | There is some potential problem with this design |
| IC - Top | 165 °C | | | |
| L1 - Inductor | 82 °C | Coiltronics | UP4B-150 | |
| PCB | 182 °C | | | |

Design Assistant Messages

All components fit!

| Quick Search | Parametric Search | See Our Disclaimer | Product Tree | Back to Webench |

About Languages. Website Guide. About "Cookies". National is QS 9000 Certified
Site Terms & Conditions of Use. Copyright 2001 © National Semiconductor Corporation
Privacy/Security Statement. MY: Preferences. Feedback

Figure 20B

| Operating Temperatures | | | | |
|---|---|---|---|---|
| Layer | Max Temp. | Manufacturer | Part # | Warnings |
| Cin | 50 °C | Vishay-Sprague | 594D156X0035D2T | |
| Cout | 50 °C | Vishay-Sprague | 594D187X0016R2T | |
| D1 - Diode | 128 °C | International Rectifier | 12CWQ04FN | |
| IC - Die | 112 °C | National Semiconductor | LM2679 | There is some potential problem with this design. |
| IC - Top | 97 °C | | | |
| L1 - Inductor | 46 °C | Coiltronics | UP4B-150 | |
| PCB | 123 °C | | | |

Design Assistant Messages

All components fit

Quick Search     Parametric Search     See Our Disclaimer     Product Tree     Back to Webench About Languages. Website Guide. About "Cookies". National Is QS 9000 Certified
Site Terms & Conditions of Use. Copyright 2001 © National Semiconductor Corporation
Privacy/Security Statement. MY: Preferences. Feedback

Figure 21B

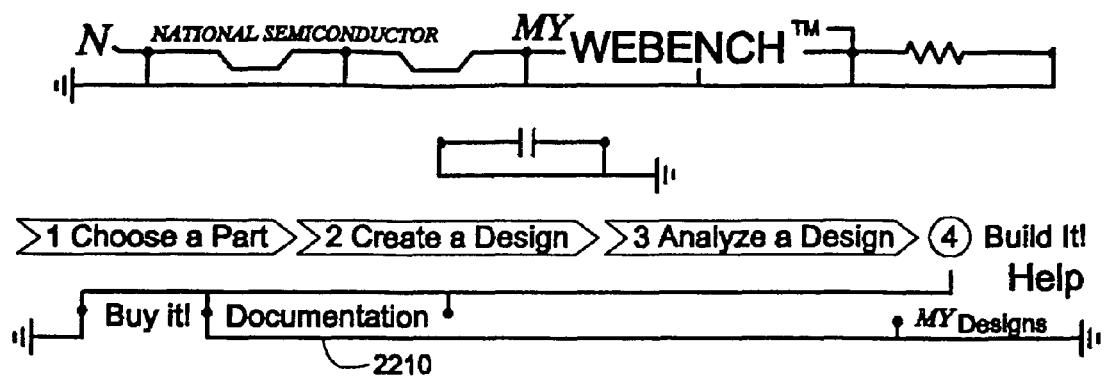

Design : 7

Your design is supported by a Webench Custom Evaluation Kit. Ordering this kit from Pioneer-Standard provides you with everything you need to realize a prototype of your design quickly and at a very low price.

If for some reason you decide not to order the Custom Evaluation Kit you can always order only the IC from us here.

Custom Evaluation Kit

Bill of Materials

| Item | Manufacturer Part | Qty | Attributes | Component Name(s) | Pioneer Price | Pioneer Availability |
|---|---|---|---|---|---|---|
| 1 | International Rectifier 12CWQ04FN | 1 | VFatio = 0.52 V | D1 | $1.48 | > 10 in Stock |
| 2 | Keystone 5015 | 4 | | TP1, TP2, TP3, TP6 | $0.20 | > 10 in Stock |
| 3 | National Semiconductor 551011367-011 | 1 | Surface Mount, etc | PC Board | $5.00 | > 10 in Stock |
| 4 | Vishay-Sprague 594D156X0035D2T | 3 | Cap=15uF ESR= 0.265 Ohms | Cin | $1.00 | > 10 in Stock |
| 5 | Vishay-Sprague 594D187X0016R2T | 1 | Cap=180uF ESR= 0.065 Ohms | Cout | $1.00 | > 10 in Stock |

Figure 22A

| 6 | Vishay-Dale CRCW1206-1001FRT1 | 1 | Resistance =1000 Ohms | Rfb1 | $0.03 | > 10 in Stock |
|---|---|---|---|---|---|---|
| 7 | Vishay-Dale CRCW1206-3161FRT1 | 1 | Resistance =3160 Ohms | Rfb2 | $0.03 | > 10 in Stock |
| 8 | Vishay-Dale CRCW1206-4991FRT1 | 1 | Resistance =4990 Ohms | Rilim | $0.03 | > 10 in Stock |
| 9 | National Semiconductor LM2679S-ADJ | 1 | Package=S, Voltage option=ADJ, Topology= Buck | IC | $4.75 | > 10 in Stock |
| 10 | Coiltronics UP4B-150 | 1 | L = 15uH DCR = 0.02 Ohms | L1 | $1.50 | > 10 in Stock |
| 11 | Vishay-Vitramon VJ1206A392JXAAT | 1 | Cap = 0.0039uF | Css | $0.05 | > 10 in Stock |
| 12 | Vishay-Vitramon VJ1206Y103KXAAT | 1 | Cap = 0.01uF | Cb | $0.05 | > 10 in Stock |
| 13 | Vishay-Vitramon VJ1206Y104KXAAT | 1 |  | Cinx | $0.05 | > 10 in Stock |
|  |  |  |  | Total | $17.77 |  |

Bill of Materials | View Assembly Doc | Order this Kit from Pioneer-Standard >>

Order the IC
- Order the LM2679S-ADJ in volume
- Order a Free Sample

Generic Eval Board for LM2679
- Buy Eval Board for LM2679
- Download Protel File (See Notes Below)

The Protel files are saved as Self Extracting Zip Archives. To download a product's Protel file, click on the corresponding "Protel file now" link, and save the link as a file on your computer. Then run the file on your computer (double click). This will automatically decompress the Protel file to your computer's disk.
Note: You must have Protel software or other software that can read Protel PCB layout files in order to take advantage of these Protel files.

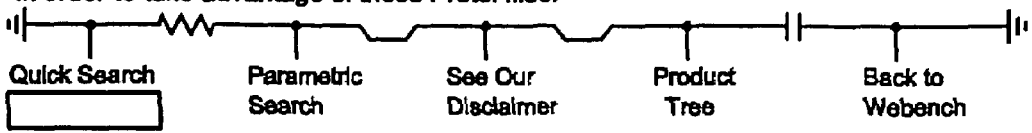

Quick Search | Parametric Search | See Our Disclaimer | Product Tree | Back to Webench About Languages. Website Guide. About "Cookies". National is QS 9000 Certified
Site Terms & Conditions of Use. Copyright 2001 © National Semiconductor Corporation
Privacy/Security Statement. MY: Preferences. Feedback

Figure 22B

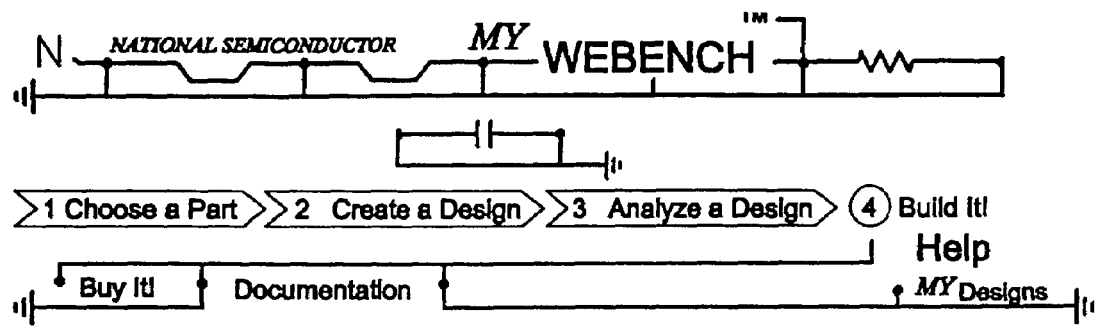
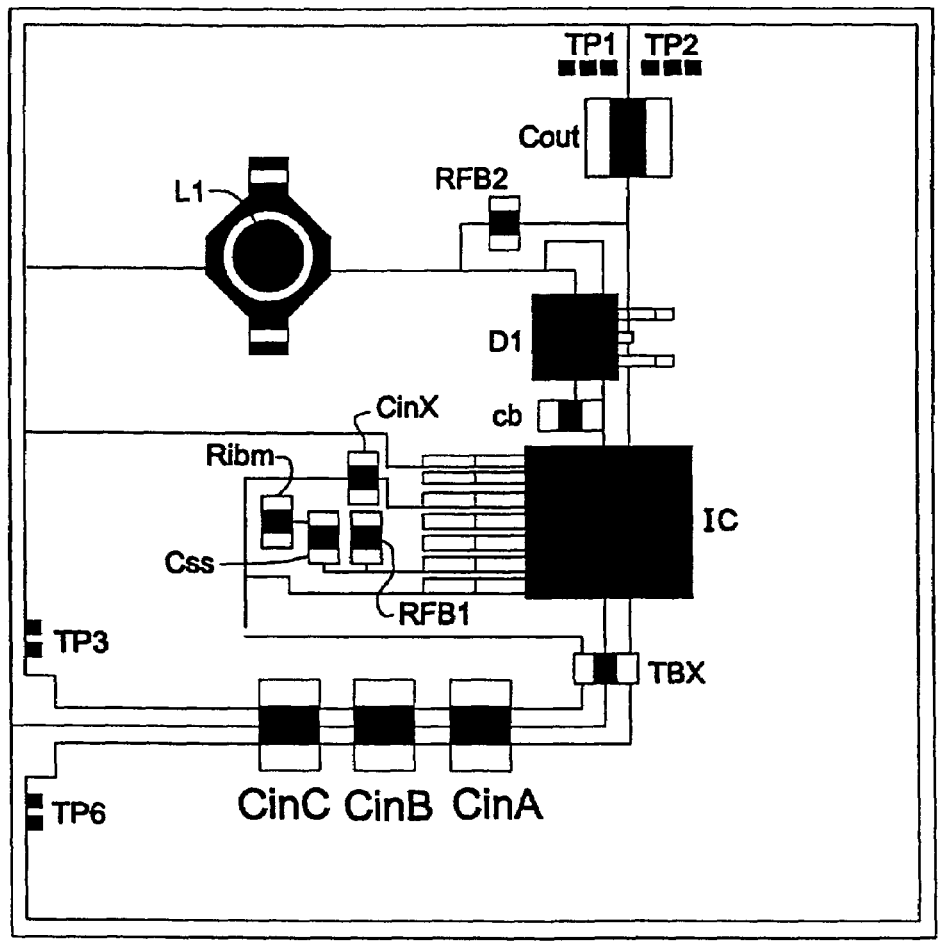
FIGURE 1 - Assembly Diagram
Download the Board Layout in Protel format.
GENERAL DESCRIPTION
Figure 23A The LM2679 SMD Evaluation Board is designed to provide a flexible PCB
platform for customers to develop and test custom power supply designs using
tools available on the POWER.NATIONAL.COM website. The LM2679BU1PWB
is a single sided surface mount layout using 1 oz copper. The overall board
dimensions are 2.475" x 2.700" All components are mounted on the topside
copper. WEBENCH™ has automatically placed the components on this board
to make sure that the input capacitor Cin (and Cinx ) and the diode D1 are as
close to the IC as is reasonable minimizing stray circuit inductance. L1 and
Cout should also be as close to the IC as reasonable but mostly to minimize
the overall dimensions of the required PCB area for the power supply.

The LM2679 SMD Evaluation Board consists of a single layer PCB layout
providing major landing areas on the PCB for the power conversion components:
Inductor, Diode, Input and Output Capacitors as well as parameter setting
small signal passive (resistors and capacitors) in 1206 packages and surface
mount test points. Some components are optional or specific to an application,
these are highlighted in the schematic. The PCB layout can be optimized
for a specific design and lends itself to be dimensionally scalable (i.e. your
particular design may have unused board area that can be "cut out" in the
final application. This topic is covered in the PCB Layout Optimization section.

Bill of Materials (BOM).

| Item | Manufacturer Part | Qty | Attributes | Component Name(s) |
|---|---|---|---|---|
| 1 | International Rectifier 12CWQ04FN  | 1 | VFatio = 0.52 V | D1 |
| 2 | Keystone 5015 | 4 | | TP1, TP2, TP3, TP6 |
| 3 | National Semiconductor 551011367-011 | 1 | Surface mount, etc | PC Board |
| 4 | Vishay-Sprague 594D156X0035D2T  | 3 | Cap=15uF ESR=0.265 Ohms | Cin |
| 5 | Vishay-Sprague 594D187X0016R2T  | 1 | Cap=180uF ESR=0.065 Ohms | Cout |

Figure 23B

| 6 | Vishay-Dale CRCW1206-1001FRT1 | 1 | Resistance = 1000 Ohms | Rfb1 |
|---|---|---|---|---|
| 7 | Vishay-Dale CRCW1206-3161FRT1 | 1 | Resistance = 3160 Ohms | Rfb2 |
| 8 | Vishay-Dale CRCW1206-4991FRT1 | 1 | Resistance = 4990 Ohms | Rilim |
| 9 | National Semiconductor LM2679S-ADJ | 1 | Package=S, Voltage option=ADJ Topology=Buck | IC |
| 10 | Coiltronics UP4B-150 | 1 | L = 15uH DCR = 0.02 Ohms | L1 |
| 11 | Vishay-Vitramon VJ1206A392JXAAT | 1 | Cap = 0.0039uF | Css |
| 12 | Vishay-Vitramon VJ1206Y103KXAAT | 1 | Cap = 0.01uF | Cb |
| 13 | Vishay-Vitramon VJ1206Y104KXAAT | 1 | | Cinx |

SCHEMATIC

The Schematic for the LM2679 is shown in FIGURE 2. U1, L1, D1, Cin and Cout are the basic power conversion components. Cinx as a high frequency bypass to the input to the LM2679. Rfb1, Rfb2, and Cf form the feedback network for the adjustable version of the LM2679. For Fixed output versions a zero Ohm resistor (jumper) should be used for Rfb2 (Rfb1 and Cf should be left off the board), this can be replaced by a copper trace as shown in the PCB Layout Optimization section. A space is reserved for a pull-down resistor, Ron, for the ON/OFF (Active low) pin, this may be desired if a Tri-State gate is driving this pin. Otherwise, if the ON/OFF pin is left floating, the LM2679 is normally ON.

Figure 23C

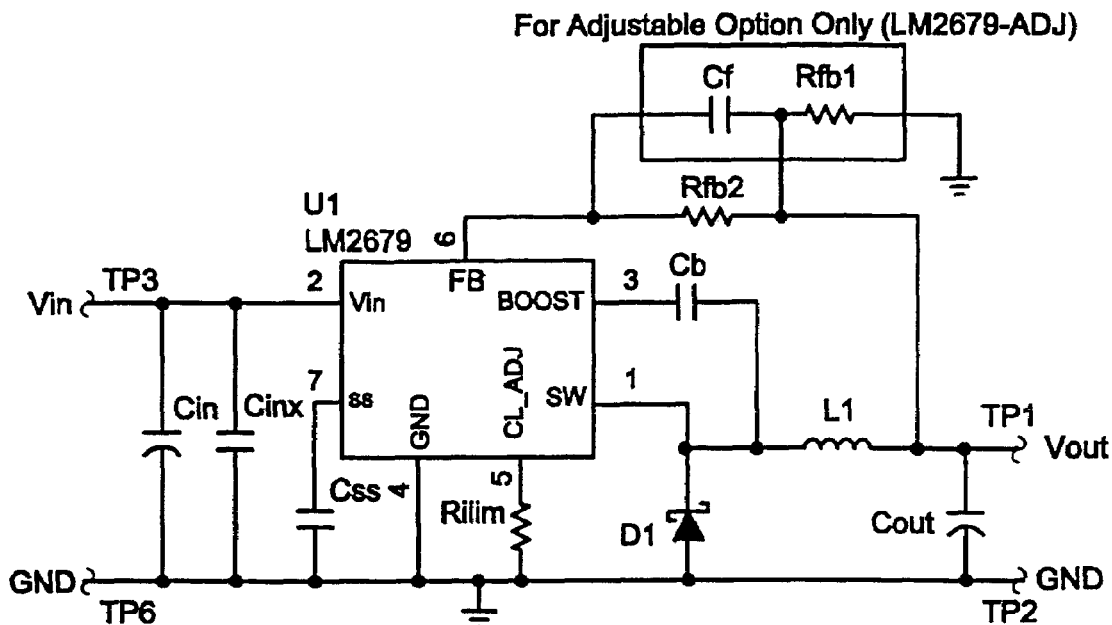

FIGURE 2. - SCHEMATIC

Download the Schematic file in Protel format.

Component Testing

Some published data on components in datasheets such as Capacitor ESR and Inductor DC resistance is based on conservative values that will quarantee that the components always exceed the specification. For design purposes it is usually better to work with typical values. Since this data is not always available it is a good practice to measure the Capacitance and ESR values of Cin and Cout, and the Inductance and DC resistance of L1 before assembly of the board. Any large discrepancies in values should be electrically simulated to check for instabilities and thermally simulated to make sure critical temperatures are not exceeded.

Soldering Components to the Board

If board assembly is done in house it is best to track down one terminal on the board then solder the other terminal. For the LM2679 the tab on the back of the TO-263 package should be pre-tinned with solder, then tacked into place by one of the pins. To solder the tab down to the board place the iron down on the board while resting against the tab, heating both surfaces simultaneously. Apply light pressure to the top of the plastic case until the solder flows around the part and the part is flush with the PCB. If the solder is not flowing around the board you may need a higher wattage iron (generally 25W to 30W is enough).

Testing

It is best to power up the board by setting the supply voltage to the lowest operating input voltage (Vin min) and set the supplies current limit to zero. With the supply off connect up the supply to Vin and GND. Connect a DVM to Vout and GND. Turn on the supply and slowly turn up the current limit. It the voltage starts to rise on the supply continue increasing the current while watching the output voltage. If the current increases on the supply but the voltage remains near zero there may be a short or a component misplaced on the board. Power down the board and visually inspect for solder bridges and recheck the diode and capacitor polarities. Once the supply is operational then more extensive testing may include full load testing, transient load and line tests to compare with simulation results.

Figure 23D

ARTWORK

FIGURE 3 shows the topside copper and FIGURE 4 shows the bottom side copper.

The intent of this board is to provide a flexible PCB layout to allow many different designs to be implemented using the same layout. In lower power designs you may find unused board space, that is not needed for electrical or thermal purposes. The overall layout lends itself to shrinking the design by trimming off the outer edges of the board.

Download the GERBER file for this PC Board.

NOTES: UNLESS OTHERWISE SPECIFICED
1. NO FAB SHOP LOGO < DATE CODE REQUIRED
2. APPLY GREEN (LPI) SOLDERMASK ON BOTH SIDES
3. NO SILKSCREEN
4. ADD UL RATING ON BOTTOM SIDE
5. MATERIAL : FP - 1, GREEN
6. BOARD THICKNESS : 0.063 WITH 1 oz COPPER
7. FINISH : TIN - LEAD

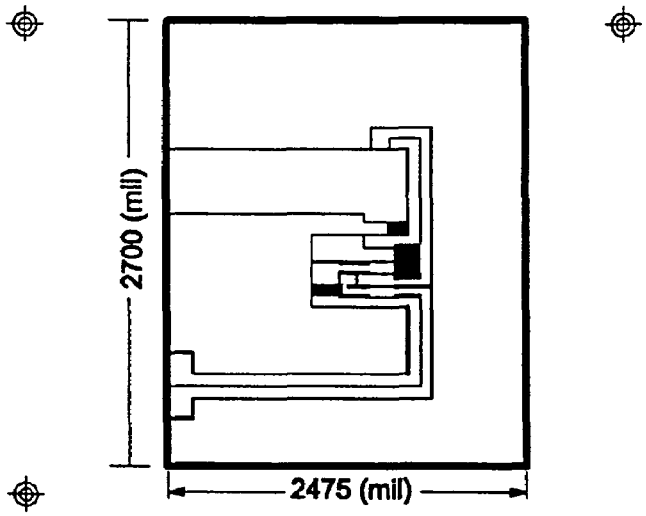

MECHANICAL LAYER 551011367-011A
TOP ETCH 551011367-011A

FIGURE 3 - Topside Cooper

NOTES: UNLESS OTHERWISE SPECIFICED
1. NO FAB SHOP LOGO < DATE CODE REQUIRED
2. APPLY GREEN (LPI) SOLDERMASK ON BOTH SIDES
3. NO SILKSCREEN
4. ADD UL RATING ON BOTTOM SIDE
5. MATERIAL : FP - 1, GREEN
6. BOARD THICKNESS: 0.063 WITH 1 oz COPPER
7. FINISH : TIN - LEAD

Figure 23E

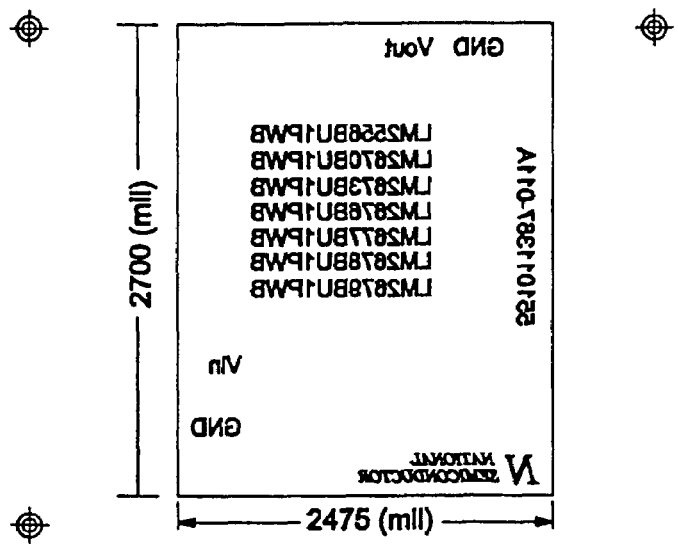

FIGURE 4 - Bottom Side Copper

Downloadable files

Schematic File
The Schematic File in Protel format.

Board Layout File
Board Layout in Protel format.

GERBER File
GERBER file for making the PC Board

| Quick Search | Parametric Search | See Our Disclaimer | Product Tree | Back to Webench |

About Languages. Website Guide. About "Cookies". National is QS 9000 Certified
Site Terms & Conditions of Use. Copyright 2001 © National Semiconductor Corporation
Privacy/Security Statement. MY: Preferences. Feedback

Figure 23F

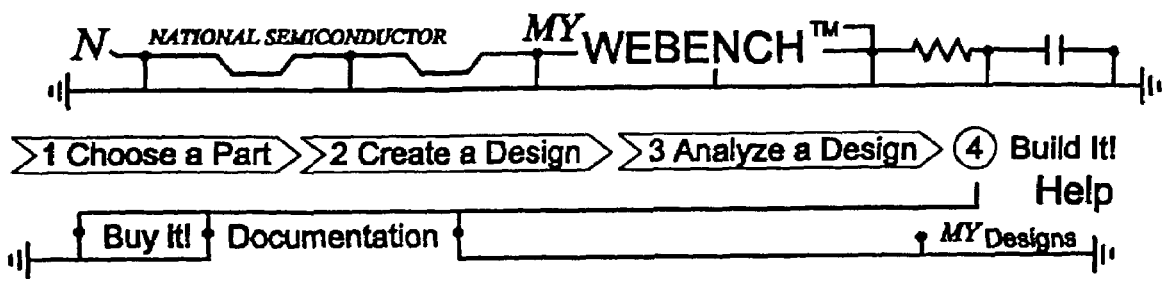

Design : 6

WEBENCH Documentation

Assembly Doc.
The Webench Assembly Document describes in detail how to build your design. It contains the specific assembly diagram for your design, a complete bill of materials and other PC board images and assembly instructions.

Design Doc. ⁀2440
The WEBENCH Design Document provides a single web page describing your entire design including: design specifications, calculated values, WebSIM simulation results and WebTHERM simulation results.

LM2679 Folder ⁀2420
LM2679 Product Folder is full of documentation about the National IC used in your design.

My Orders
My Orders is a list of all of your on - line orders.

WEBENCH Downloads
You can download these files to integrate this design into your local CAD environment. These files are self-extracting zip files. For the files stored in Protel format you will need the Protel application or equivalent CAD software capable of opening such files.

Schematic File
The Schematic File in Protel format.

Board Layout File
Board Layout in Protel format.

GERBER File
GERBER file for making the PC Board.

About Languages. Website Guide. About "Cookies". National is QS 9000 Certified
Site Terms & Conditions of Use. Copyright 2001 © National Semiconductor Corporation
Privacy/Security Statement. MY: Preferences. Feedback

Figure 24

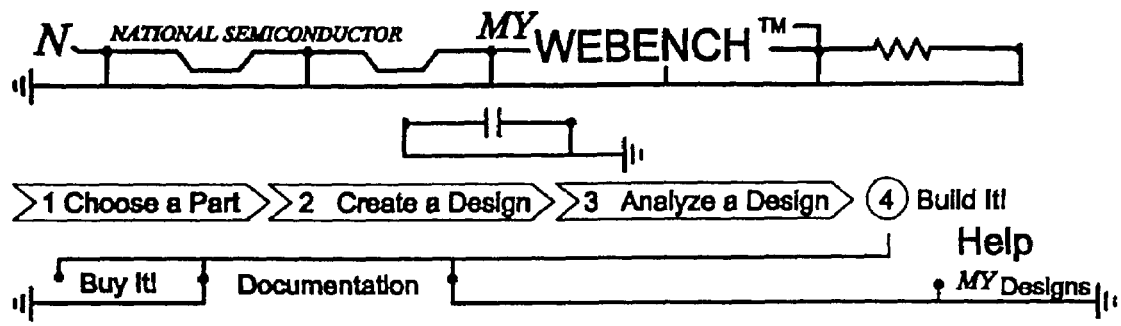

Design Document For Your LM2679 Design # : 7

Table of Contents:
1. Introduction
2. Design Specifications
3. Schematic
4. Operating Values
5. The Selected IC
6. BOM - Bill of Materials
7. WebTHERM Results
8. Build It!
9. Appendices Introduction Custom power supply designs using tools are available on the POWER. NATIONAL.COM website.

Design Specifications

Design: Design #7
Device: LM2679        Mar 17 2001  3 : 39PM        ID: 266796_7

Design Requirements        Output #1
VinMin = 20.00 V           Vout = 5.00 V
VinMax = 22.00 V           Iout = 5.00 A Schematic
Use WebSIM to display your schematic.

Operating Values

Figure 25A

| Operating Values | | | |
|---|---|---|---|
| # | Description | Parameter | Value |
| 1 | Pulse Width Modulation (PWM) Frequency | Frequency | 260 kHz |
| 2 | Continuous or Discontinuous Conduction Mode, Inductor current goes to zero in Discontinuous Conduction | Mode | Cont |
| 3 | Total Output Power | Pout | 25.0 W |

| Operating Point at Vin = 22.00 V | | | |
|---|---|---|---|
| # | Description | Parameter | Value |
| 1 | Bode Plot Crossover Frequency, Indication of bandwidth of supply | Cross Freq | 97.7 kHz |
| 2 | Steady State PWM Duty Cycle, range limits from 0 to 100 | Duty Cycle | 25.8 % |
| 3 | Steady State Efficiency | Efficiency | 85.3 % |
| 4 | IC Junction Temperature | IC Tj | 120 °C |
| 5 | IC Junction to Ambient Thermal Resistance | ICThetaJA | 34.9 °C/W |
| 6 | Bode Plot Phase Margin | Phase Marg | 71.0 Deg |
| 7 | Peak-to-peak ripple voltage | Vout p-p | 0.07 V |

| Current Analysis | | | |
|---|---|---|---|
| # | Description | Parameter | Value |
| 1 | Input Capacitor RMS ripple current | Cin IRMS | 2.2 A |
| 2 | Output Capacitor RMS ripple current | Cout IRMS | 0.20 A |
| 3 | Peak Current in IC for Steady State Operating Point | IC Ipk | 5.5 A |
| 4 | ICs Maximum rated peak current | IC Ipk Max | 7.4 A |
| 5 | Average input current | I in Avg | 2.3 A |
| 6 | Inductor ripple current, peak-to-peak Value | L Ipp | 1.1 A |

Figure 25B

Power Dissipation Analysis

| # | Description | Parameter | Value |
|---|---|---|---|
| 1 | Input Capacitor Power Dissipation | Cin Pd | 0.43 W |
| 2 | Output Capacitor Power Dissipation | Cout Pd | 0.0026 W |
| 3 | Diode Power Dissipation | Diode Pd | 1.9 W |
| 4 | IC Power Dissipation | IC Pd | 1.4 W |
| 5 | Inductor Power Dissipation | L Pd | 0.50 W |

LM2679 The Selected IC
NSID = LM2679S-ADJ
Topology = Buck
Package = S

BOM - Bill of Materials

| Item | Manufacturer Part | Qty | Attributes | Component Name(s) |
|---|---|---|---|---|
| 1 | International Rectifier 12CWQ04FN  | 1 | VFatio = 0.52 V | D1 |
| 2 | Keystone 5015 | 4 | | TP1, TP2, TP3, TP6 |
| 3 | National Semiconductor 551011367-011 | 1 | Surface Mount, etc | PC Board |
| 4 | Vishay-Sprague 594D156X0035D2T  | 3 | Cap=15uF ESR= 0.265 Ohms | Cin |
| 5 | Vishay-Sprague 594D187X0016R2T  | 1 | Cap=180uF ESR= 0.065 Ohms | Cout |
| 6 | Vishay-Dale CRCW1206-1001FRT1  | 1 | Resistance =1000 Ohms | Rfb1 |
| 7 | Vishay-Dale CRCW1206-3161FRT1  | 1 | Resistance =3160 Ohms | Rfb2 |

Figure 25C

| 8 | Vishay-Dale CRCW1206-4991FRT1 | 1 | Resistance = 4990 Ohm | Rilim |
|---|---|---|---|---|
| 9 | National Semiconductor LM2679S-ADJ | 1 | Package=S, Voltage option = ADJ Topology = Buck | IC |
| 10 | Coiltronics UP4B-150 | 1 | L = 15uH DCR = 0.02 Ohm | L1 |
| 11 | Vishay-Vitramon VJ1206A392JXAAT | 1 | Cap = 0.0039 uF | Css |
| 12 | Vishay-Vitramon VJ1206Y103KXAAT | 1 | Cap = 0.01 uF | Cb |
| 13 | Vishay-Vitramon VJ1206Y104KXAAT | 1 | | Cinx |

WebTHERM - Thermal Simulation Results

You have performed 3 WebTHERM thermal simulation(s) on this design. Here are the results of the most recent one.

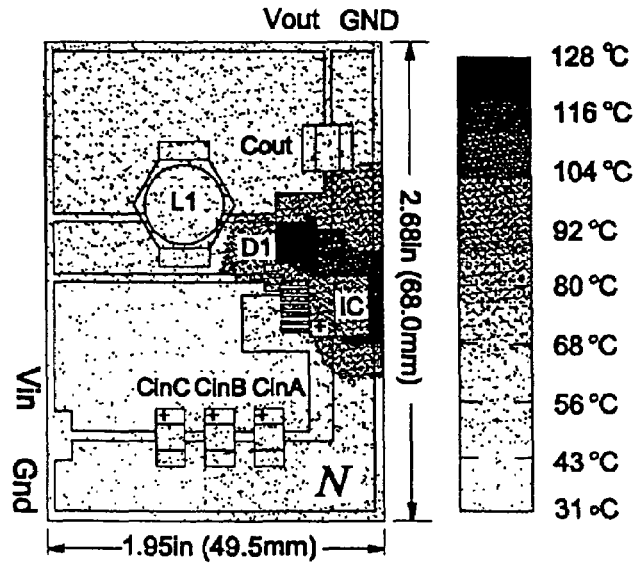

Figure 25D

Be sure to electrically simulate this design using webSIM.

Build It!

Webench provides both custom and generic evaluation boards to assist you in the building of prototypes of your design. Additionally, for some designs, it is possible to order the complete BOM (Bill of Materials) on-line using Webench.

A custom evaluation board is available for your design!

Webench provides a custom evaluation board which may be on-line ordered from Pioneer-Standard for designs like yours using National LM2679S-ADJ configured in the Buck topology.

Appendices

A. You have performed 3 thermal simulation(s) on this design.

| ID | Simulation Name | Date |
|----|----|----|
| 1 | Simulation for Design 7 | Mar 17 2001  5 : 10 PM |
| 2 | Simulation for Design 7 | Mar 17 2001  5 : 19 PM |
| 3 | Simulation for Design 7 | Mar 17 2001  5 : 23 PM |

B. No electrical simulation(s) performed on this design.

| Quick Search | Parametric Search | See Our Disclaimer | Product Tree | Back to Webench |

About Languages. Website Guide. About "Cookies". National is QS 9000 Certified
Site Terms & Conditions of Use. Copyright 2001 © National Semiconductor Corporation
Privacy/Security Statement. MY: Preferences. Feedback

Figure 25E

[Webench™ Designs] [WebTHERM™ Simulations] [WebSIM™ Simulations] [BuildIt Orders]

Tim Sullivan - You have 7 designs stored in your personal workspace

| ID | Design Name | Device | Creation Date | Modification Date | Design Assistant | Comments | Design Operations |
|---|---|---|---|---|---|---|---|
| 7 | Design # 7 | LM2679 | Mar 17 2001 3:39PM | Mar 17 2001 3:57PM | Power | | Modify, Analyze, Build, Add Notes, Delete, Share |
| 6 | Design # 6 | LM2679 | Mar 15 2001 3:23PM | Mar 15 2001 3:23PM | Power | | Modify, Analyze, Build, Add Notes, Delete, Share |
| 5 | Design # 5 | LM2679 | Mar 15 2001 11:41AM | Mar 15 2001 11:44AM | Power | | Modify, Analyze, Build, Add Notes, Delete, Share |
| 4 | Design # 4 | LM2679 | Mar 13 2001 9:52AM | Mar 13 2001 10:03AM | Power | | Modify, Analyze, Build, Add Notes, Delete, Share |
| 3 | Design # 3 | LM2679 | Mar 13 2001 9:52AM | | Power | | Modify, Analyze, Build, Add Notes, Delete, Share |
| 2 | Design # 2 | LM2678 | Mar 13 2001 9:50AM | | Power | | Modify, Analyze, Build, Add Notes, Delete, Share |
| 1 | Design # 1 | LM2678 | Mar 13 2001 9:50AM | | Power | | Modify, Analyze, Build, Add Notes, Delete, Share |

Quick Search    Parametric Search    See Our Disclaimer    Product Tree    Back to Webench About Languages. Website Guide. About "Cookies". National is QS 9000 Certified
Site Terms & Conditions of Use. Copyright 2001 © National Semiconductor Corporation
Privacy/Security Statement. MY: Preferences. Feedback

METHOD FOR CREATING, MODIFYING, AND SIMULATING ELECTRICAL CIRCUITS OVER THE INTERNET

FIELD OF THE INVENTION

The present invention relates to electrical circuit simulations, and more particularly to the modifying a schematic over a network.

BACKGROUND OF THE INVENTION

Many times when a user requires a circuit, the user frequently knows little more than the requirements that the circuit must satisfy. To obtain the desired circuit, the user may provide a list of the requirements to a business that is knowledgeable about those types of circuits, how to design them, and where to obtain the components to fabricate them. The business may then construct and supply the user with the circuit. The business may have a significant price mark up for these services.

To avoid having to pay the marked up prices, the user may attempt to become educated on circuit design, obtain parts catalogs from circuit component suppliers, and fabricate the circuit. However, the effort and cost required to gain the requisite education and knowledge may not be worthwhile. To reduce the effort required to perform some of these tasks, the user may obtain and install specialized off line tools, such as the Switchers Made Simple software product available from National Semiconductor Corporation. While such tools may assist in the circuit design and component selection tasks, the user must still go through the manual process of placing orders for the components. Further, given the rapidity with which circuit component manufacturers change their product lines, the component information used by the specialized off line software will quickly become outdated unless frequently updated. The inconvenience of having to obtain, install, and keep such specialized software updated does not make this the solution ideal.

Electrical simulators typically allow a user to conduct an electrical simulation of a pre-existing electrical schematic (or circuit). The user can observe the performance of the circuit under simulated operating conditions. The user can change simulation related parameters but must use a pre-defined reference circuit. Furthermore, the user cannot freely change the connectivity of the circuit or add or remove components in a free form manner.

BRIEF DESCRIPTION OF THE DRAWINGS

FIG. 6 illustrates an exemplary web page for starting the design process;

FIGS. 8A and 8b are examples of a suggested component web page generated in response to the requirements specified according to FIG. 7;

FIG. 9 shows an exemplary web page illustrating a product folder web page;

FIGS. 10A and 10B illustrate an exemplary bill of materials web page;

FIGS. 11A and 11B illustrates an exemplary web page showing choices of alternate components for a component;

FIGS. 12A and 12B show exemplary web pages illustrating operating values of a circuit;

FIG. 13 shows an exemplary schematic diagram;

FIGS. 16A and 16B show an exemplary web screen illustrating setup of thermal simulation of the circuit designed according to the user's requirements;

FIGS. 17-19 illustrate exemplary simulation status screens;

FIGS. 20A and 20B show an exemplary result of a thermal simulation;

FIGS. 21A and 21B show an exemplary web page illustrating the results of a simulation with the changed parameters;

FIGS. 22A and 22B show an exemplary BUILD IT web page;

FIGS. 23A-23F illustrate an exemplary assembly diagram;

FIG. 24 illustrates an exemplary documentation page;

FIGS. 25A-25E illustrate an exemplary design document;

FIG. 26 shows an exemplary MYdesigns page;

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

The present invention is directed at enabling a user to create, modify, simulate and save an electrical circuit using an Internet browser over an Internet connection. The user can change the type of simulation run, the values of components and also the simulation related parameters. The user can also freely change the connectivity of the circuit as well as add and/or remove components in a free form manner.

Figure 41:
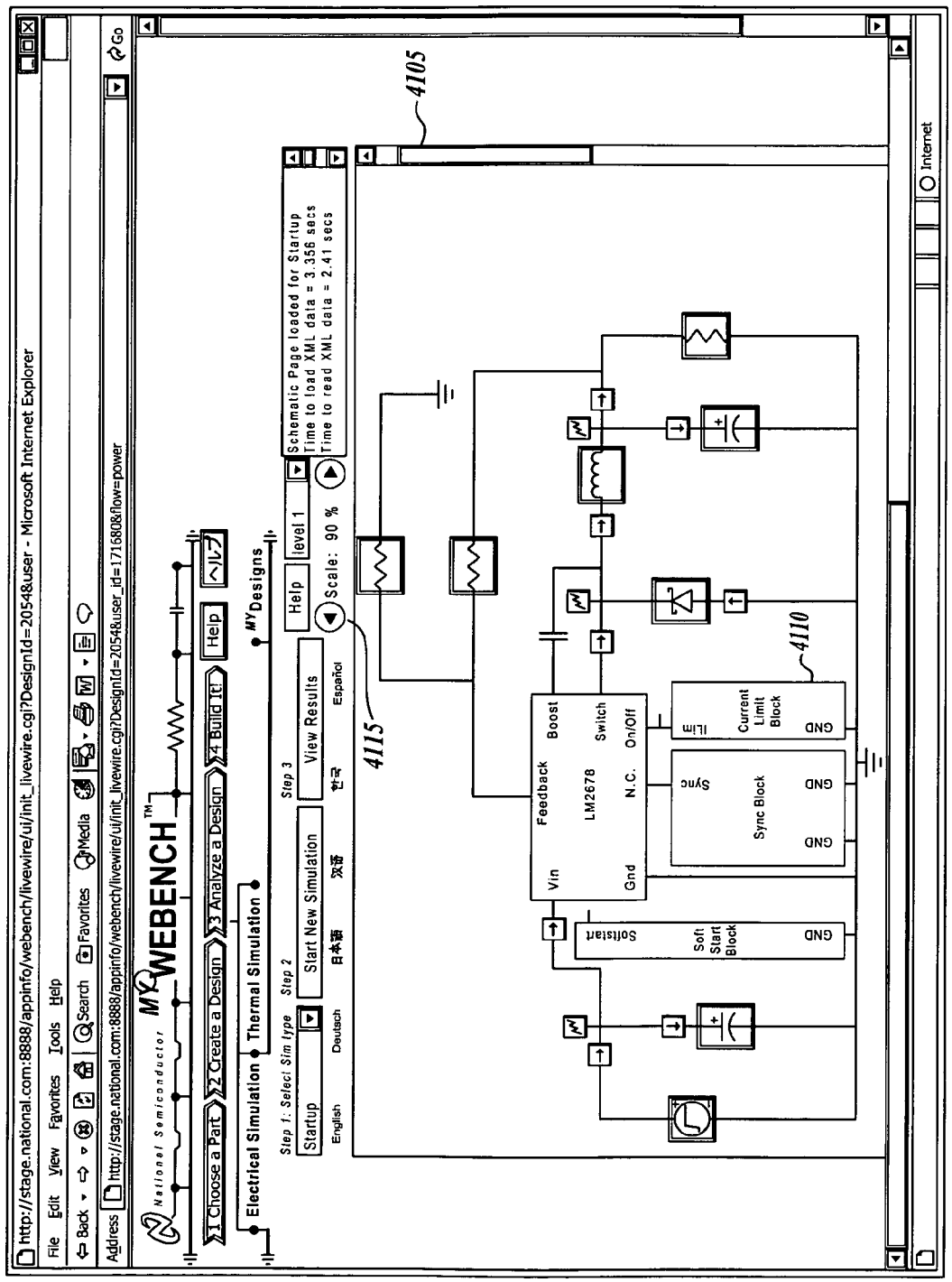
FIG. 41 illustrates exemplary web based interface showing a schematic.

FIG. 41 illustrates exemplary web based interface showing a schematic, in accordance with aspects of the invention. As illustrated in the figure, web based interface 4100 utilizes a conventional internet browser and internet connection to access an electrical schematic, in accordance with aspects of the invention.

A user can create and/or modify an electrical schematic or circuit, such as the schematic illustrated within window 4105, by placing and moving wires and components within window 4105. The wires and components are selected by a user in order to place or move them.

According to one embodiment of the invention, the electrical schematic is drawn using vector based drawing techniques within browser window 4100. As illustrated in the figure, the electrical schematic shows wires, components, and feature blocks attached to a voltage regulator device, in accordance with aspects of the invention. The components within the schematic may be moved and changed according to a user's requirements. Feature blocks are used to represent elements or collections of components in an electrical schematic or sub circuit. For example, feature block 4110 represents a current limit block. The use of feature blocks allows the user to hide the specific elements and components of the block from view.

According to one embodiment, the components that are in a modifiable state are colored, and non-modifiable components are presented in a black and white format. Any formatting may be used to indicate whether a component may be modified. For example, the component may indicate that it is modifiable by a predetermined graphic.

Scale adjustment 4115 is provided allowing the user to zoom in order to show more or less detail. Clicking the arrows on scale adjustment 4115 allows the user to incrementally change the scale of the schematic illustrated in window 4105.

Scroll bars are also provided to allow the user to scroll or pan across the schematic to view areas which are not currently shown in the viewing area.

At any point in the process, the user can conduct an electrical simulation of the schematic they created or modified.

Figure 42:
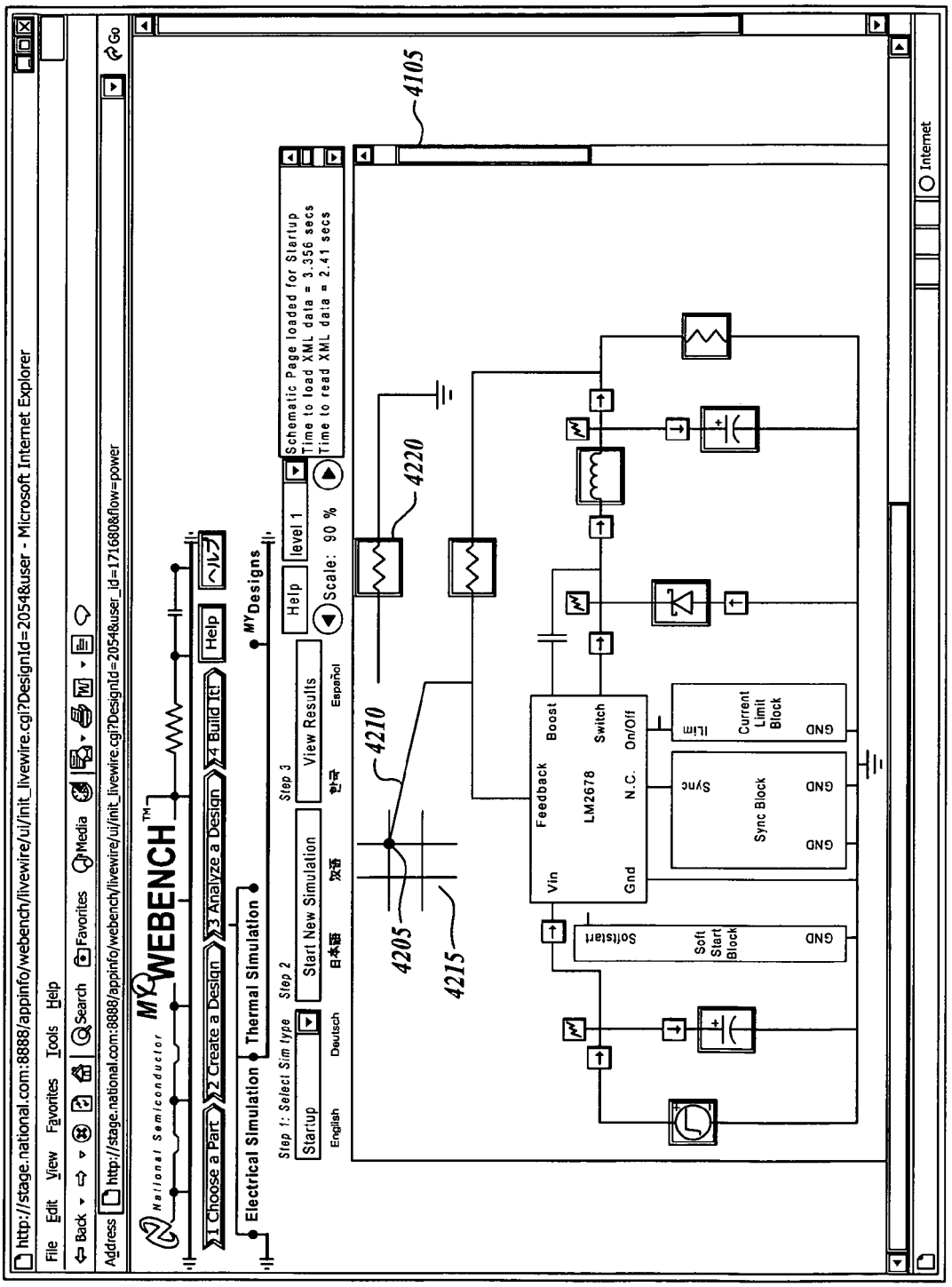
FIG. 42 illustrates moving a wire within a schematic.

FIG. 42 illustrates moving a wire within a schematic, in accordance with aspects of the invention.

The user can move wires and components within the schematic shown in window 4105. The user may also move wires after they have been placed. The ends of wires may be moved independently from each other. In other words, one end of a wire may be moved while the other end stays fixed. Referring to the figure, wire 4210 has been selected and endpoint 4205 has been moved. Alternatively, the user can move the entire wire at once. For example, instead of moving just endpoint 4205, wire 4210 may be moved as an entire wire (not shown).

According to one embodiment, the user can specify a minimum allowed movement increment or grid so that it is easier to make the ends of lines meet or lines to connect to components. Grid 4215 illustrates one exemplary grid that may be used. The grid may be sized in many different ways. For example, the grid may change size when the scale of the drawing changes.

When user moves a wire or component onto a grid point, a check is made to see if the moved end of the component or wire overlaps the end (or midpoint) of another wire within the tolerance of the grid increment. If it does, an algorithm determines the logical connectivity of the changed schematic and determines the netlist or component connectivity list based on the change. The netlist or component connectivity list may be used to generate a simulation. According to one embodiment, the netlist is determined on the client (user) side rather than sending it to the server. Determining the netlist on the client side helps to increases the level of interactivity of the application. Alternatively, the coordinates of the lines and the components may be sent to the server side of the application to determine the connectivity/netlist.

Figure 43:
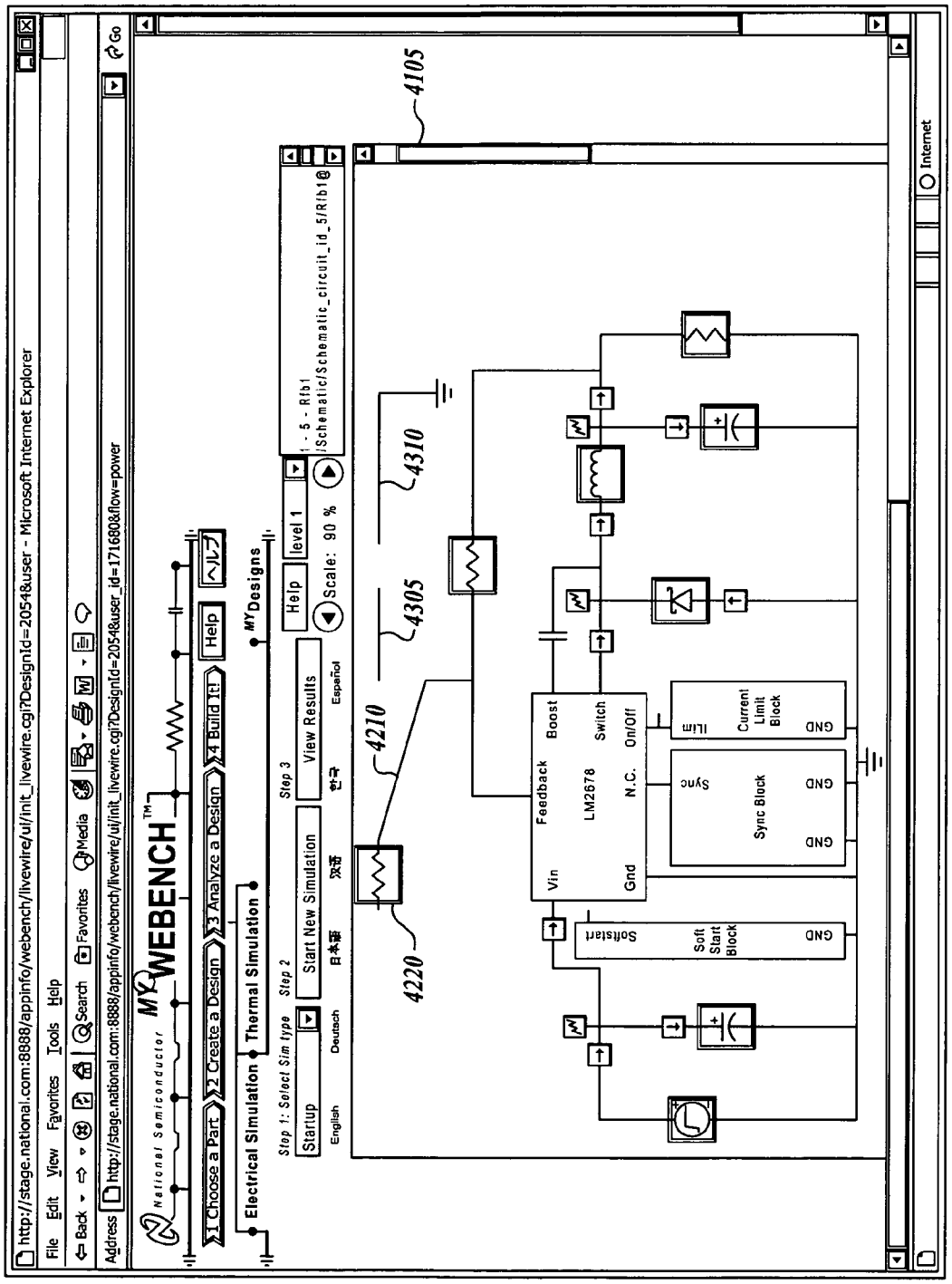
FIG. 43 shows moving a component.

FIG. 43 shows moving a component, in accordance with aspects of the invention.

Referring to the figure, component 4220 has been selected and removed from between wire 4305 and wire 4310. Component 4220 is now coupled to wire 4210. If the user desires, wires 4305 and 4310 may be removed or moved to some other location. Additionally, any other component within window 4105 may be moved or removed.

Figure 44:
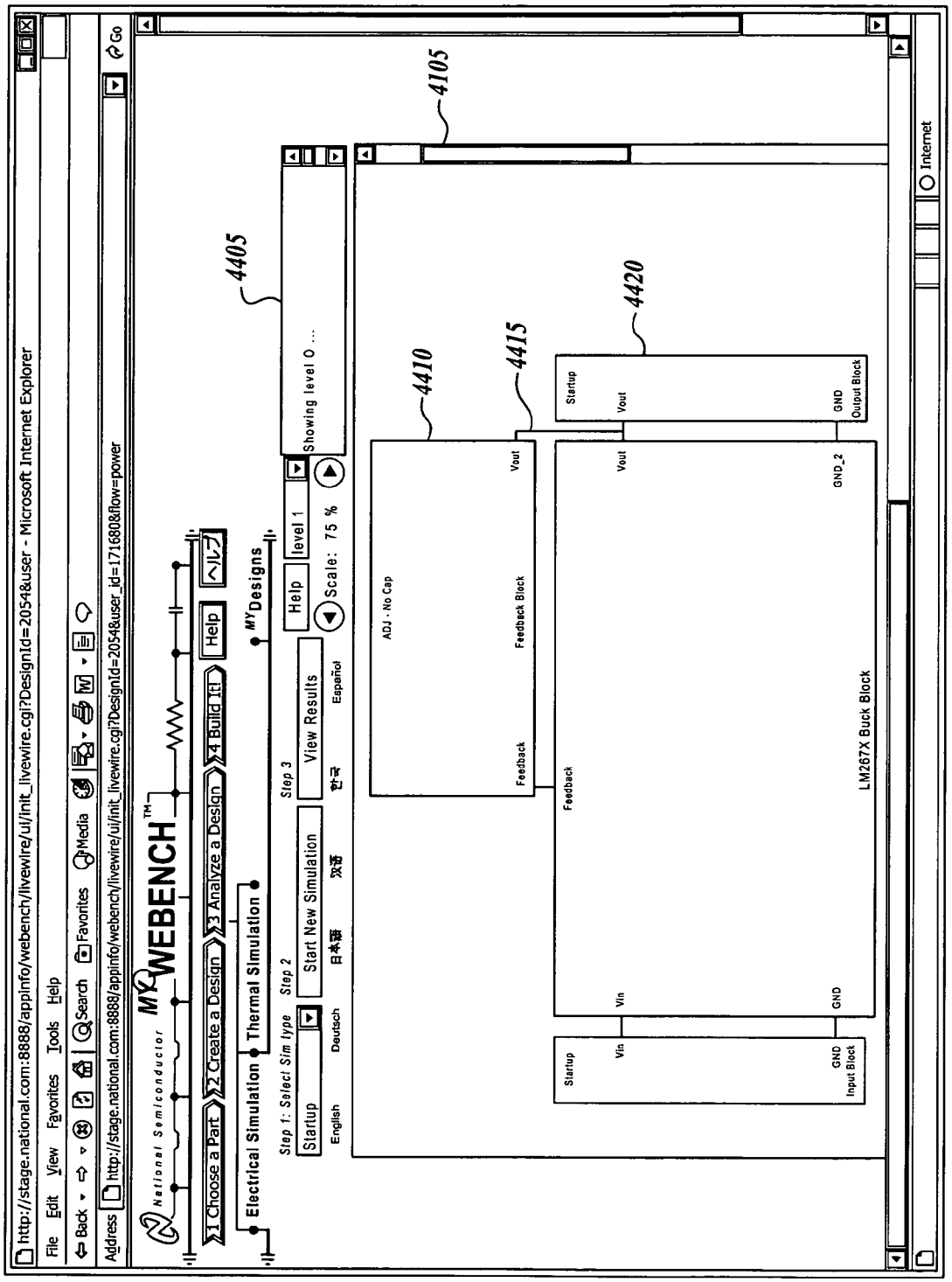
FIG. 44 illustrates using block symbols to represent an electrical schematic or sub circuit.

FIG. 44 illustrates using block symbols to represent an electrical schematic or sub circuit, in accordance with aspects of the invention.

The user can use a predefined block symbol to represent an electrical schematic or sub circuit within the schematic. Alternatively, the user can create a new block symbol to represent an electrical schematic or sub circuit. According to one embodiment, the components and blocks may be selected by the user from a palette of choices. As illustrated, four block symbols are used to illustrate the schematic. The user may still make modifications to the schematic when using block symbols. For example, the user may select wire 4415 that is coupled to block symbol 4410 and 4420 and connect wire 4415 to another location if desired.

Block symbols may also be used depending on the level of detail the user desires to view. For example, information box 4405 illustrates the user is viewing level 0. The user may switch to another level by clicking on the level control (above the zoom control in FIG. 45.) When the user views level 1 more detail may be shown. The user may control the level of detail shown.

Figure 45:
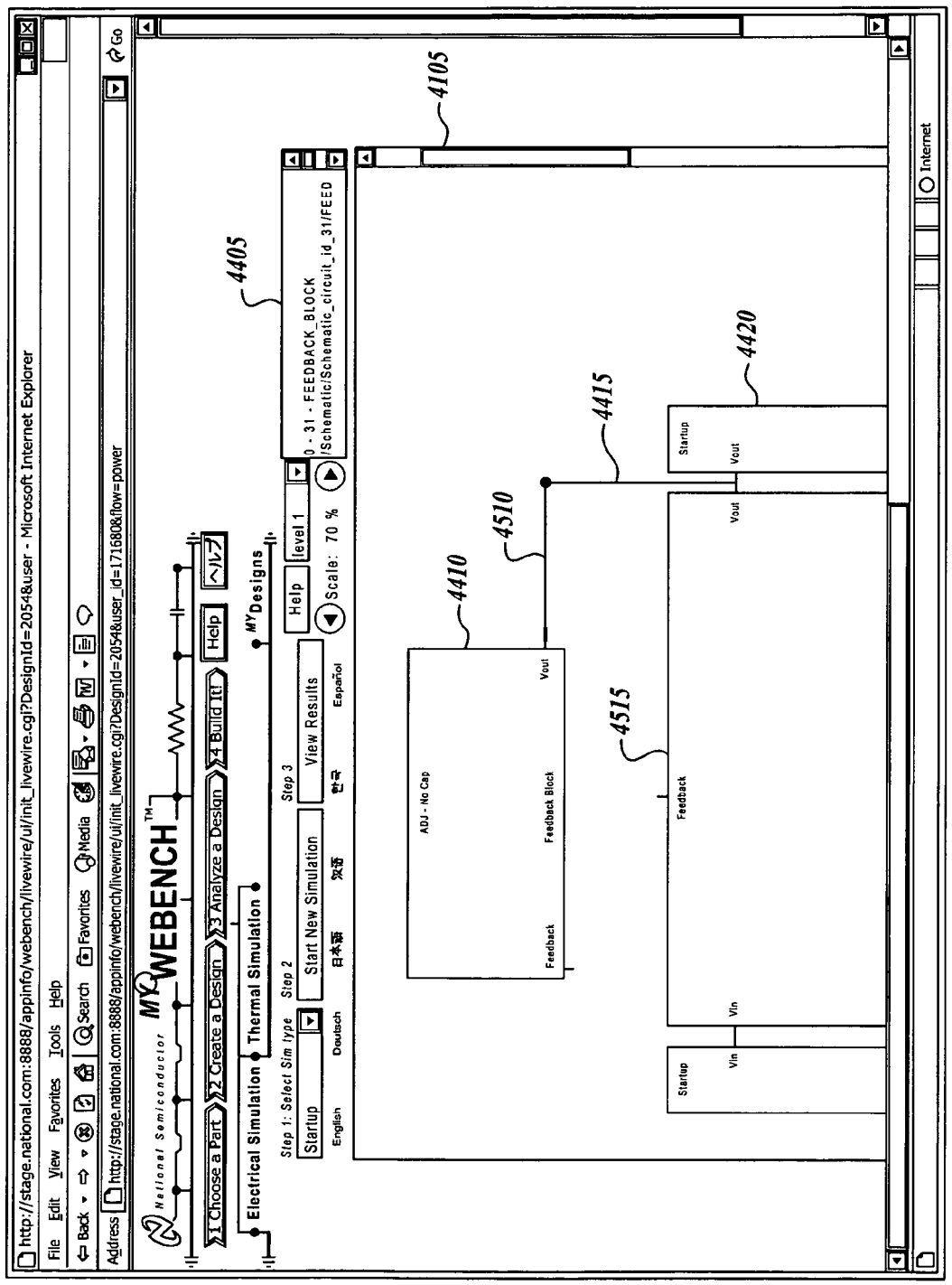
FIG. 45 shows modifying the connections between block symbols.

FIG. 45 shows modifying the connections between block symbols, in accordance with aspects of the invention. The user may modify the schematic by adding block symbols or changing the connection of wires between the block symbols. The user can also insert electrical components into the block diagram.

As illustrated in the figure, the user has moved block 4410 and disconnected the feedback connection from block 4410 to block 4515. The user has also modified the wire from Vout on block 4410 to the Vout between block 4420 and block 4515. As a result of the modification wire 4510 meets wire 4415 at a ninety degree angle.

The user can conduct an electrical simulation of the block diagram they created or modified by pressing the start new simulation button on the web page. Once the simulation is finished the user may view the results by pressing the view results button on the web page. The electrical circuit or block diagram may also be saved and recalled it a later time for editing or simulation.

According to one embodiment, a database is used to store the user's circuit information. Circuits and sub circuits are stored in a hierarchical and independent manner in the database. This enables the circuit information to be stored in a way which is more conducive to using a block diagram approach.

The circuit blocks stored in the database can be assembled based on the user's design requirements to create an optimal circuit for the user. For example, if the user has a high load current design requirement, this may show a need for an RC snubber circuit on the switch node of a switching regulator, and a block may be added into the circuit and presented to the user.

Certain features of a device may require blocks to support the feature. The circuit information about the block is stored in the database and added to the circuit when required. For example, the LM2679 voltage regulator device produced by National Semiconductor Corporation has a current limit feature which requires that a current limit resistor be connected between the current limit pin of the IC and ground. This current limit resistor can be represented by a block in the database and it can be added to the user's circuit when an LM2679 is selected. If a device is selected which does not require a block, the block is not added to the user's circuit. For example, the LM2678 does not require a current limit block and it is therefore not added to the circuit. This allows a template circuit to be used as a basis for constructing more complex circuits.

Figure 46:
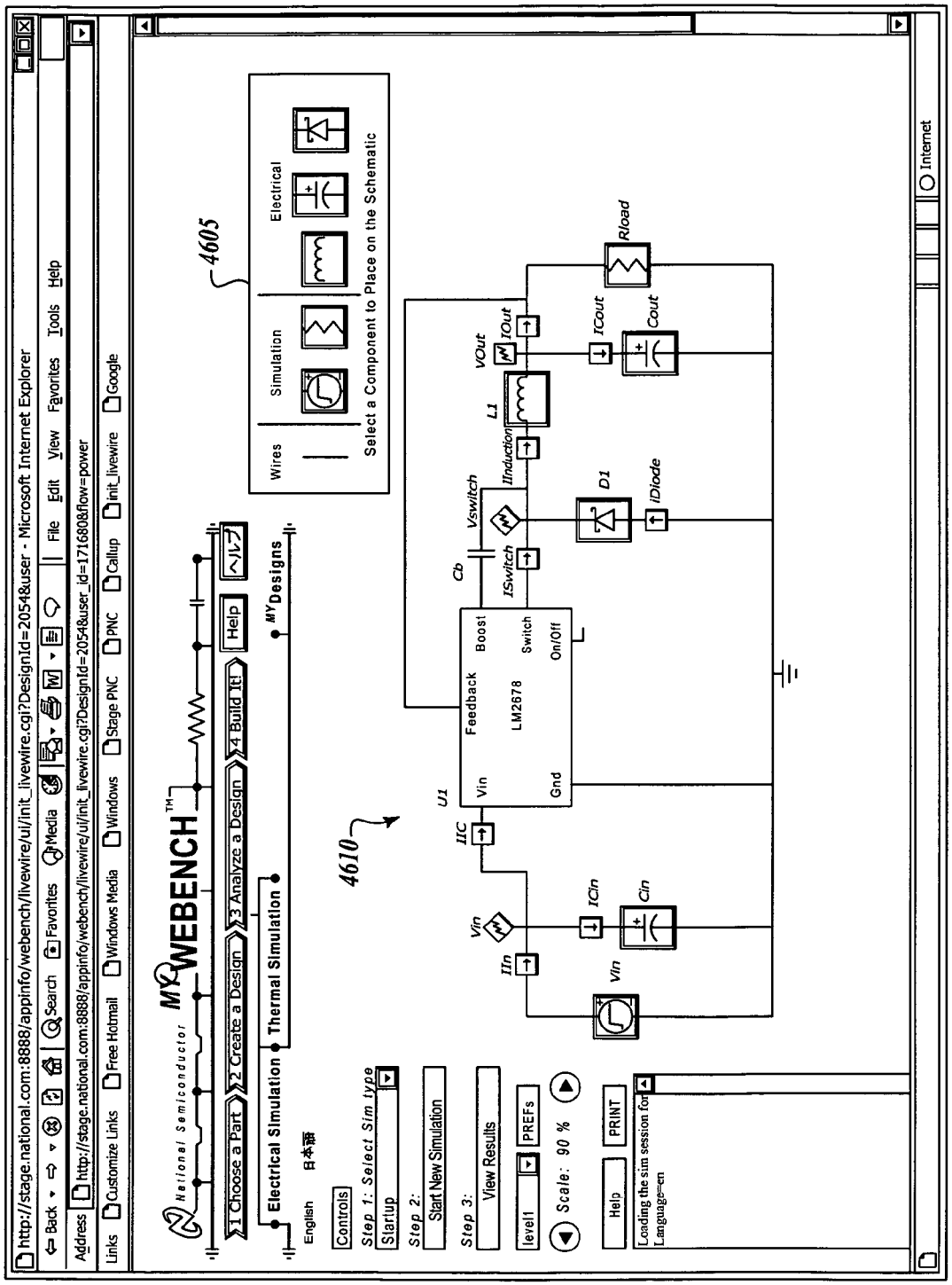
FIG. 46 illustrates exemplary components that may be used within a schematic, in accordance with aspects of the invention.

FIG. 46 illustrates exemplary components that may be used within a schematic, in accordance with aspects of the invention. The user can place components or wires from a palette of available options or select placement options from a drop down menu.

As illustrated in the figure, six components are included within palette 4605 and are used in accordance with one embodiment of the invention. A wire component, two simulation components, and three electrical components are provided. Any number of components may be provided. For example, the number of components provided may change with the circuit being designed.

The user selects one of the components by clicking on the component within the web page. Once the component is selected it may be moved to a point within the schematic as chosen by the user. For example, circuit 4610 could have been created by placing components from palette 4605.

Figure 5:
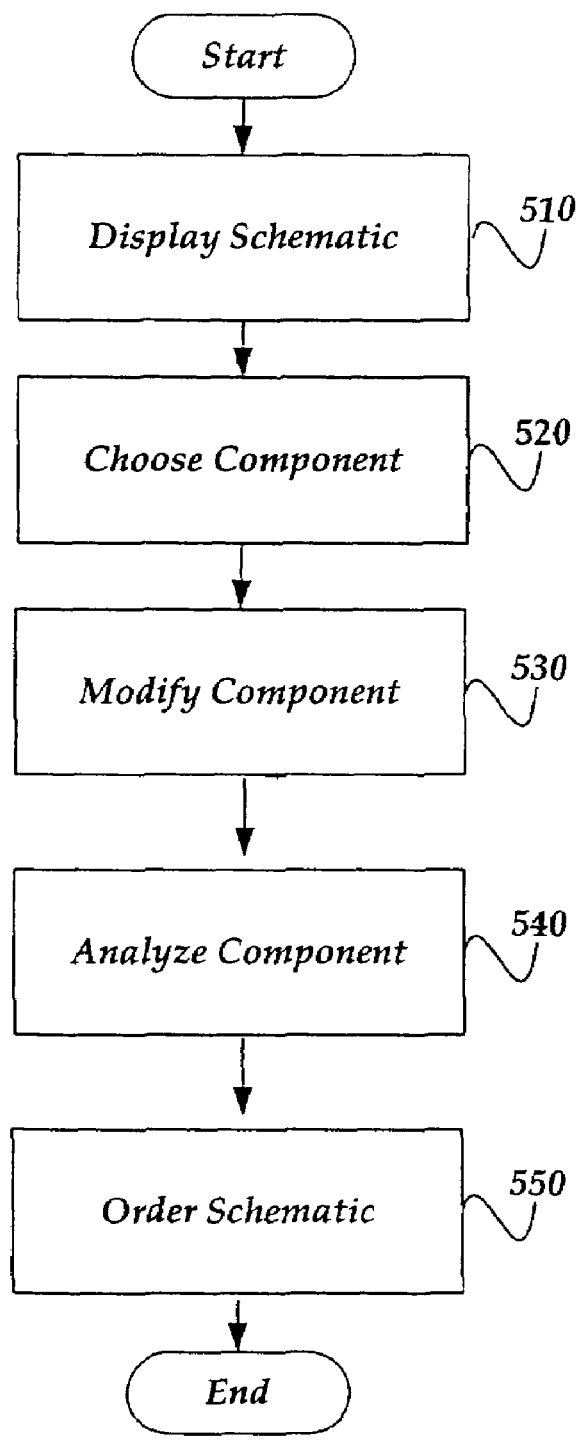
FIG. 5 shows an overview flow diagram illustrating general steps of the modifying or creating a schematic.

FIG. 5 shows an overview flow diagram illustrating general steps of the modifying or creating a schematic, according to aspects of the invention. After a start block, the logical flow moves to a block 510 where the schematic is displayed to the user through a web page over a standard Internet connection. Moving to block 520, the user chooses a component that they desire to modify or add. Transitioning to block 530, the component is added or modified. Flowing to block 540 the schematic may be analyzed. According to one embodiment, the design is analyzed using an electrical simulation. The design may also be analyzed using a thermal simulation tool, an electrical simulation tool, and a PCB layout tool. The interaction between the tools allows the user to visualize and obtain the thermal and electrical behavior of the design.

Stepping to a block 550, the circuit may be ordered and built. A part, a kit of parts, or an evaluation board may be ordered from a supplier.

According to one embodiment of the invention, a system is provided by which users, with no or little special client-side software, and little or no knowledge of available circuit components, can easily and efficiently create, modify, and simulate, and order circuits and components that satisfy their functional requirements. According to one embodiment of the invention, the user is presented with a series of web pages to achieve this result.

Figure 30:
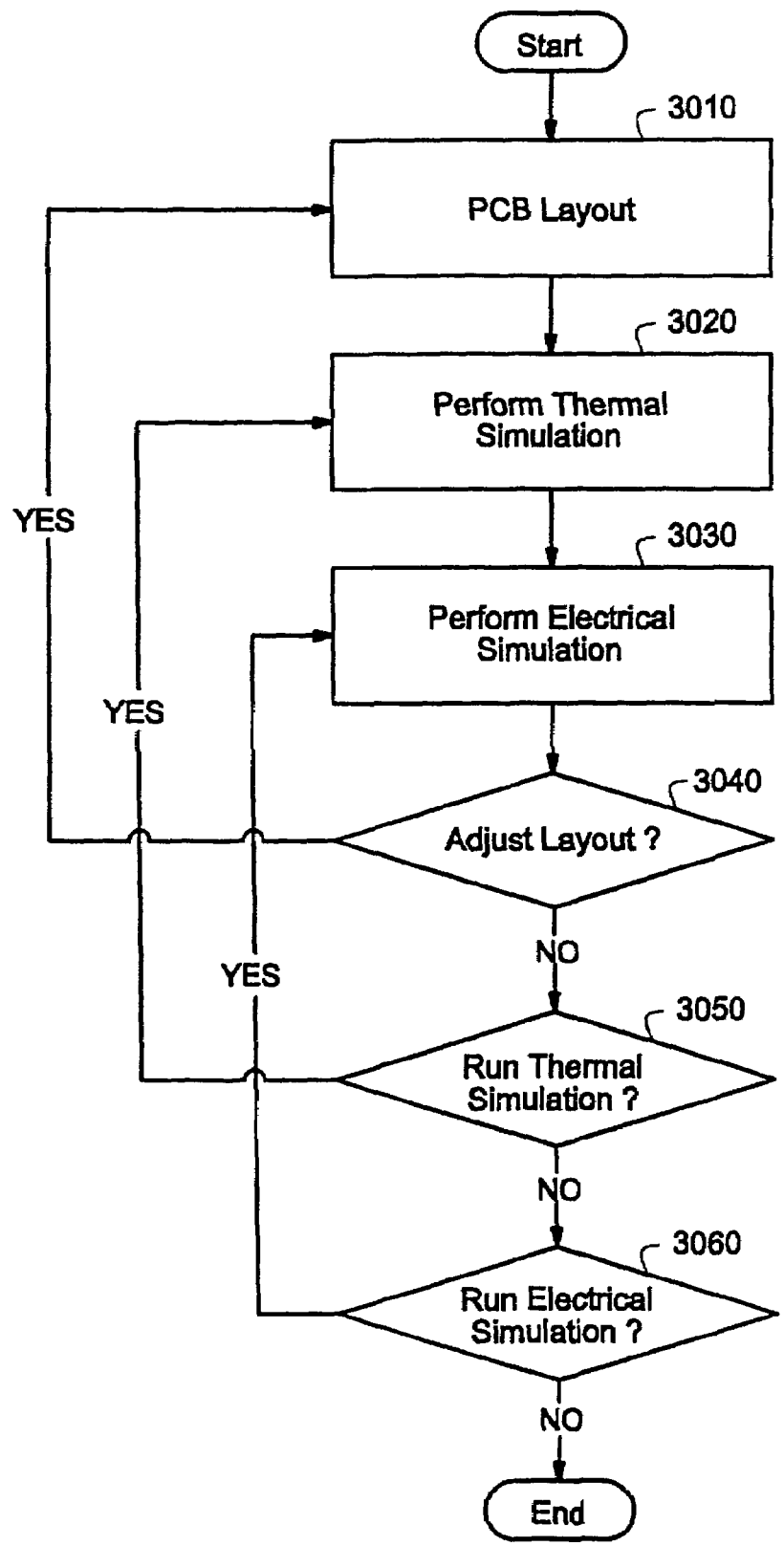
FIG. 30 illustrates a process for the interaction between thermal simulations, electrical simulations, and PCB layout.

FIG. 30 shows the process for interaction between the thermal simulation tool, the electrical simulation tool, and the PCB layout, in accordance with aspects of the invention. The process illustrated in FIG. 30 may be performed in any order and repeated as many times as needed to converge upon a design that satisfies the user's requirements. A common environment to perform electrical and thermal simulations successively allows the user to interactively design a circuit. For example, when the user changes a component in the electrical simulation, that change is also reflected in the thermal simulation. When the user changes a component in the thermal simulation this change is reflected in the thermal simulation.

After a start block, the logic flows to block 3010, at which point the adjustment of the PCB layout of the components is performed. Generally, the components are placed in predetermined landing areas on the PCB based on their use. The user may also adjust properties relating to the PCB. For example, the user may crop the PCB.

Stepping to block 3020, a thermal simulation of the design is performed. The thermal simulator uses validated thermal models for the components and the reference PCB. According to one embodiment of the invention, the output of the thermal simulation is a color plot of the PC board under the design's steady state electrical load conditions.

Transitioning to block 3030, the process performs an electrical simulation of the circuit. The electrical simulation is run on the components currently chosen for the design and provides the user with accurate performance information. The user may also edit component, supply, and load values to refine their design.

Moving to decision block 3040, the process determines whether to adjust the PCB layout of the circuit. When the layout is to be adjusted, the process returns to block 3010 where properties relating to the PCB layout may be modified. When the layout is not to be adjusted, the process moves to decision block 3050, at which point the process determines whether to run another thermal simulation. If another thermal simulation is to be performed, the process returns to block 3020 and performs another thermal simulation. If a thermal simulation is not to be performed, the process steps to decision block 3060 at which point the process determines whether to run another electrical simulation. If so, the process returns to block 3030 and performs another electrical simulation. If not, the process moves to an end block and terminates. The electrical simulation results that affect the thermal simulation may also be carried into the thermal simulation. For example, the duty cycle of the IC affects the power dissipated in the IC that affects the temperature in the thermal simulation. In a similar way, the temperature of the IC affects the switch resistance of the IC, which affects the electrical behavior. Similarly, changing the PC board layout may affect the thermal and electrical properties of the circuit. The interaction between the thermal, electrical and PCB layout parameters may be adjusted by running successive simulations until the results converge to a predetermined level. The predetermined level is based on the user's specifications.

Figure 4:
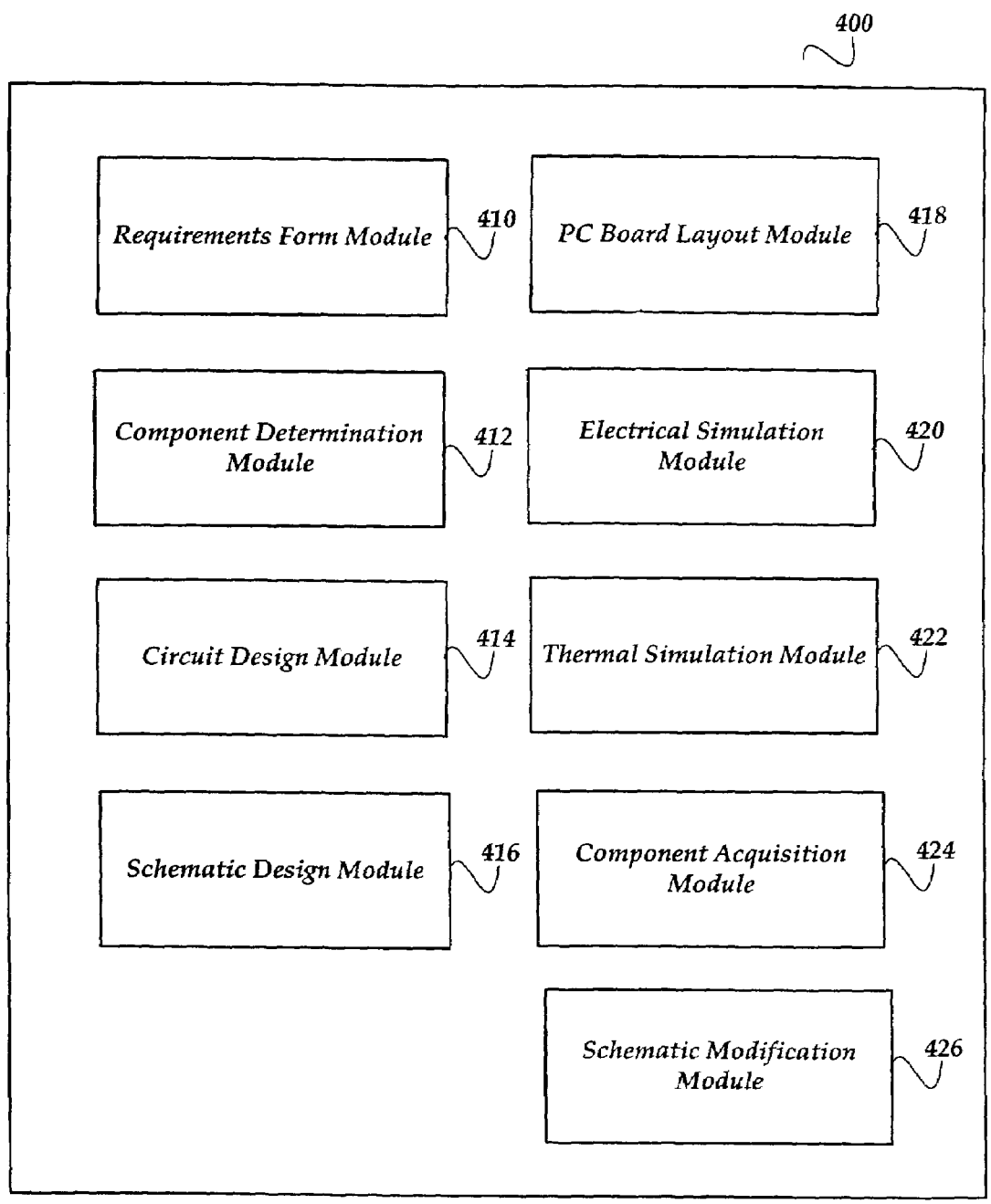
FIG. 4 is a block diagram that gives an overview of functional modules used to implement an embodiment of the invention.

FIG. 4 shows a block diagram that gives an overview of functional modules 234 used to implement the techniques described. Functional modules 234 (FIG. 2) include numerous functional modules. Referring to FIG. 4, in the illustrated embodiment, the modules 400 include requirements form module 410, component determination module 412, circuit design module 414, schematic design generation module 416, PC board layout module 418, electrical simulation module 420, thermal simulation module 422, component acquisition module 424, and schematic modification module 426. The functions of each of these modules are described in more detail within this specification.

FIG. 6 illustrates an exemplary web page for starting the process for designing a circuit. The web page illustrated contains text 610 that explains the four general steps of the process to the user, and contains links to web pages for "Choose a Part" 620, "Create a Design" 630, "Analyze a Design" 640, and "Build It" 650 that contain more information relating to the four general steps. The page contains links to the user's recent designs 660, a "MyDesigns" link 670 to all of the user's designs, as well as a link to electrical simulations 680, thermal simulations 690, and the user's "BuildIt" orders 695.

Figure 7:
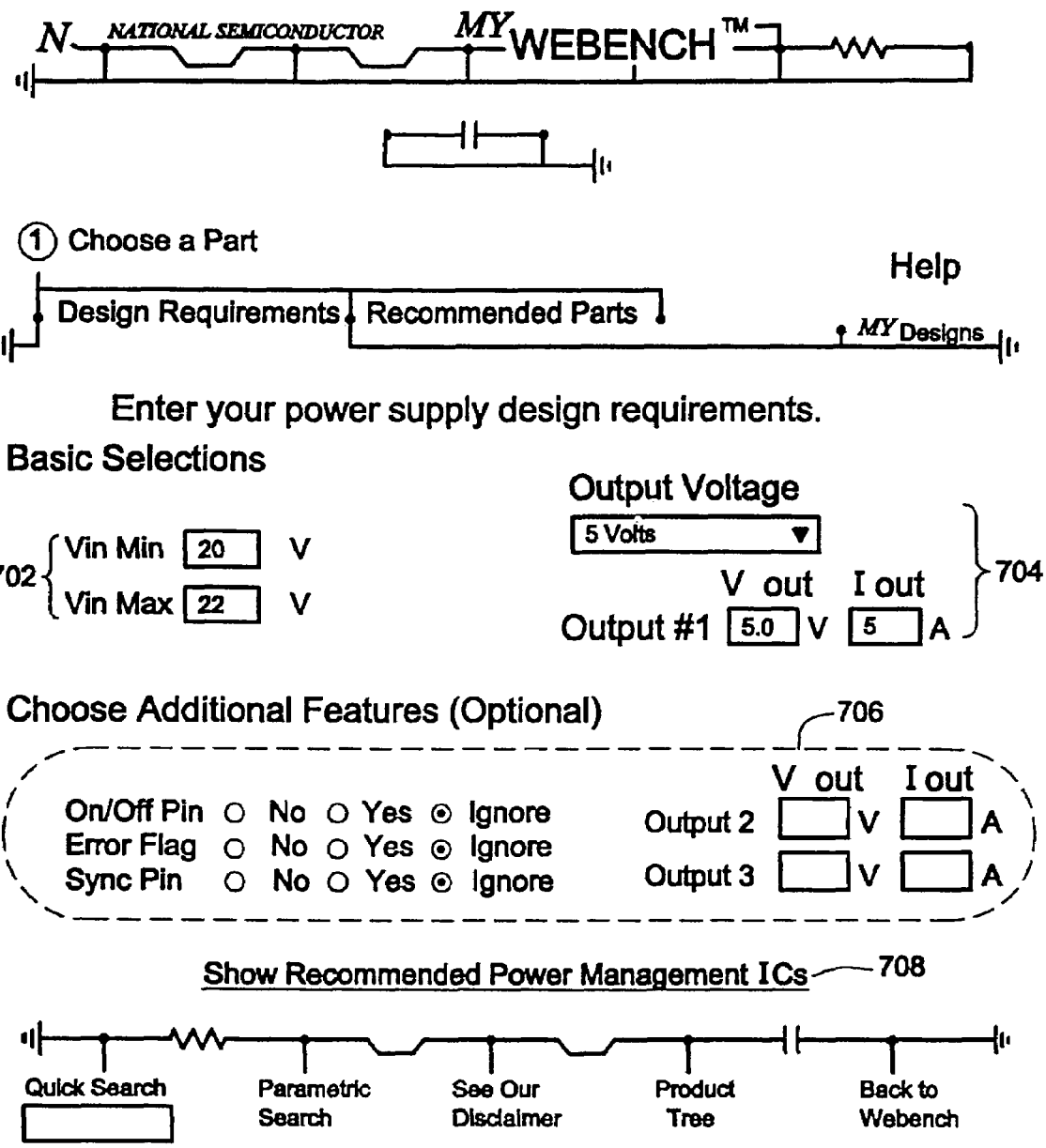
FIG. 7 shows an exemplary requirements web page for receiving the requirement information from a user for a power supply circuit.

When the user desires to start the process the user may select the START HERE link 605. It should be noted that many of the links and buttons "to web pages" are actually links that result in the execution of software modules which produce, as output, the web pages that are delivered to the user. Selecting START HERE link 605 directs the user to the web page as illustrated in FIG. 7.

Suggesting Components Based on User-Specified Requirements

For the purpose of explanation only, it shall be assumed that a user desires to create a power supply. Accordingly, the user selects START HERE LINK 605 shown in FIG. 6. While the techniques described herein shall be described in the context of designing, simulating, and ordering parts for a power supply circuit, the techniques are not limited to any particular type of circuit.

According to one embodiment, a web server, such as web server 200 (FIG. 2) responds to selection of START HERE link 605 by invoking the requirements form module 410. The requirements form module 410 provides one or more "requirements" web pages to client computer 300. The requirements web pages allow the user of the client to specify requirements for a circuit.

FIG. 7 shows an exemplary requirements web page for receiving the requirement information from a user for a power supply circuit. The illustrated requirements page includes user interface controls for specifying minimum and maximum input voltages (controls 702), and output voltage and current (controls 704). The requirements web page further includes controls 706 for additional requirements, such as whether the circuit requires an ON/OFF pin, an Error Flag, Sync Pin, or multiple output voltages and currents. Other requirements that may apply to a power circuit, for example, may include requirements associated with ambient temperature, efficiency, frequency, and the like. It should be noted that the specific user interface controls presented by the requirements web pages will vary from implementation to implementation based on a variety of factors, including the type of circuit for which the requirements are being specified.

The requirements information entered by the user into the requirements web page may be transmitted back to the web server. The operation of sending the requirements information to the server may be initiated, for example, by the user selecting a particular control, such as button 708, on the requirements web page.

Based on the requirements information, a component determination module 412 determines the components that could be used to build a circuit that would satisfy the specified requirements, and generates one or more "suggested component" web pages. The process of determining the components that could satisfy the specified requirements may be implemented, for example, by applying filters to component data stored in a database. The filters may, for example, compare the values specified in the "output voltage" and "output current" fields of the requirements web page against values in corresponding columns of a "component" table in a database.

The process may also involve using values from the requirements information as input into formulas, where the output of the formulas is used to determine which components could satisfy the specified requirements. For example, assume that the user desires a boost regulator circuit. Integrated circuits used in boost regulators have a switch current rating. The switch current rating of each integrated circuit that can be used in a boost regulator may be stored in the record for that integrated circuit in a database. To determine which integrated circuit may be used, the input voltage, output voltage and output current specified in the requirements information are used to calculate a required switch current rating, and the required switch current rating is compared against the switch current ratings in the database to select those integrated circuits within the database that can satisfy the specified requirements.

FIGS. 8A and 8B are an example of a suggested component web page generated in response to the requirements specified according to FIG. 7. In the present example, the suggested components fall into two categories: switching regulators for use in a Buck Topology, and switching regulators for use in a Flyback Topology. An understanding of the distinction between these categories of switching regulators is not important for the purpose of understanding the techniques described herein. However, such distinctions may be relevant to the user designing the power circuit. Therefore, component determination module 412 generates the suggested component web page in a manner that groups the suggested components into those and any other applicable categories.

Component determination module 412 further includes in the suggested component web page other information relevant to the user's selection of a component. In the illustrated embodiment, the other information includes the maximum current, the typical efficiency, whether the component has an ON/OFF pin or an Error pin, a field for "other features", the frequency of the component and an estimated price of the component. Other information may be included in the display. For example, the number of components in stock and the physical size of the components may be displayed. Additionally, a diagram of the component may be shown.

In the illustrated implementation, the names of the suggested components are presented in the form of links. Selection of the link associated with a component results in the delivery of a "product folder". According to one embodiment of the invention, the product folder is a web page that presents detailed information about a component. For example, selecting link 802 associated with the LM2679-ADJ component produces the product folder web page as shown in FIG. 9. The information and controls contained on the product folder web page of a component shall be described in greater detail hereafter.

The information contained in the suggested component web pages, and the product folders of the components listed in the suggested component web pages, satisfies only part of the users needs. In particular, the user is interested in creating an entire circuit that satisfies the specified requirements, and not merely in identifying a component that could be used in such a circuit. Therefore, according to one embodiment of the invention, the user is presented with a control for automatically generating the design of such a circuit using a component selected from the suggested component web pages.

A thermally enabled indicator 806 is displayed for those parts that are thermally enabled. This allows the user to quickly identify parts that may be simulated using the thermal simulation tool. A build it indicator 808 is displayed for those parts that may be purchased in a custom kit. In addition to the information currently displayed, other information may be displayed. For example, the total bill of materials (BOM) price may be displayed. This may be useful information to help the user decide which part to select. According to one embodiment of the invention, when the part is not thermally enabled, the user may supply the thermal requirements data for the component so that the component may be modeled.

Automatic Circuit Design

Referring again to FIGS. 8A and 8B, the listing for each component includes a field that contains a CREATE DESIGN button, such as CREATE DESIGN BUTTON 804, which, when selected, causes the automatic generation of a circuit design that uses the selected component, and satisfies the specified requirements that were initially entered by the user. For example, assume that the user determines, based on the information contained on the suggested components web page and, optionally, the more detailed information on product folder web pages, that the LM2679-ADJ component is the best of the suggested components for the user's purpose. The user may then select CREATE DESIGN BUTTON 804 associated with that component to cause generation of a power circuit that uses the LM2679-ADJ component, and satisfies the requirements specified on the requirements web page shown on FIG. 7.

According to one embodiment, selection of a create design button causes a message that indicates the requirement information and identifies the selected component to be sent to a circuit design module 414. In response, circuit design module 414 designs a circuit that uses the selected component and satisfies the specified requirements. Specifically, circuit design module 414 determines components that are utilized in the circuit in addition to the selected component, and how those components should be arranged to create the circuit (the circuit "topology").

The circuit may contain many more components in addition to the selected IC component. Rules and mathematical formulas are used to select the optimal values for these additional components. These rules may be set up to optimize certain design criteria over another. For example, if the user desires to have minimal output voltage ripple, a larger output capacitor value may be chosen, but this may degrade the circuit's ability to respond to a sudden change in input voltage (transient response). Thus, the user may be given a choice to emphasize one design criteria over another.

One output of circuit design module 414 is a set of rules for the additional components in the circuit. For example, for a certain design the output capacitor must have a capacitance greater than or equal to 100 μF and an equivalent series resistance of less than or equal to 100 mΩ. These rules are used to select alternate components if desired.

Various techniques may be used by circuit design module 414 to determine the topology of the circuit. For example, numerous topology "templates" may be stored on the server-side at a location accessible to circuit design module 414. Data may also be stored that associates general types of circuits with one or more of the topology templates. In an embodiment of the invention that uses topology templates, circuit design module 414 selects the topology template based on the type of circuit that is being designed, and then uses the selected topology template, the selected suggested component, and the requirements information to determine the other components required for the circuit.

According to one embodiment, circuit design module 414 transmits back to the user one or more components list web pages. The components list web pages identify the components that are included in the circuit designed by circuit design module 414 (referred to herein collectively as the "designed circuit components"). The designed circuit components thus include the selected component and the additional components determined by circuit design module 414.

For the purpose of illustration, it shall be assumed that the user selects the create design button associated with the LM2679-ADJ component.

Product Folder Web Pages

FIG. 9 shows an exemplary web page illustrating a product folder web page for the LM2679-ADJ component. In the illustrated embodiment, the product folder web page includes links 902 to related information relating to the component, including a General Description section, a Features section, an Applications section, a Datasheet section, a Package Availability, Models, Samples & Pricing section, and a design tools section. A parametric table 904 showing the operating parameters of the component is also displayed.

The General Description section includes a general description of the component. The Features section lists the features of the component. The Applications section lists applications in which the component is typically used. The Datasheet section contains links to view online or download the data sheets for the component.

The Package Availability, Models, Samples & Pricing section lists package types and other options available for the component, indicates the status, availability and price of the component for each option, and contains controls which, when selected initiate an operation for placing an order or sample for each option for the component.

The Design Tools section includes a link (not shown) to view online or download information about software tools that may be used to assist in designing circuits that use the component. Button 905 allows the user to go directly to WEBENCH if they got to the product folder first before entering WEBENCH.

Bill of Materials

Figure 10A:
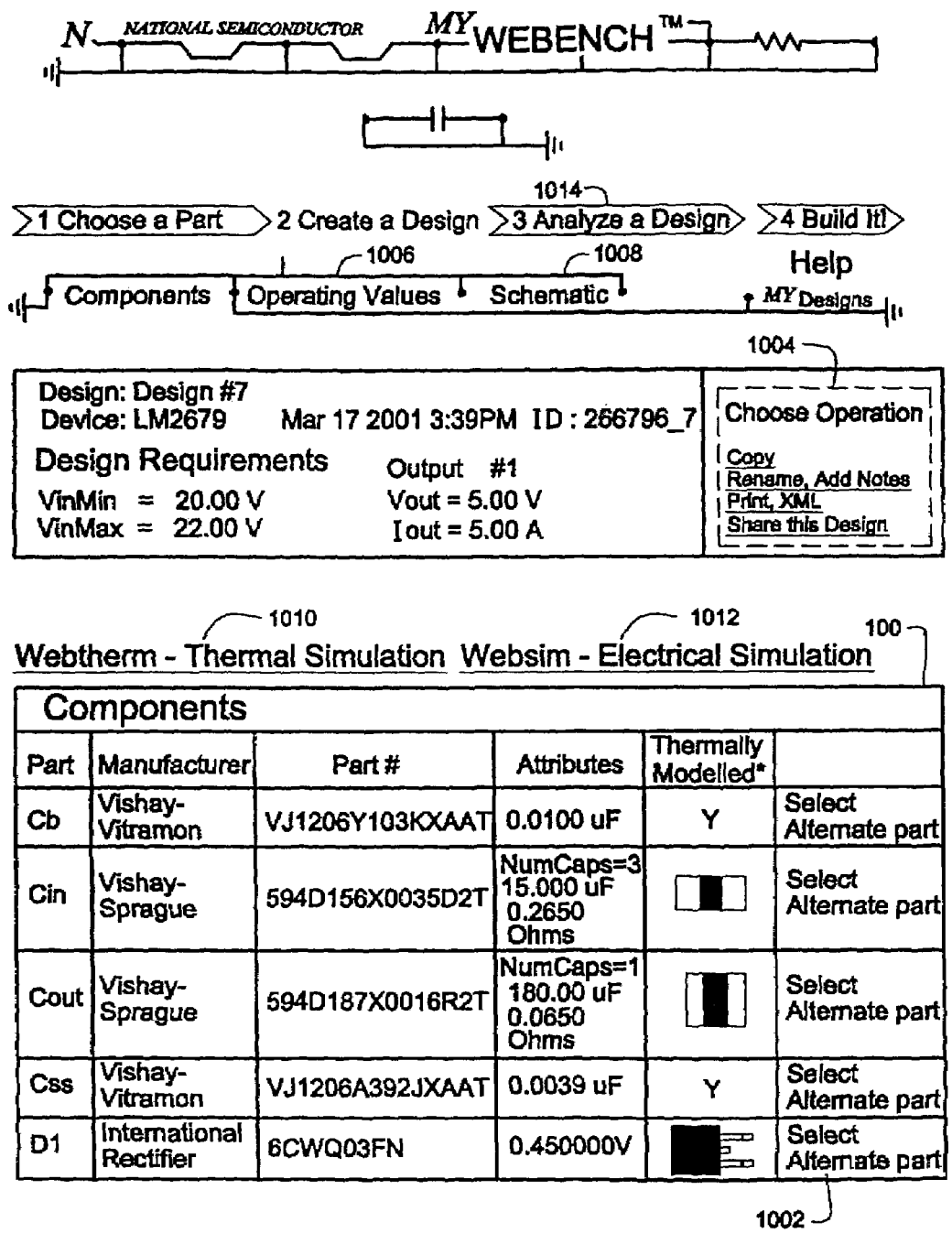

FIGS. 10A and 10B illustrate an exemplary bill of materials web page that indicates the components used in the circuit design generated by circuit design module 414. In addition to the selected LM2679-ADJ component, the bill of materials web page lists numerous other circuit components from a variety of manufacturers. If the user desires to substitute any of the designed circuit components listed in the bill of materials page for another component, the user may select the "select alternate part" button associated with that component. In response to selection of the "select alternate part" button associated with a component, the user is presented with a list of alternate components. Such substitutions may be desirable, for example, if the user desires components from a particular manufacturer. For example, suppose the user desires to select an alternate component for component part D1, the user selects button 1002. The alternate components for component part D1 are then displayed to the user (See FIGS. 11A and 11B and related discussion).

The bill of materials page provides user interface controls 1004 allowing the user to edit the information stored about your simulation. All changes are stored automatically and associated with the user. File operation copy allows the user to create an identical design, which can then be altered for comparison. File operation rename allows the user to change the label on the current design. File operation add allows the user to add or edit notes stored with the design. File operation print allows the user to print a report of the design. XML file operation allows XML to be displayed. A web browser capable of displaying XML such as Internet Explorer 5.0, is used for this feature. Share this design file operation allows the design to be shared among colleagues. For example, the design engineer could share the design with other designers or with their supervisor.

A scale drawing of the top view of the components in the design is displayed if available. According to one embodiment, these drawing outlines are stored in a database on a web server. The drawings are in a color scheme similar to the actual colors of the components. This display allows the user to see the size of the components, which is often an important attribute to consider when creating a circuit design. If the component cannot be thermally simulated, the letter N is displayed instead of the scale drawing of the top view of the component. This allows the user to readily determine whether a component may be thermally simulated. In addition to the information shown, other information may be included. For example, the number of components in stock, the price, and the like may be shown.

Alternate Components

FIGS. 11A and 11B illustrate an exemplary web page showing alternate components for a component. The user may select from a list of supplied alternate components or enter a custom component. Along with the alternate components, other information relating to the component is displayed to the user. For example, for the D1 component, the forward voltage drop, max rated current, max voltage rating, physical dimensions of the component, price, quantity available, as well as if the component is thermally modeled is displayed. The top view scaled drawing of thermally simulated components is shown. There is also an indicator (the letter N) to show if the alternate component cannot be thermally simulated. These features allow the user to view the size of alternate components and choose parts that may be simulated using the thermal simulator if so desired. On the alternate components screen, the user is allowed to manually enter the values for a component if desired. According to one embodiment of the invention, to allow a component to be thermally simulated, the user is given the option to enter simulation parameters including the x, y and z dimensions of the component, the package type of the component and a choice of a top view drawing to be used for the component.

The recommended limits for the important parameters for the component are displayed (1108, 1110, and 1112). These are determined by component determination module 412. This allows the user to better select an alternate component or enter custom values. As will be appreciated, other information may also be displayed to the user. According to one embodiment of the invention, when the user enters a custom component, the component cannot be thermally simulated. According to another embodiment of the invention, the user may enter the thermal parameters needed to simulate the component. According to this particular example, the user has selected alternate component 5 to replace component D1 shown in FIGS. 10A and 10B. Once the user has selected an alternate component, the user selects Update BOM button 1102 to incorporate the component into the design.

Referring again to FIGS. 10A and 10B, once the user has made any desired component substitutions, the user may select operating values control 1006 to obtain operating value information for the circuit created by circuit design module 414 using the parts listed in component lists page. FIGS. 12A and 12B illustrate exemplary web pages showing the operating parameters for the circuit associated with the bill of materials of FIGS. 10A and 10B including the changed D1 component. From either the components list web page or the operating values web page, the user may select "schematic" control 1008 to cause a schematic diagram of the circuit to be generated.

In response to selection of schematic control 1008, one or more messages identifying the designed circuit components, as well as the topology data for the generated circuit, are sent to a schematic diagram generation module 416. The schematic diagram generation module 416 generates one or more web pages that include a schematic diagram of the circuit, and delivers the schematic web pages to the user.

Operating Values

FIGS. 12A and 12B show exemplary web pages illustrating operating values of a circuit. The operating values provide the user with the results of calculations for the power supply design. These calculations may then be used in the selection of the design components, and are reported to give the user an estimate of the circuit performance. According to one embodiment of the invention, the operating values are updated when the user changes the components. For example, when the user selects an alternate component the operating values change. Referring to FIGS. 12A and 12B, the operating values provide the Pulse Width Modulation frequency, continuous or discontinuous conduction mode, and total output power. The operating values also provide the user with a current analysis, power dissipation analysis, and a description of several values at the operating voltage and current of the circuit. The user can also enter a different value for the operating voltage and operating current then recalculate the operating values based on these inputs.

Schematic Diagram Generation

Referring to FIG. 13, an exemplary schematic diagram web page is illustrated that may be generated and delivered to a user in response to user selection of schematic button 1008, or by clicking link 1012, or by selecting button 1014 which goes to another page that allows access to the to the electrical simulator. (See FIGS. 10A and 10B). The schematic diagram includes the components identified in the components list page arranged in a circuit that satisfies the requirements specified by the user. According to one embodiment, the schematic diagram generation module 416 used to generate the schematic web pages is the WEBENCH Electrical Simulator. While the illustrated embodiment uses the WEBENCH Electrical Simulator module for generating schematic diagram web pages, the present invention is not limited to any particular schematic diagram generation module 416. Any module capable of generating a schematic diagram based on a list of components and schematic information may be used.

Electrical Simulation

Figure 31:
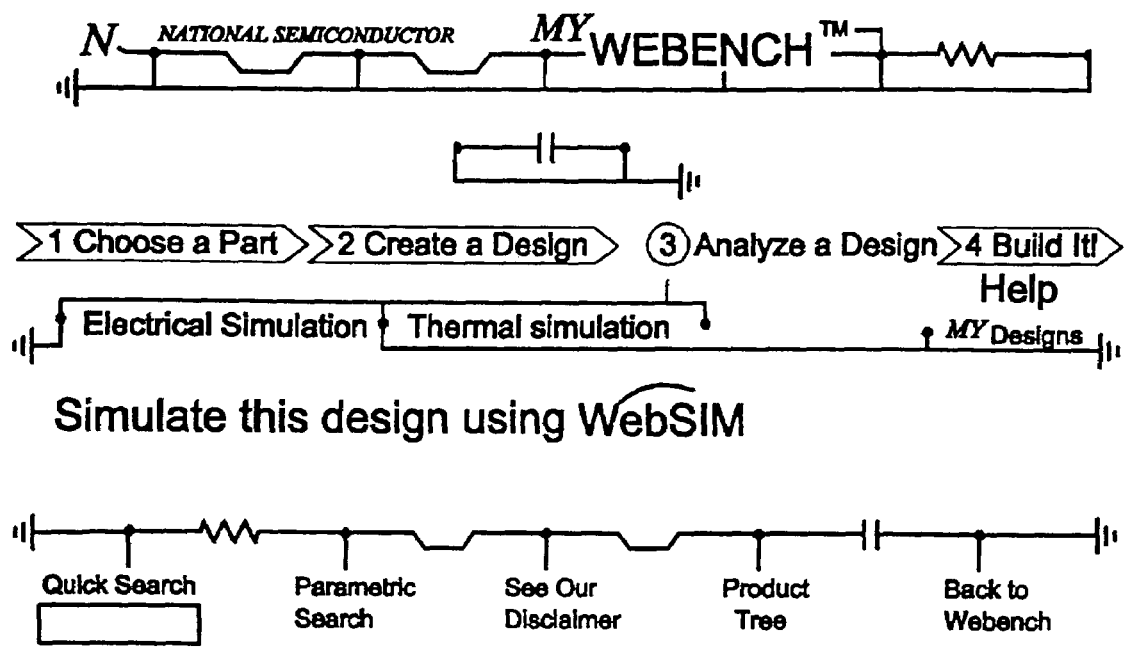
FIG. 31 illustrates an exemplary web page for starting the electrical simulation process.

FIG. 31 illustrates an exemplary web page for starting the electrical simulation process. Selecting the simulate link starts the simulation process. When there have been other electrical simulations performed on the circuit a list is placed under the simulate start link.

Figure 32:
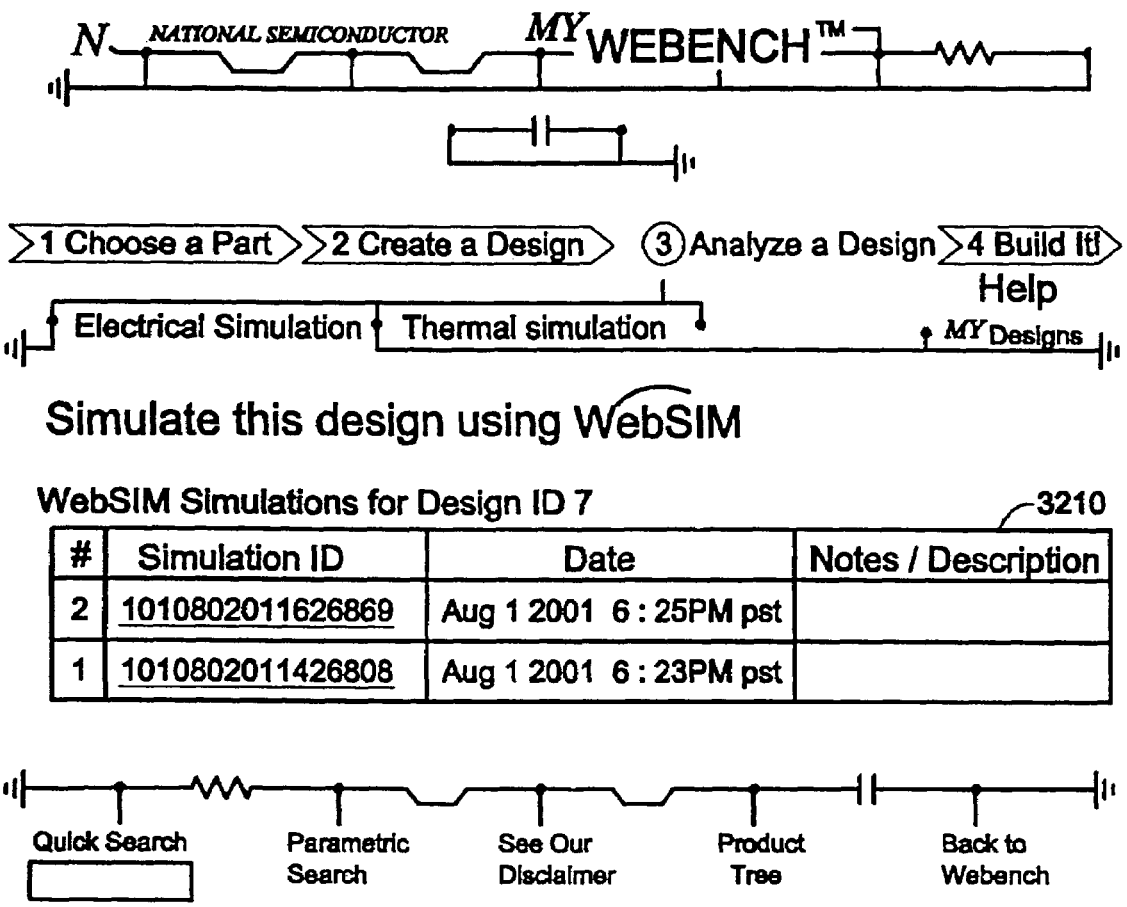
FIG. 32 illustrates an exemplary web page for starting the electrical simulation process showing past electrical simulations completed.

FIG. 32 illustrates an exemplary web page for starting the electrical simulation process showing past electrical simulations completed. As can be seen by referring to the figure, two other simulations have been performed on the circuit. Past simulation table 3210 includes a simulation number, a simulation ID, the date of the simulation, and any notes or description for the simulation. When the user desires to reference a past simulation, the user selects one of the simulation ID links.

Figure 14:
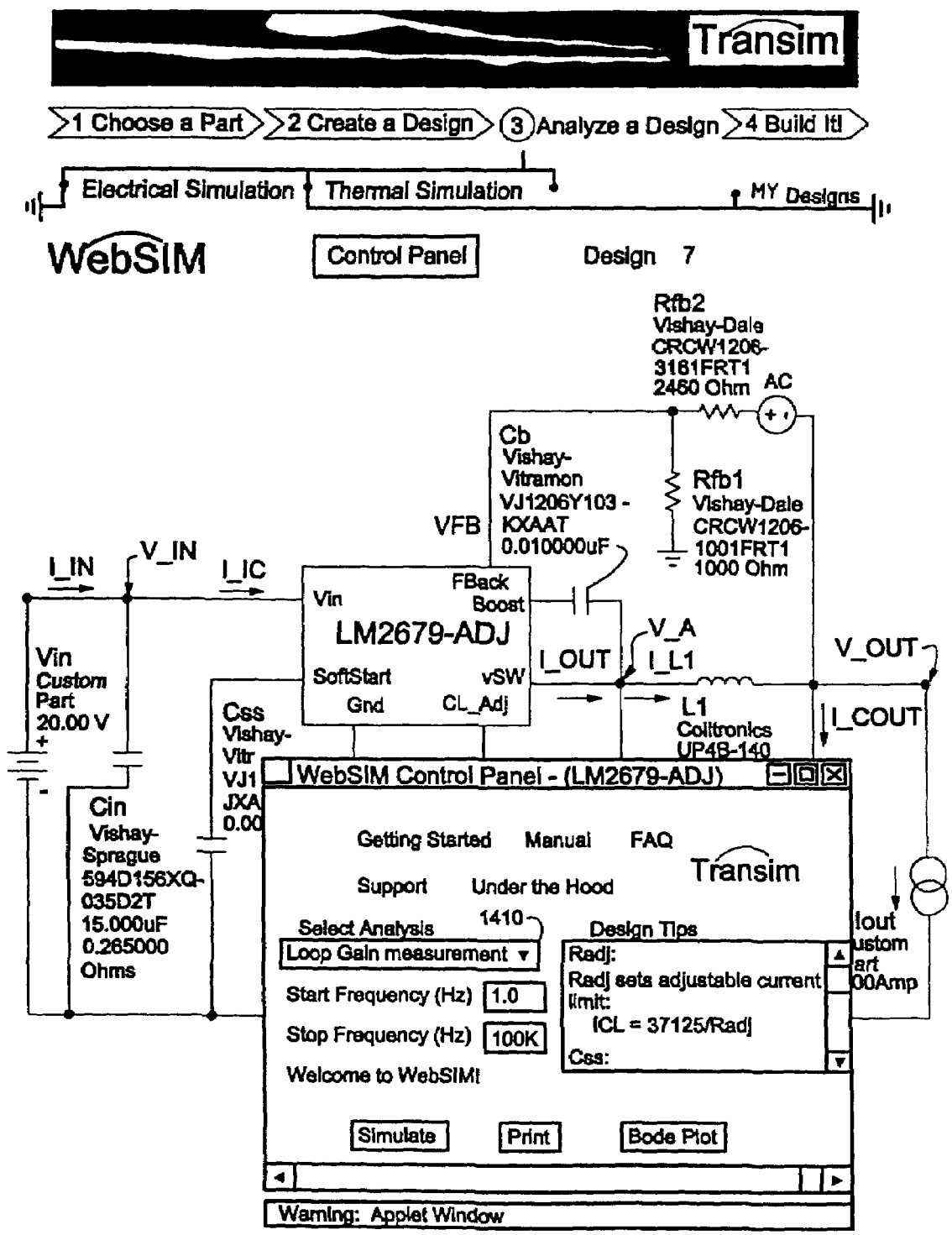
FIG. 14 illustrates a control panel window for helping to control the electrical simulation of the circuit shown in FIG. 13.

FIG. 14 illustrates a control panel window for helping to control the electrical simulation of the circuit shown in FIG. 13. The user may select various analysis methods, start frequency, stop frequency, and the like. The user may also create bode plots of the analysis.

According to one embodiment of the invention, the user may select Loop Gain Measurement analysis, Line Transient Response analysis, Load Transient Response analysis, Steady State simulation analysis, and startup analysis of the circuit by selecting an analysis from drop down selection menu 1410. The user may also enter values into input boxes. The input boxes change depending on the analysis selected. For example, when the selected analysis is loop gain measurement the user may enter a start frequency value, and a stop frequency value. When the user is ready to perform the electrical simulation the user selects the simulate button.

Figure 33:
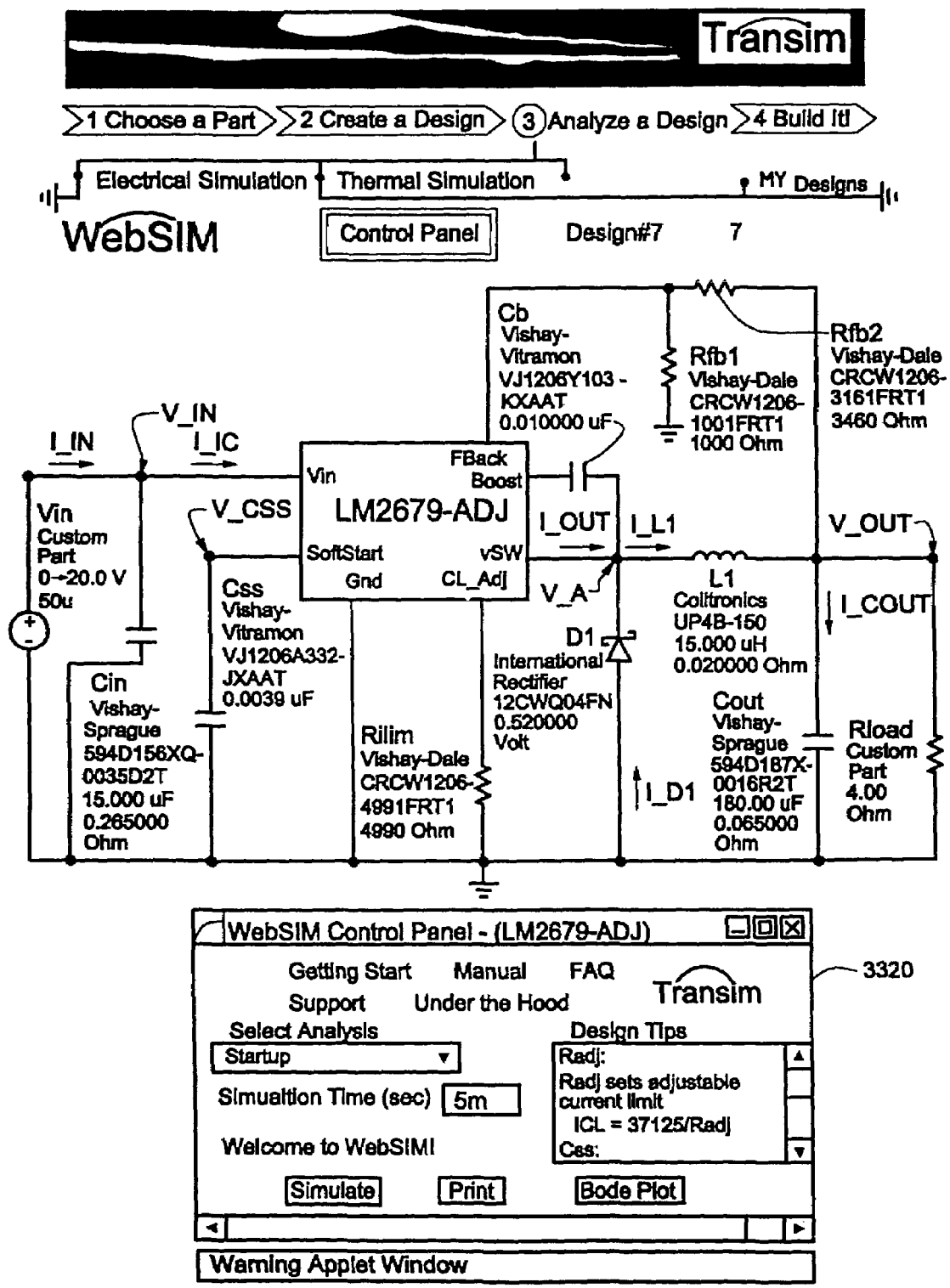
FIG. 33 shows an exemplary web page for starting a startup analysis simulation.

FIG. 33 shows an exemplary web page for starting a startup analysis simulation, according to an embodiment of the invention. As illustrated in the figure, WebSIM control panel 3320 illustrates a startup simulation running for a simulation time of 5 milliseconds. When performing a startup analysis the user may enter a new simulation time into the simulation time input box. To start the simulation the user selects the simulate button.

Figure 34:
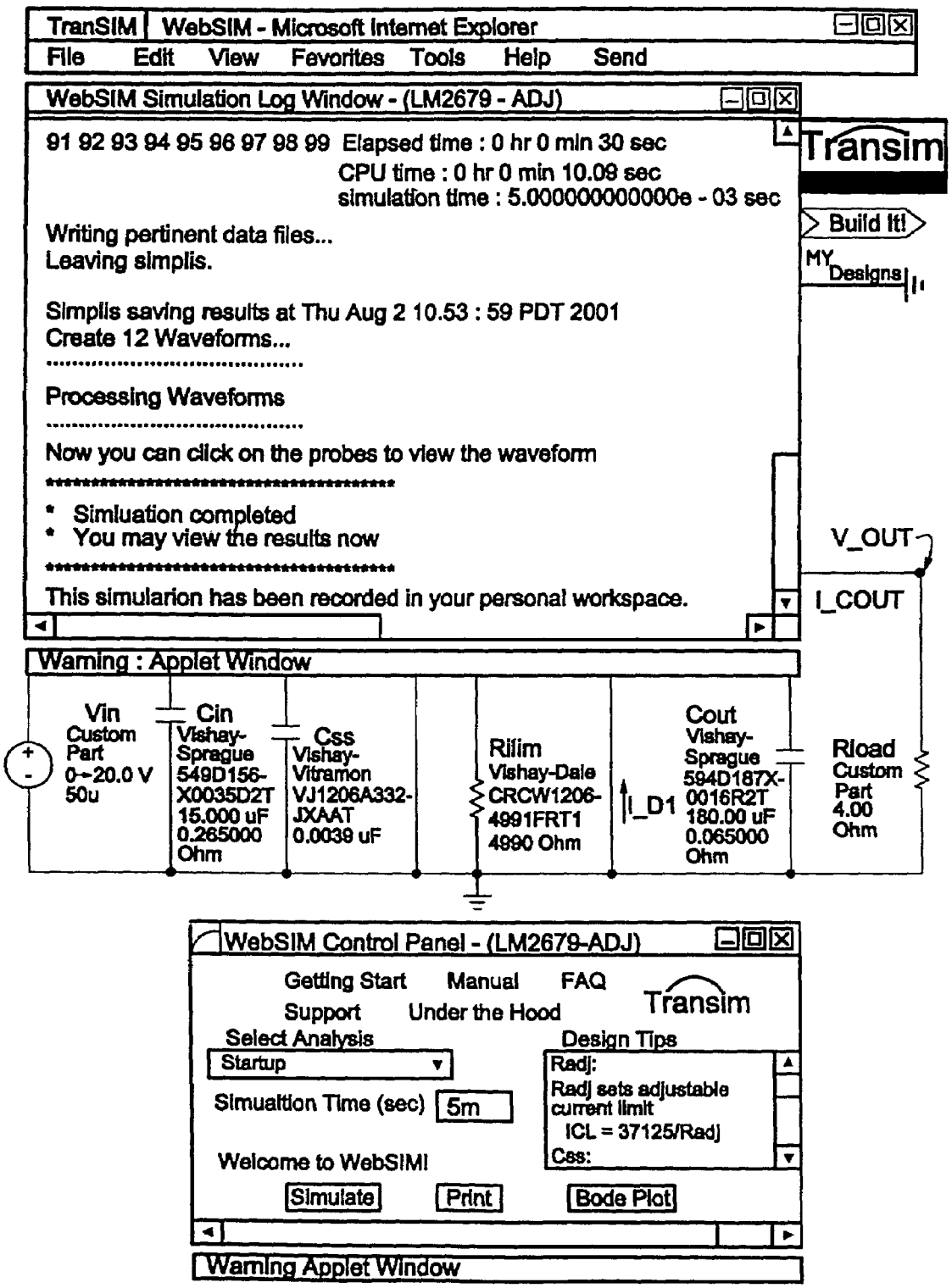
FIG. 34 illustrates an exemplary web page of a startup simulation completed.

FIG. 34 illustrates an exemplary web page of a startup simulation completed. As shown in the figure, the simulation includes a WebSIM Simulation log window that informs the user when the simulation is completed. The simulation is typically completed within a few seconds.

Once an electrical simulation is run, the user may click on voltage or current probe symbols to view waveforms. A current probe allows the user to view the current through a component in the design. The voltage probe allows the user to view the voltage with respect to ground.

Figure 35:
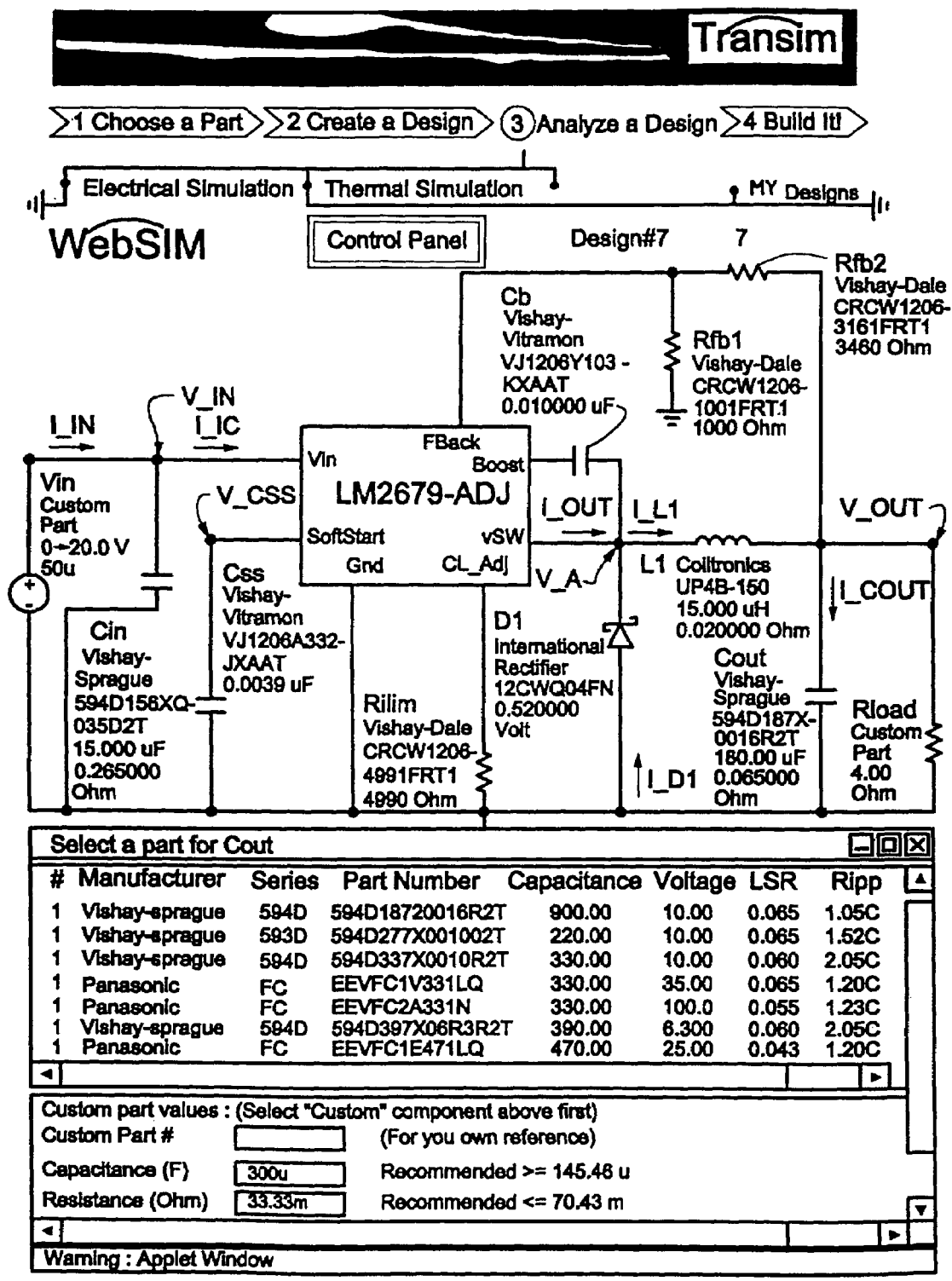
FIG. 35 shows an exemplary web page for selecting a different component within the circuit.

FIG. 35 shows an exemplary web page for selecting a different component within the circuit in accordance with aspects of the invention. The simulation tool allows the user to select alternate components within the circuit and change operating values. According to one embodiment of the invention, the user selects the component to adjust or change its properties. According to the present example, the user has selected the Cout component within the schematic. In response to the selection, the Select a part for Cout window appears listing various components that the user may choose from. The user may also enter custom values and include a reference part number to keep track of the custom part.

Figure 36:
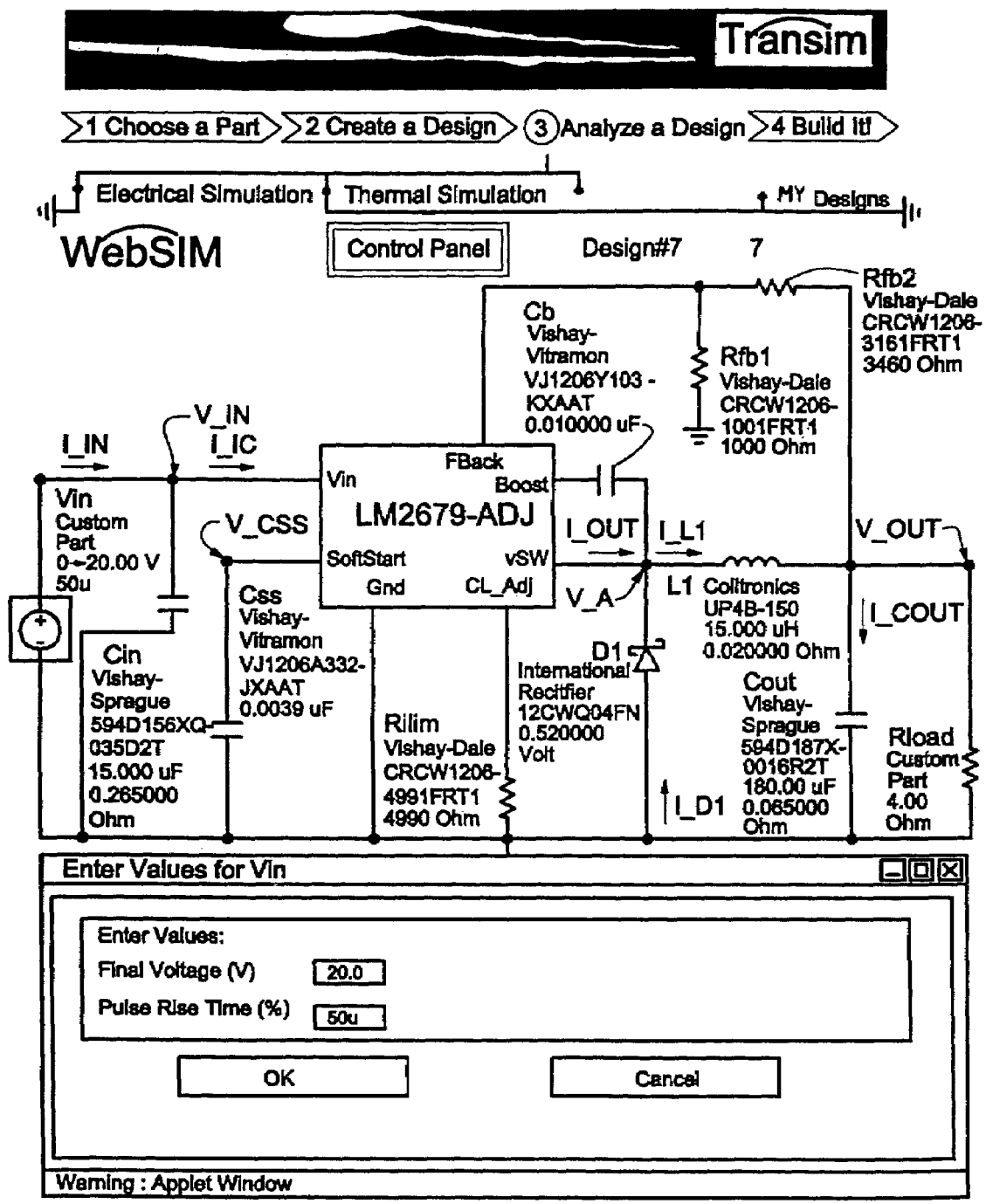
FIG. 36 illustrates an exemplary web page for changing an operating value within the circuit.

FIG. 36 illustrates an exemplary web page for changing an operating value within the circuit, according to an embodiment of the invention. The operating values may be changed by selecting the node or component within the schematic diagram. According to the present example, the user has selected Vin. In response to the selection of Vin the Enter Values for Vin window appears. The user may enter the final voltage as well as the pulse rise time.

Figure 37:
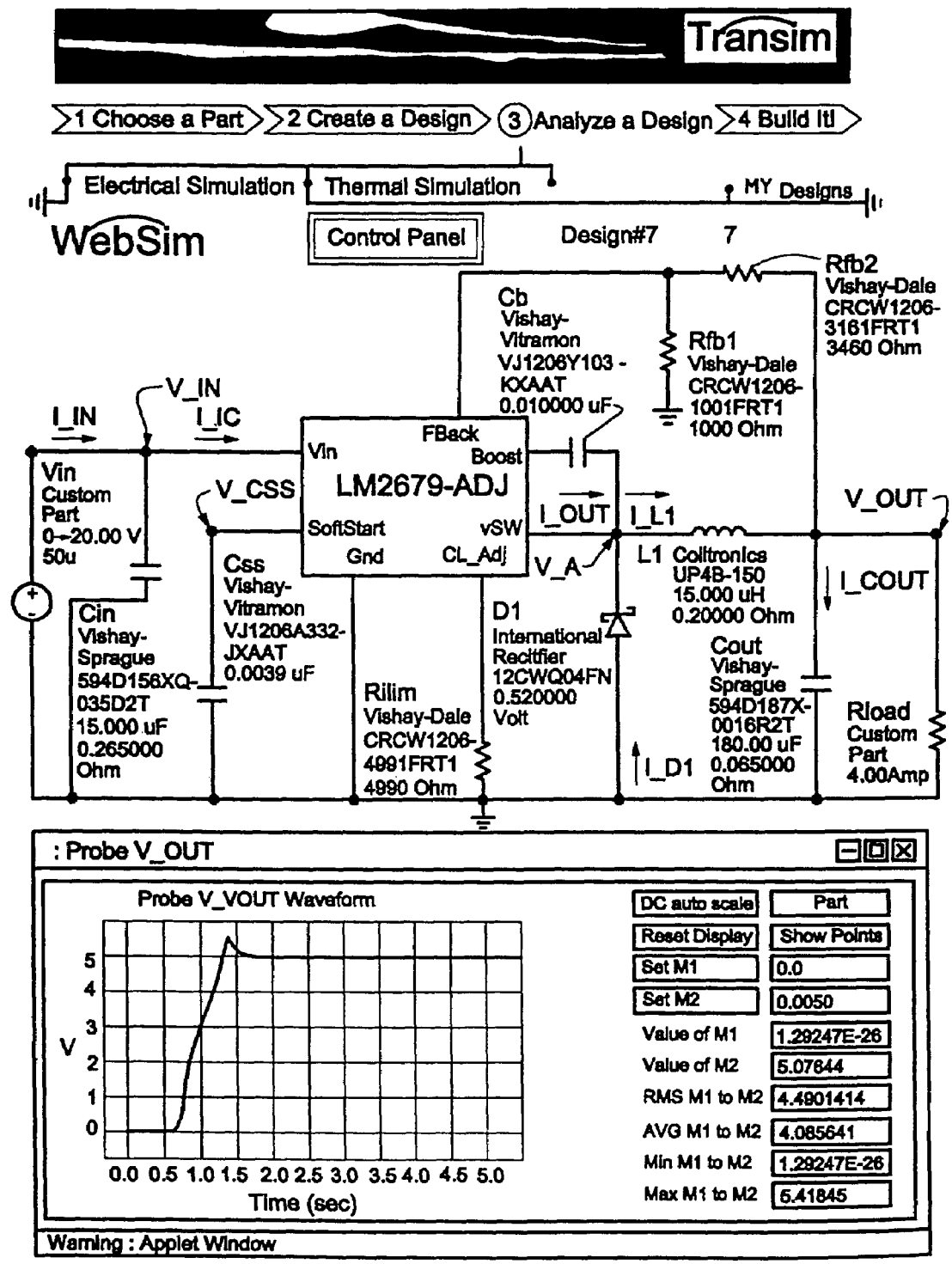
FIG. 37 illustrates an exemplary web page for a waveform associated with the simulation of the circuit.

FIG. 37 illustrates an exemplary web page for probing a waveform associated with the simulation of the circuit, in accordance with aspects of the invention. In response to selecting the V_OUT node after an electrical simulation has been run, the Probe V_OUT window appears. The graph updates if a component or value is changed. In this particular case, with an input voltage step of 0V to 20V in 50 µs, V_OUT rises to the target value of 5V in about 1.2 milliseconds with a bit of overshoot. The SetM1 and SetM2 buttons may be used create measurement bars within the waveform graph.

Figure 38:
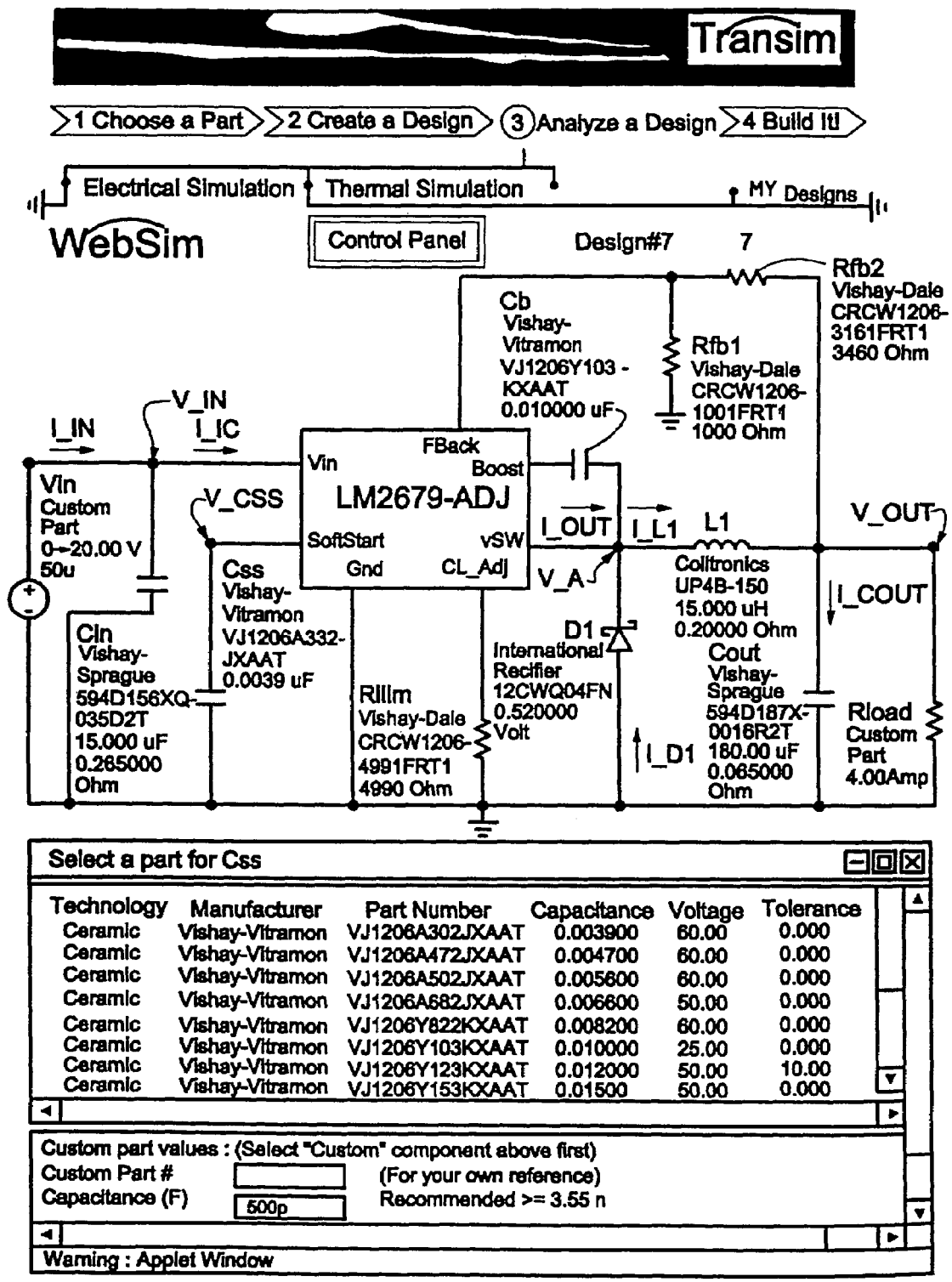
FIG. 38 shows an exemplary web page for selecting a different component within the circuit.

FIG. 38 shows an exemplary web page for selecting a different component within the circuit to adjust the rise time of the circuit according to an embodiment of the invention. The rise time can be controlled by adjusting soft start capacitor Css within the circuit. In response to selecting the Css component the Select a part for Css window appears. The select window shows alternative parts that may be selected. According to the present example, the user has selected the second capacitor changing the capacitance from 0.0039 to 0.0047. The user then runs another simulation to determine what effect changing the Css component has on rise time.

Figure 39:
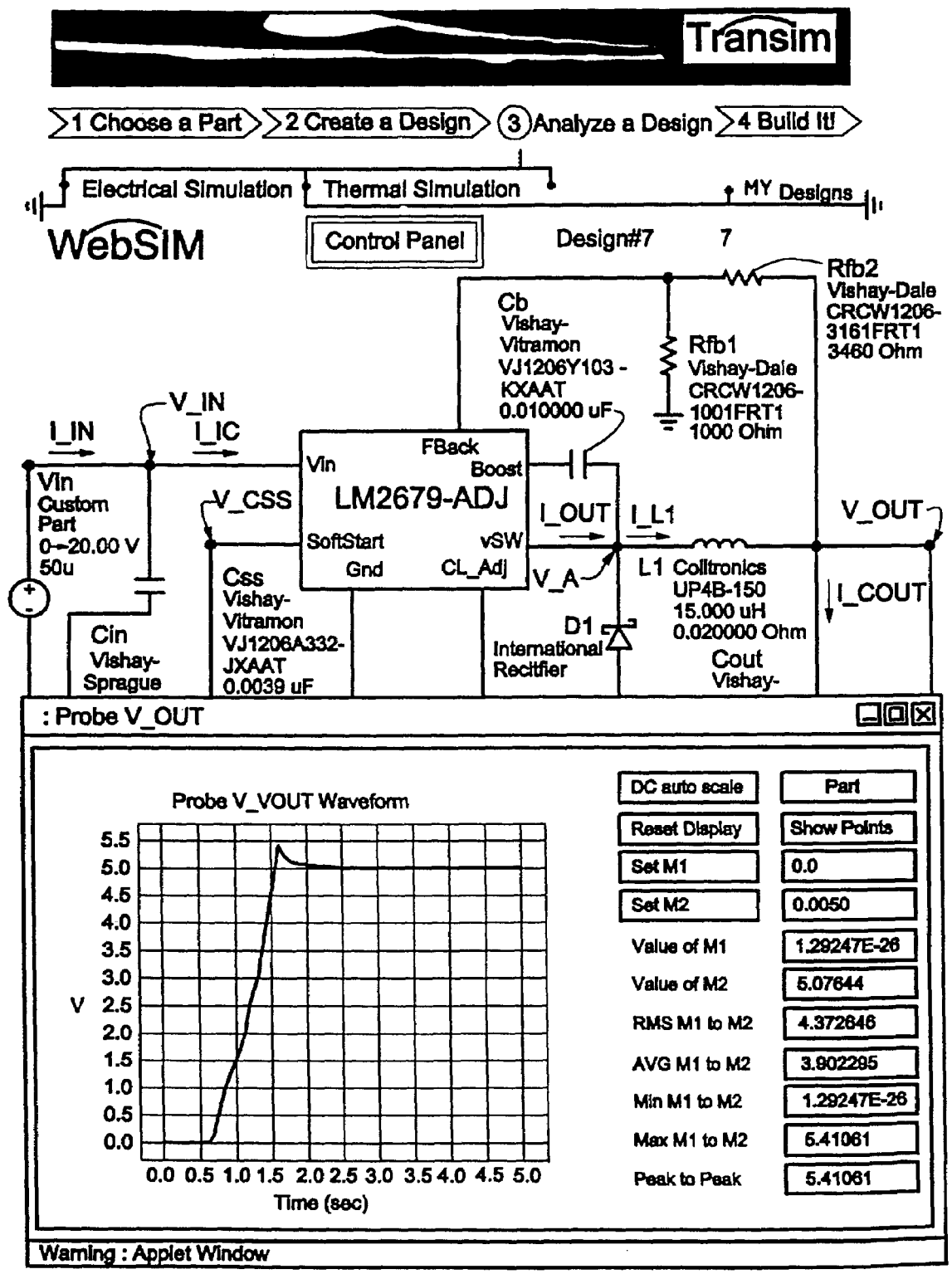
FIG. 39 illustrates an exemplary web page for a waveform associated with the simulation of the circuit after an alternate component has been selected and a new electrical simulation completed.

FIG. 39 illustrates an exemplary web page for a waveform associated with the simulation of the circuit after an alternate component has been selected and a new electrical simulation completed. In response to selecting the V_OUT node after the simulation has been completed the Probe V_OUT window appears. As can be seen by referring to the figure, the rise time has increased to about 1.5 milliseconds. The user may continue to change parameters or components until their specifications have been met.

Figure 40:
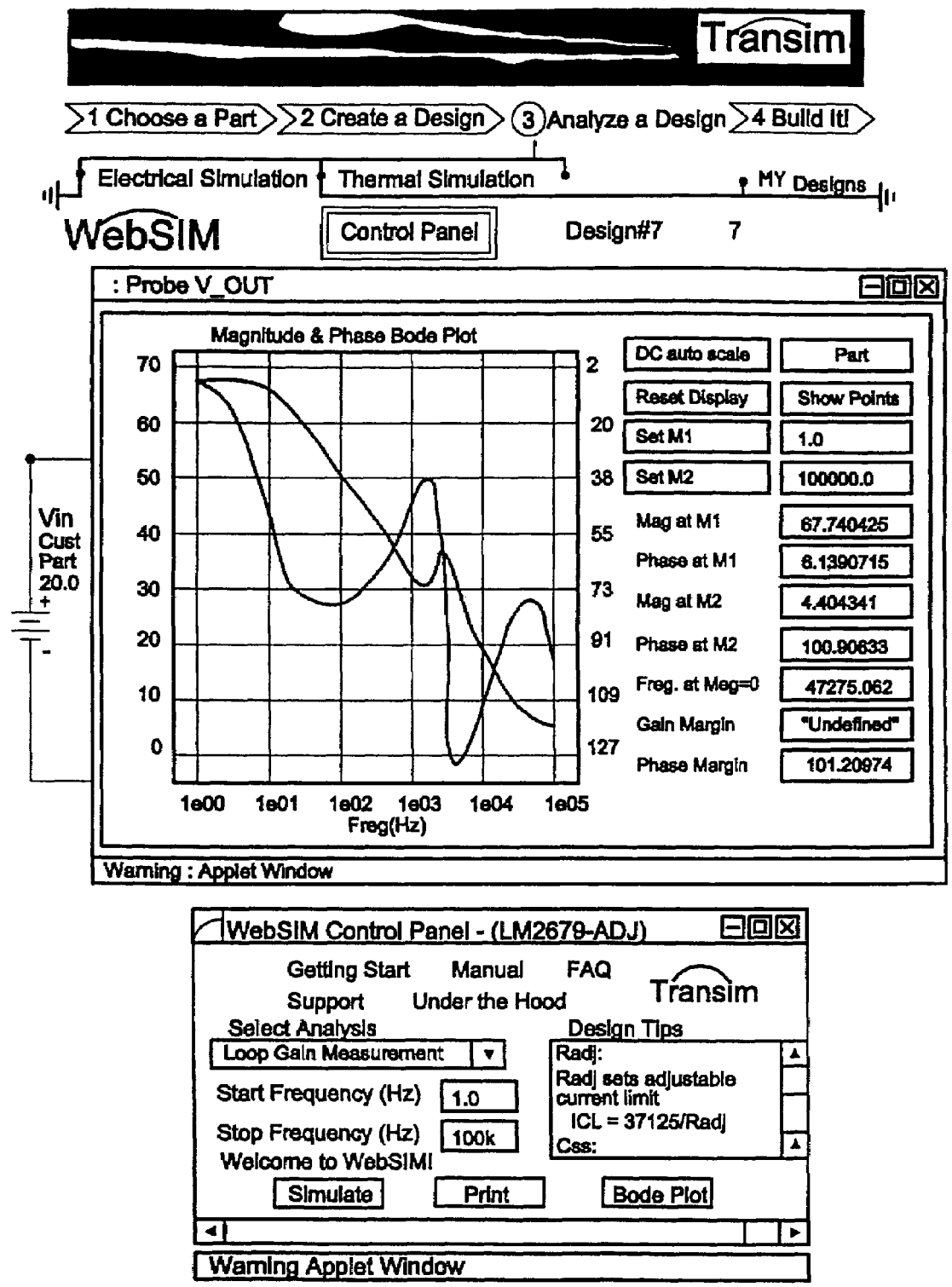
FIG. 40 illustrates an exemplary web page for a bode plot associated with the simulation of the circuit.

FIG. 40 illustrates an exemplary web page for a bode plot associated with the simulation of the circuit, in accordance with aspects of the invention. According to the present example, a user has selected the Bode Plot button to view a Magnitude and Phase Bode Plot. In response to the selection of the Bode Plot button the Probe BODE_PLOTS window appears. The user is provided with graphical waveforms illustrating the magnitude and phase as well as values displayed as text at various points within the graph. According to one embodiment, the magnitude and phase at the M1 and M2 marker is provided. The frequency at magnitude zero, the gain margin, and the phase margin is also provided.

At any point during the simulation process the user may select the thermal simulation link on any of the exemplary web pages to perform a thermal simulation of the circuit. Similarly, when within a thermal simulation, the user may select the electrical simulation button to perform an electrical simulation.

Thermal Simulation

The user may select a control from one of the previous exemplary web pages to create a thermal simulation. For example, the user may select link 1010 (FIG. 10A) or button 1014 (FIG. 10A), which takes the user to another page that allows selection of the thermal simulator. The user may elect to perform a thermal simulation at any time during the process after the user has chosen the components for the circuit.

Figure 15:
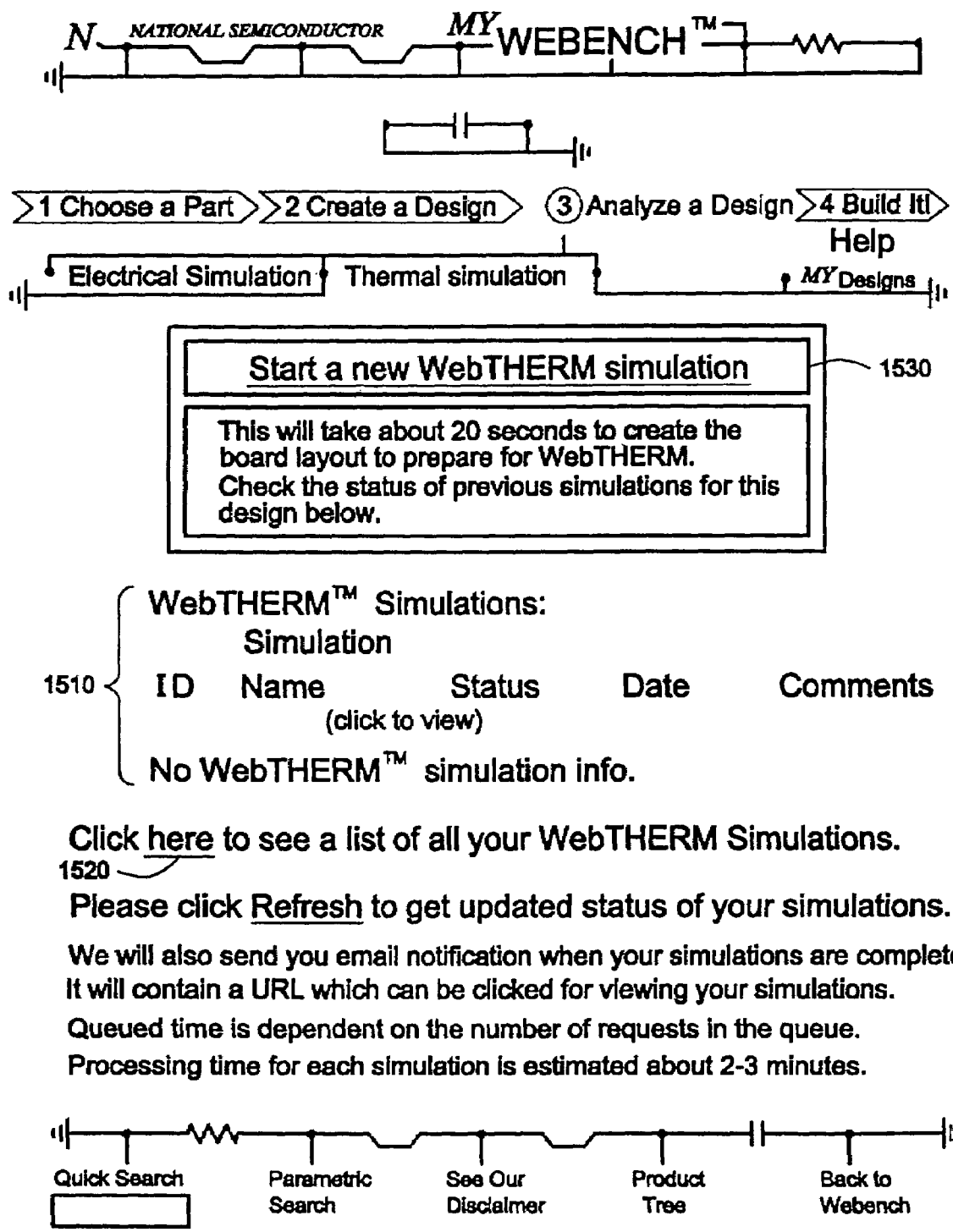
FIG. 15 illustrates an exemplary web page listing instructions to conduct a thermal simulation.

Referring to FIG. 15, an exemplary web page is displayed which lists instructions to conduct the thermal simulation. The web page includes a list with links 1510 to any previous thermal simulations that have been performed for the current design. Link 1520 provides access to all thermal simulations conducted by the user for all designs. To start a new thermal simulation of the circuit the user selects the Start a new WEBTHERM simulation link 1530. Selecting link 1530 directs thermal simulation module 422 to display a thermal simulation setup web page.

Figure 16A:
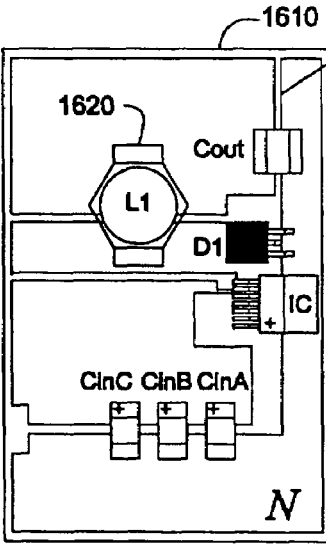

FIGS. 16A and 16B show an exemplary web screen illustrating setup of thermal simulation of the circuit designed according to the user's requirements. The thermal simulation helps the user to identify heat problems on the printed circuit board early on in the design process and correct the issues before the board goes into production. This can save a lot of time and avoid costly quality accidents.

Briefly described, the thermal tool simulates the thermal behavior of an electronic printed circuit board having components. The thermal simulator uses validated thermal models for the components and the reference PCB. According to one embodiment of the invention, thermal simulation module 422 used to conduct the thermal simulations is WebTHERM module provided by Flomerics, Inc. The user defines the environment, and the problem is solved using the thermal simulator's conduction, radiation and convection solver. According to one embodiment of the invention, the output of the thermal simulation is a color plot of the PC board under the design's steady state electrical load conditions. No special hardware is required to run the thermal simulation. Instead, the user views the thermal simulation in the web browser. Designers may seamlessly qualify their designs from a thermal and electrical standpoint. Integration of these tasks over a network is a major improvement in design accuracy and can save a significant amount of time in the design cycle.

When the new simulation button (link 1530 as shown in FIG. 15) is selected, a screen appears with a drawing of the printed circuit board layout 1610 for the design, and areas that allow the user to specify options for thermal simulation. A picture of the physical layout of the PC board appears in the user's web browser, showing the placement of each component and the copper routing. There are controls for adjusting characteristics for the thermal simulation, including controls for the board orientation, edge temperature and airflow direction and speed, copper thickness, operating input voltage and operating output current, and board orientation, which allow the user to adjust parameters for the simulation.

Printed circuit board display 1610 consists of copper interconnect lines 1615 and top view drawings 1620 of the various components for the design which are placed in the appropriate positions on PCB 1625. These components may include parts from many different sources. According to other embodiments, the board and components may be displayed differently. For example, a three-dimensional representation of the board may be displayed to the user.

According to another embodiment of the invention, the user may specify alternate locations for the components on the PCB or alternate copper interconnect lines or routing of the lines. Additionally, the user may click on a select alternate components button for a given component directly from the screen. The user may then select alternate components to replace the selected component or obtain additional information about these components. The user could also manually enter the component's values in a custom component input box.

According to another embodiment, the user may move the components on the PCB. According to one embodiment, the user is limited to moving the components within specified regions of the PCB to help ensure assure that the electrical connections are maintained. This allows the user to move the components farther apart or closer together which is an important factor affecting the temperature of the board and components.

According to yet another embodiment, the user may change the location and size of the copper areas on the board by clicking on a copper shape, which brings up controls to change the size and/or move the copper shape. Changing the copper area on the board affects the thermal characteristics of the design.

Referring to FIGS. 16A and 16B, temperature characteristics of the circuit may be specified by the user. For example, the edge temperature of the board may be specified as insulated or a specific temperature. These characteristics are specified in input boxes 1630, 1635, 1640, and 1645 adjacent to the corresponding edges of PCB 1625. The input boxes have a check box to specify insulated and another input box that allows the user to enter the edge temperature. According to one embodiment, when the user checks insulated, the edge temperature changes to N/A or dims out. If the user enters a specific temperature, the insulated check box is automatically unchecked.

Controls 1650 allow the user to specify the ambient temperature around the top (component) side and bottom side of the board. Controls (not shown) may be provided to specify the ambient temperature at different locations of the board. Airflow controls 1655 allow the speed and direction of the airflow to be specified. According to one embodiment, the direction of airflow is specified by clicking on a radio button in an array of radio buttons surrounding a picture of a board. The radio button clicked specifies which side of the board the airflow comes from. According to one embodiment, the airflow may be adjusted to come from any point, or points, from around the board.

Simulation ID input box 1660 allows the user to enter a text name for the simulation. The user may also enter comments about the simulation in comments input box 1665.

Control 1680 allows the user to change the copper weight of the board.

After entering the desired parameters for simulation, the user submits the simulation job to thermal simulation module 422 by selecting submit button 1670. A status screen then appears to allow the user to check the simulation progress. A simulation typically takes two to three minutes to complete, excluding queue time. This time varies according to many different factors, including: complexity of simulation, demand on server, network conditions, and the like.

FIGS. 17-19 illustrate exemplary simulation status screens. After the user submits the simulation, the simulation status screen appears. The status of all the simulations is indicated in a table along with the time at which that status began. The status is "queued" (See FIG. 17), "processing" (See FIG. 18) or "completed" (See FIG. 19). At any point during the simulation, the user may select refresh button 1710 to update the status of the simulation. When a simulation is completed, the user may click on the appropriate simulation link in the table to view the results. After the simulation is complete, the user can view the result, a full color plot of the temperature across the board (See FIG. 19 and related discussion). The temperature of each component is also listed in an accompanying table. If desired, the user can adjust parameters and resubmit the job for simulation.

Figure 20A:
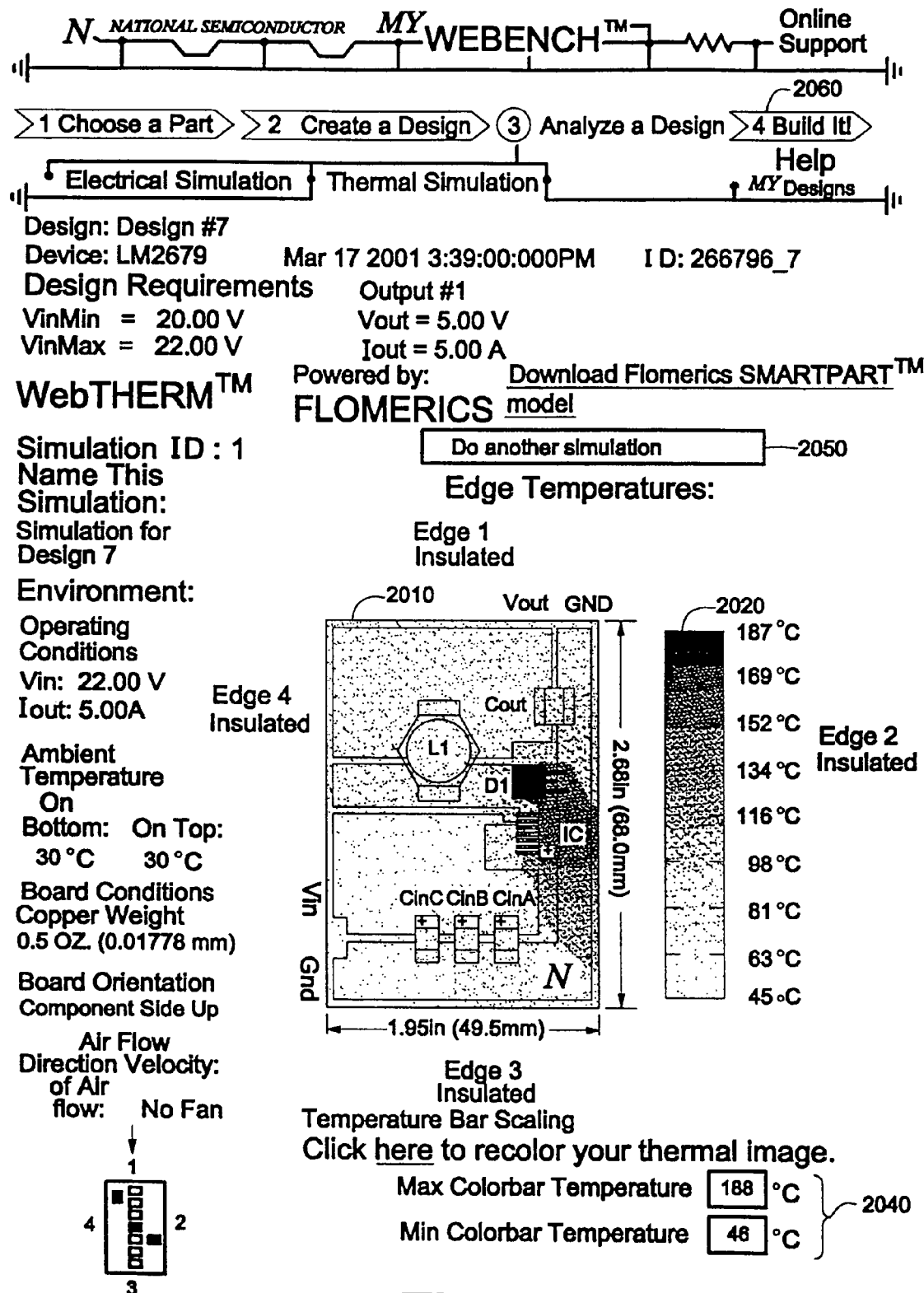

FIGS. 20A and 20B show an exemplary result of a thermal simulation. The simulation results image 2010 shows outlines of the PCB copper interconnect and components and is labeled with the names of interconnect traces and component names. Superimposed on top of the PCB copper interconnect and components is a color plot of the temperatures across the board. The color of a specific region indicates the temperature of that region. For example, variations of red may indicate hotter temperatures, while variations of blue may indicate colder temperatures. Many coloring schemes may be chosen to indicate temperature differences. All that is required is that the user be able to differentiate between areas on the board that are above a user's desired operating temperatures. According to one embodiment of the invention, the user may select the range of temperature to view. For some parts, the top surface temperature is plotted. For instance, the temperature of the top surface for passive components and the board is plotted. The temperature of an internal part, such as the die, of each component may also be plotted, since this temperature is usually the hottest part of the component. This temperature may be represented by a square or rectangle plotted within the component. The size of this square or rectangle does not have to be to scale if it is desired to conceal the die size or other internal part from the user. A scale 2020 next to the plot indicates the temperatures corresponding to the colors. As will be appreciated by those of ordinary skill in the art in view of the present disclosure, other surfaces of the components may be plotted. For example, a three-dimensional plot of the PCB board and components may be shown.

The names of each component and the numeric temperatures of each component are indicated in table 2030. The temperatures of the component may be the maximum temperature or other critical temperature such as the die temperature. The user is given the option to rescale the maximum and minimum temperatures represented in the plot of the results. This is specified in entry boxes 2040 that allow the user to enter the minimum and maximum temperatures. According to one embodiment, the user clicks on a link to initiate the rescaling process. The resealing may also automatically be done after entering a new value into entry boxes 2040. It will be appreciated by those of ordinary skill in the art, in light of the present disclosure, that the same simulation parameter displays are shown on this screen as were shown on the initial simulation launch screen. This allows the user to review the parameter values that were used in the simulation. The user may also change the parameter values and launch a new simulation from this screen. For example, suppose the user determines that the IC should only reach a maximum temperature of 130 degrees centigrade. Accordingly, the user may determine that a fan is required for the design. Suppose the user desires a fan having a velocity of 400 LFM coming from the edge closest to the IC. The user selects submit button 2050 which calls up a screen (FIGS. 16A and 16B) which allows the user to enter changes and run a new thermal simulation with the changed parameters.

Figure 21A:
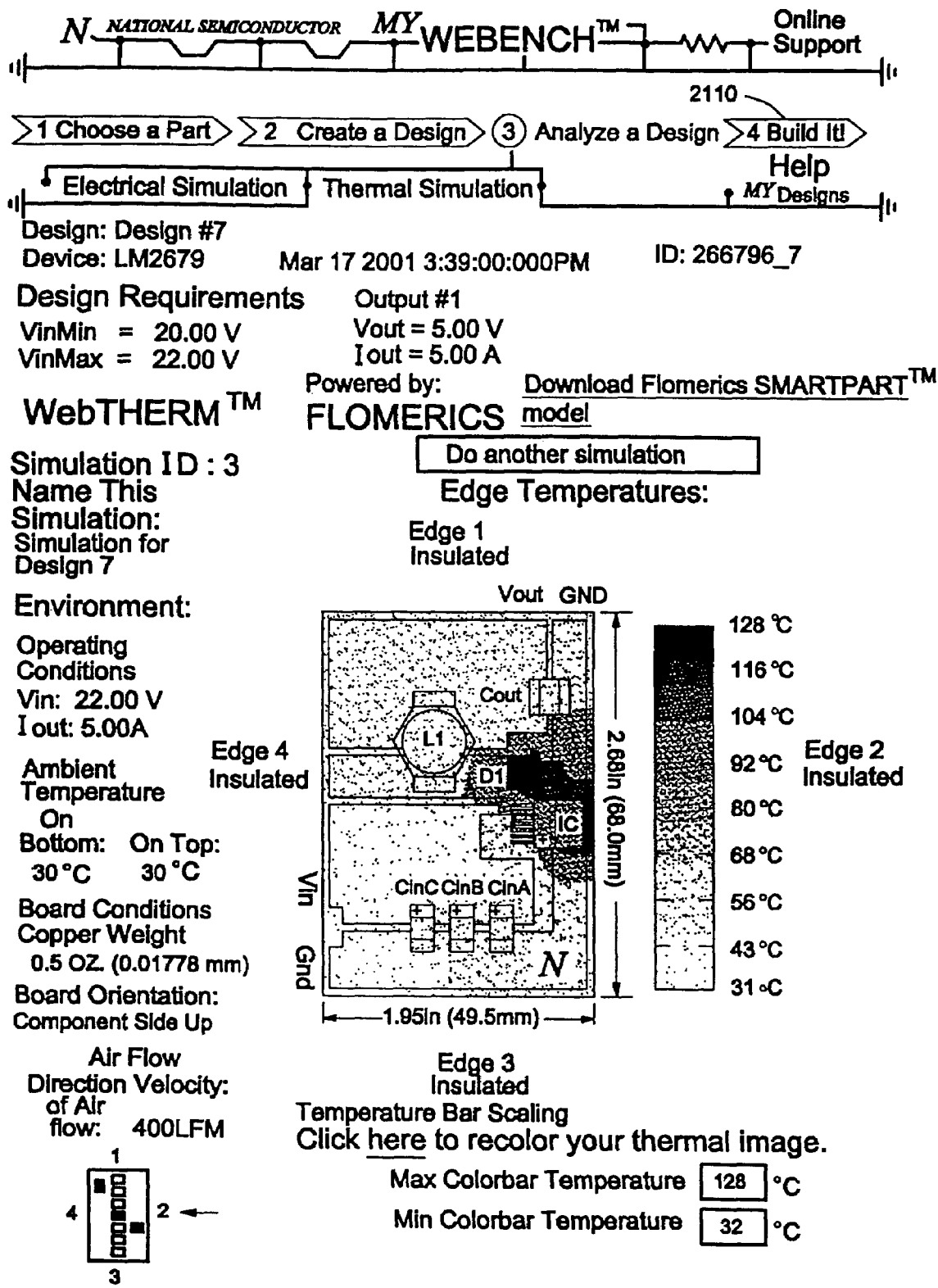

FIGS. 21A and 21B show an exemplary web page illustrating the results of the thermal simulation with the changed parameters. As can be seen by referring to FIG. 21A, the temperature of the D1-diode has dropped from 188° C. without a fan to 128° C. with the use of a fan. Once the user is satisfied with the thermal and electrical properties of the circuit, the user may order the components or kit to construct the circuit.

PCB Layout

Figure 27:
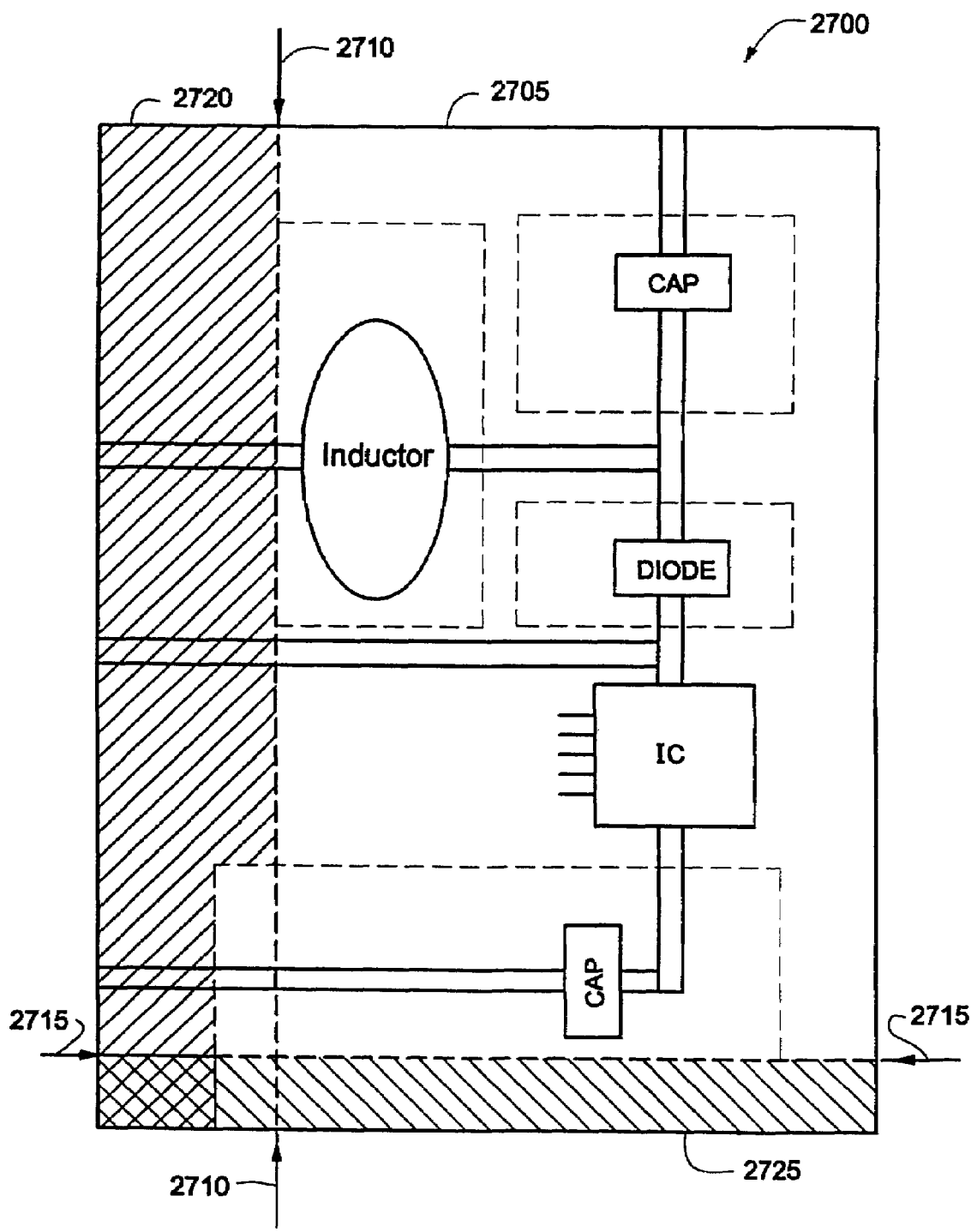
FIG. 27 illustrates cropping a PCB.

FIG. 27 illustrates cropping a PCB in accordance with aspects of the invention. As shown in the figure, cropped PCB 2700 includes circuit board 2705, width controls 2710, height controls 2715, deleted width area 2720, and deleted height area 2725. The PC board layout is created for the user by printed circuit board layout module 418 (See FIG. 4 and related discussion). The appropriate layout is selected based on critical parameters. For example, the parameters may include: the topology of the circuit, the IC selected, the size of the selected components, whether the design requires a large amount of copper to dissipate heat or a heat sink to dissipate heat, and the like.

The user may define the size of the boards by adjusting controls 2710, and 2715. By adjusting the controls, the user may remove the unnecessary copper areas from the PC board. According to one embodiment of the invention, the user may perform a thermal simulation of the board based on the newly defined board size.

Width controls 2710 may be positioned to delete a portion of the width of the board. The width may be adjusted manually by the user or automatically. The user may adjust the width of the PCB by selecting width controls 2710 and sliding the controls to a desired width. According to the present example, width controls 2710 have been moved to delete width area 2720.

Similarly, height controls 2715 may be positioned to delete a portion of the height of the board. As shown, height controls 2715 have been adjusted to delete height area 2725. A user may adjust the height of the PCB by selecting height controls 2715 and positioning the controls to remove the desired portion of the board.

After the cropping width and height of the board are determined the PCB is cropped according to the specifications. The width and height of the PCB may be cropped automatically based on the components used in the circuit. PCB layout module 418 (See FIG. 4 and related discussion) may automatically determine where the components are placed on the PCB and delete the portions of the board not used by the components.

While the component area sizes are shown for power circuits, other circuits may utilize the predetermined landing area approach. Accordingly, the areas shown in the figures may be designed to accommodate the different design requirements.

Figure 28:
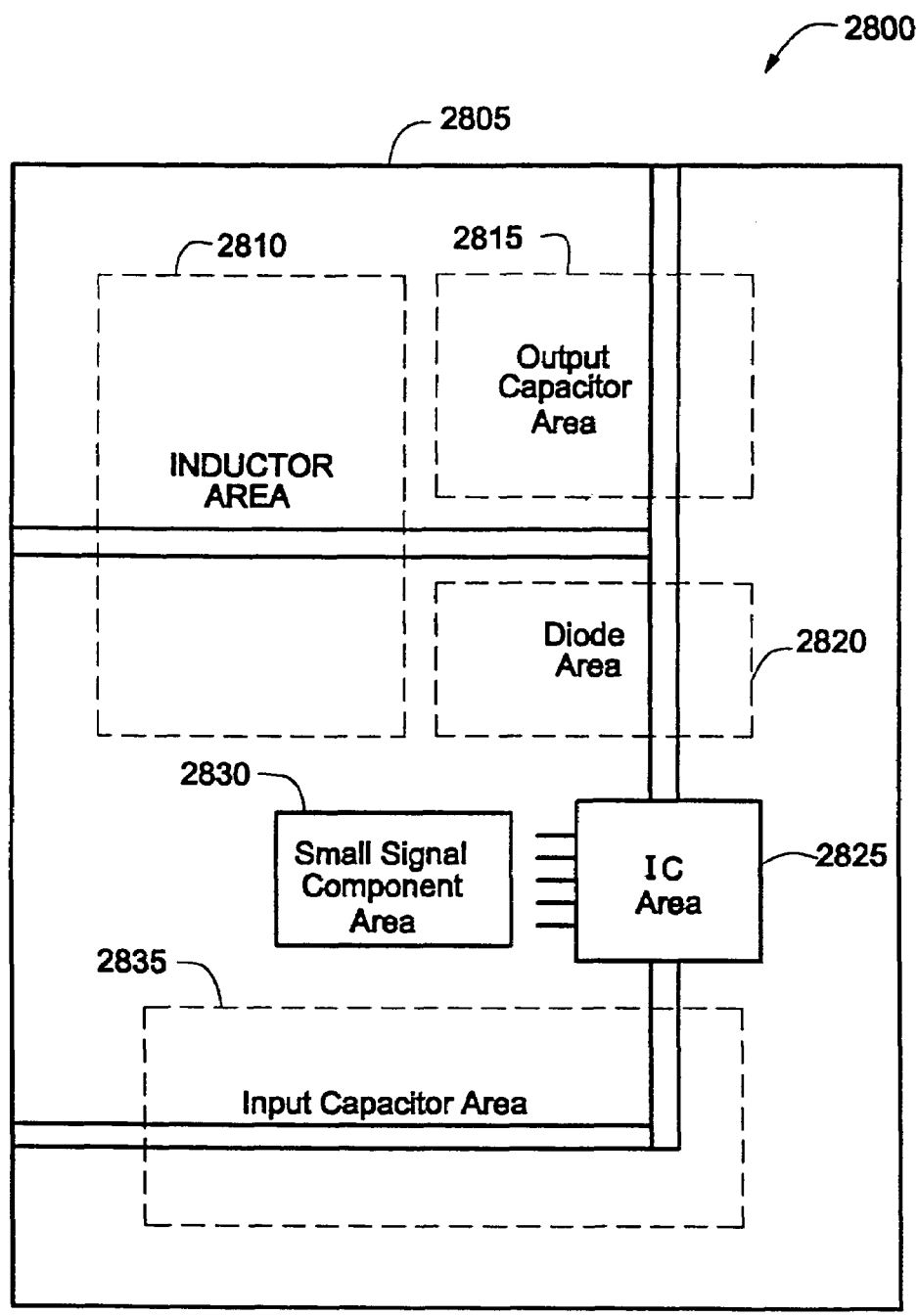
FIG. 28 illustrates the allocation areas of a PCB.

FIG. 28 illustrates the allocation areas of a PCB, according to an embodiment of the invention. As shown, PCB 2800 includes circuit board 2805, inductor area 2810, output capacitor area 2815, diode area 2820, IC area 2825, small signal component area 2830, input capacitor area 2835 and connection lines 2840.

Inductor area 2810 is sized such that there is sufficient area to place the inductors used in the design of the circuit. Output capacitor area is sized such that there is sufficient area to place the output capacitors used in the design. Diode area 2820 is sized such that there is sufficient area to place the diodes used in the design. IC area 2825 is sized such that there is sufficient space to place the IC used in the design. According to one embodiment of the invention, the IC used in the design is placed in a fixed location on circuit board 2805. Small signal component area 2830 is sized such that there is sufficient space to place the small signal components used in the design. According to one embodiment of the invention, the small signal components utilized are placed at fixed locations within small signal component area 2830. Input capacitor area 2835 is sized such that there is sufficient area to place the input capacitors used in the design.

Figure 29A:
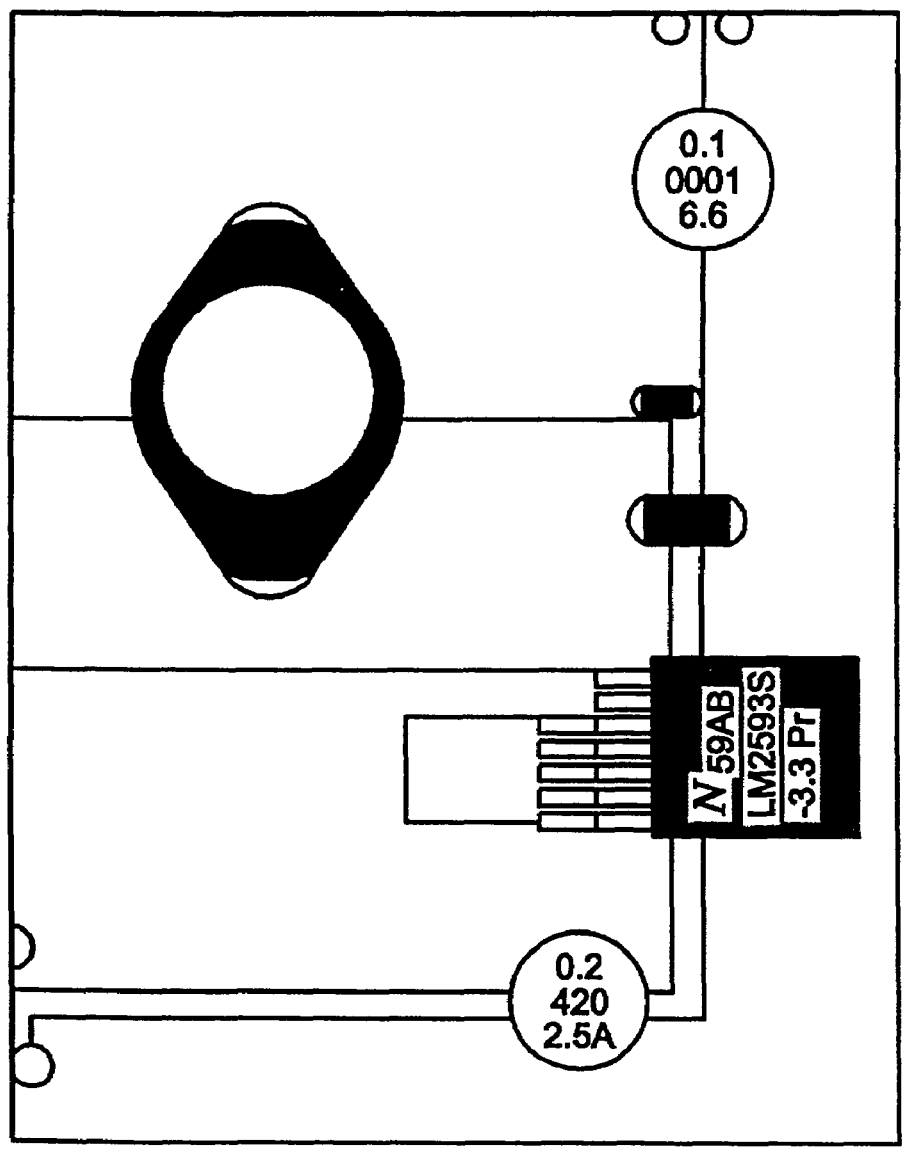
FIGS. 29A and 29B illustrate exemplary PC board (PCB) layouts.
Figure 29B:
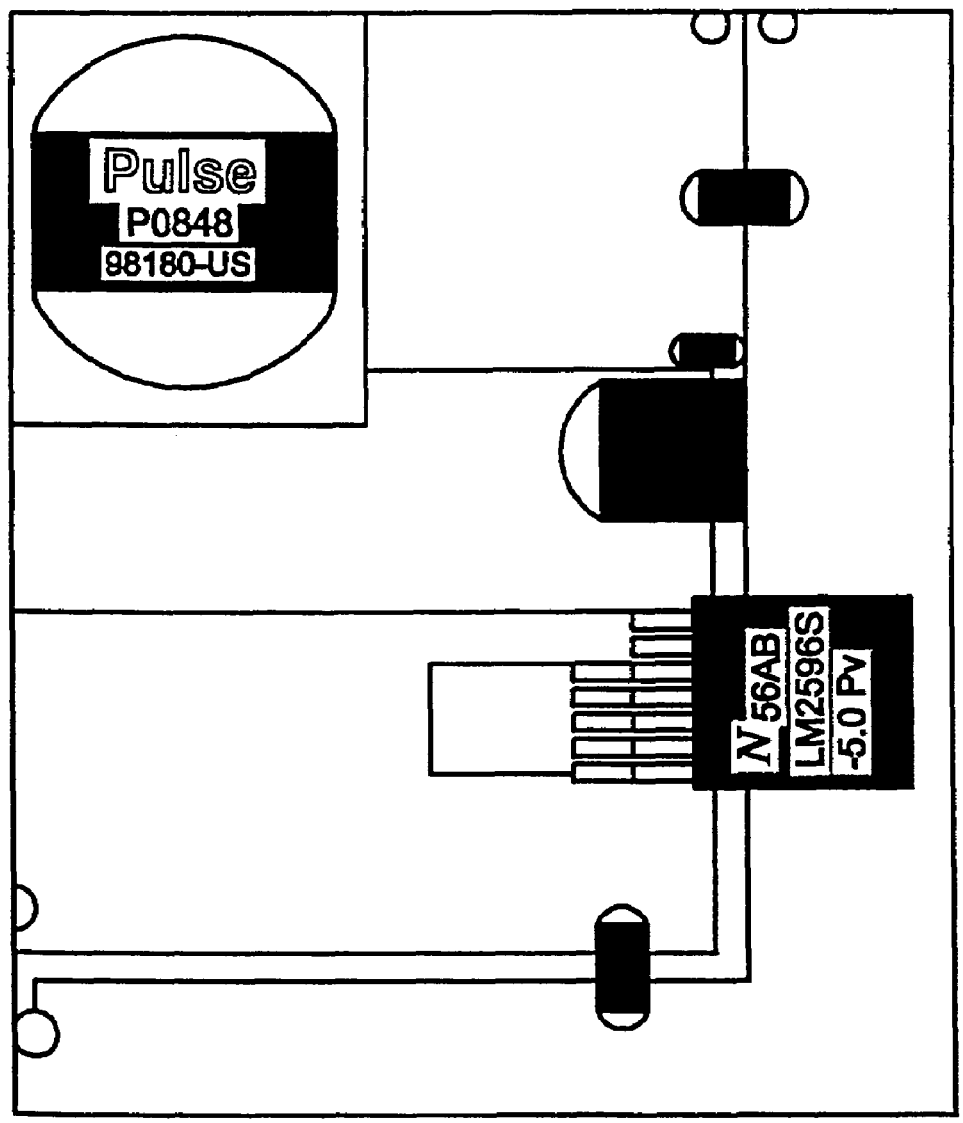

FIGS. 29A and 29B illustrate exemplary PC board (PCB) layouts. The PCB layout of the design is created such that the landing pads for the components used are large enough to accommodate many different sizes and varieties of surface mount components, which may vary from design to design. Some of the parts, such as the IC may be through hole mount if these parts conform to a specific pin pattern specified for that board. This way, one PCB layout may be used for many different designs. For example, a PCB layout may be set up for the pinout of a specific National Semiconductor device such as the LM2678. The copper traces leading into this part are small since this part does not change in size from design to design for that layout. However, to accommodate the essentially infinite number of combinations of accompanying components, which vary in size and shape, the landing pads for these components are made large enough and spaced closely enough to accommodate the different sizes of components foreseen for that PCB layout.

Building the Circuit

According to one embodiment, one or more of the web pages provided to the user include a control which, when selected, invokes component acquisition module 424. The component acquisition module 424, in turn, provides one or more component acquisition web pages to the user. The component acquisition web pages include information and/or controls for ordering the components from which the generated circuit is constructed.

In the embodiment illustrated in the figures, a "Build It" link button 2060 (See FIG. 20A) is provided which, when selected, provides component acquisition web pages to the user. The component acquisition web page presented to the user in response to selection of build it button 2110 may, for example, contain the information shown in FIGS. 22A and 22B.

FIGS. 22A and 22B show an exemplary BUILD IT web page. The build it page includes a bill of materials section that identifies the list of the parts used in the circuit. A user can check to see if the parts are in stock and get pricing information for the components. Graphical representations of the components are also included in the bill of materials if they are available.

Selecting button 2220 on the BUILD IT page allows the user to view an assembly diagram document for the board that shows the locations of all the components and gives assembly and soldering instructions. This document may also be e-mailed to the user or made downloadable to the user in various formats.

FIGS. 23A-23F illustrate an exemplary assembly diagram document according to one embodiment of the invention. The assembly diagram document includes an assembly diagram, bill of materials, an electrical schematic, topside and bottom side copper lay out diagrams, and instructions for building and testing the power supply. The assembly diagram also includes buttons allowing the user to download the board layout or schematic in Protel format, and the Gerber file for making the board. The information contained within the assembly diagram is automatically created by the system.

Referring again to FIG. 22A, the user may select documentation relating to the circuit by selecting documentation button 2210.

FIG. 24 shows an exemplary documentation page provided to the user after selecting documentation button 2210. From the Design Doc link the user may obtain the previously described assembly document. Also, by clicking link 2440, the full documentation of the design (Design Document) including the specifications, operating values and thermal simulation results can be obtained. A detailed summary of the integrated circuit with links to the datasheet and application notes is available by selecting the Product Folder button 2420 associated with the selected IC. Downloadable schematics, layout and Gerber files are also available. This enables the user to easily integrate the design into the user's local CAD environment. According to one embodiment of the invention, the schematic and layout files are in Protel format. According to other embodiments of the invention, other layout formats may be provided. The Gerber file is for the custom board used for this design.

FIGS. 25A-25E illustrate an exemplary design document, according to one embodiment of the invention. The design document includes many sections, including: an introduction; design specifications; schematic; operating values; information on the selected IC; a bill of materials; thermal simulation results; BuildIt! Information; and appendices including additional information, such as the number of thermal simulations performed on the design.

Returning to FIGS. 22A and 22B, when the user is has completed reviewing the bill of materials and other information, the user may click on the Order this Kit button 2230 to order the kit. According to one embodiment, the party that would handle the order of a single component would be the manufacturer or distributor of the component. However, the party that handles the "kit" order may be a third party. In response to the order of a kit, the party from whom the kit is ordered places corresponding component orders with the component manufacturers or obtains the parts from a local stock in a warehouse. The process of placing the corresponding component order can be executed automatically upon receipt and approval of a kit order.

If the user selects Order this Kit button 2230, the user will have the ability to receive the components and bare PC board to make the circuit. However, the user may prefer to receive the circuit itself, already assembled. Therefore, the user may alternatively or additionally be presented with an "order built-up board" button (not shown), which, when selected, causes the components, and optionally a PC board, to be ordered and sent to a circuit board assembler. The circuit board assembler assembles the circuit board from the ordered components and delivers the custom-assembled circuit board to the user that placed the order.

Under some circumstances, circuit board manufacturers may already have prefabricated circuit boards that are similar to the automatically designed circuit, or they may have to generate one specifically for the design. According to one embodiment, the server-side database includes information about such prefabricated circuit boards, and presents them to the user when the similarity between the prefabricated boards and the users requirements exceeds a predetermined similarity threshold. The prefabricated boards may be presented, for example, on the suggested component web page, the bill of materials web page, and/or the component acquisition web page, or the thermal simulation launch page where the amount of copper area for each board option is presented as a parameter to the user.

Persistent Storage of Designs

A user may not be prepared to order the components of a circuit during the same session in which the circuit is generated for the user using the techniques described above. Therefore, according to one embodiment of the invention, a mechanism is provided for storing the designs persistently on a server-side storage device. The designs may be stored, for example, in a server-side database that associates the designs with the user-id of the user that created the design. The event that triggers the storage of a design in the database may be, for example, the creation of the design or making a change in the design. Alternatively, a control may be provided which, when selected, causes the designs to be saved.

FIG. 26 shows an exemplary "my designs" page. The user may select the "My Designs" button included on one of the web pages. When a user selects my designs control, a saved designs web page that lists all of the saved designs for the user is presented to the user. The saved designed web page illustrated in FIG. 26 includes listings of a user's previously saved designs. The listing includes, for each saved design, a design ID, a design name, the model number of the integrated circuit around which the design is built, the creation date of the design, modification dates to the design, the name of the "design assistant" tool used to create the design, comments, and a design operation field.

Controls are provided to allow the user to modify, analyze, build, add notes, delete, and share the design with a colleague. Selection of the controls may result in the delivery of an appropriate web page, as described above. Selection of the delete, change name or add comments controls causes corresponding information to be deleted, changed, or added to the server-side database.

The user may share a design with another user. For example, a first user may select one or more of the first user's designs, and then specify one or more second users with whom the design is to be shared. In response, the server-side database is updated to include a copy of the design for the one or more second users. Also, an e-mail is sent to the second user(s) notifying them of the event. When one of the second users is presented with a list of available saved designs, any designs that have been shared with the user are included in the list.

To share the design, the first user enters the e-mail of the second user(s). If the second user(s) in not currently registered for WEBENCH, a user ID and password are created for the new user and an e-mail is sent to the new user to notify the second user(s) of the event.

System Overview

Figure 1:
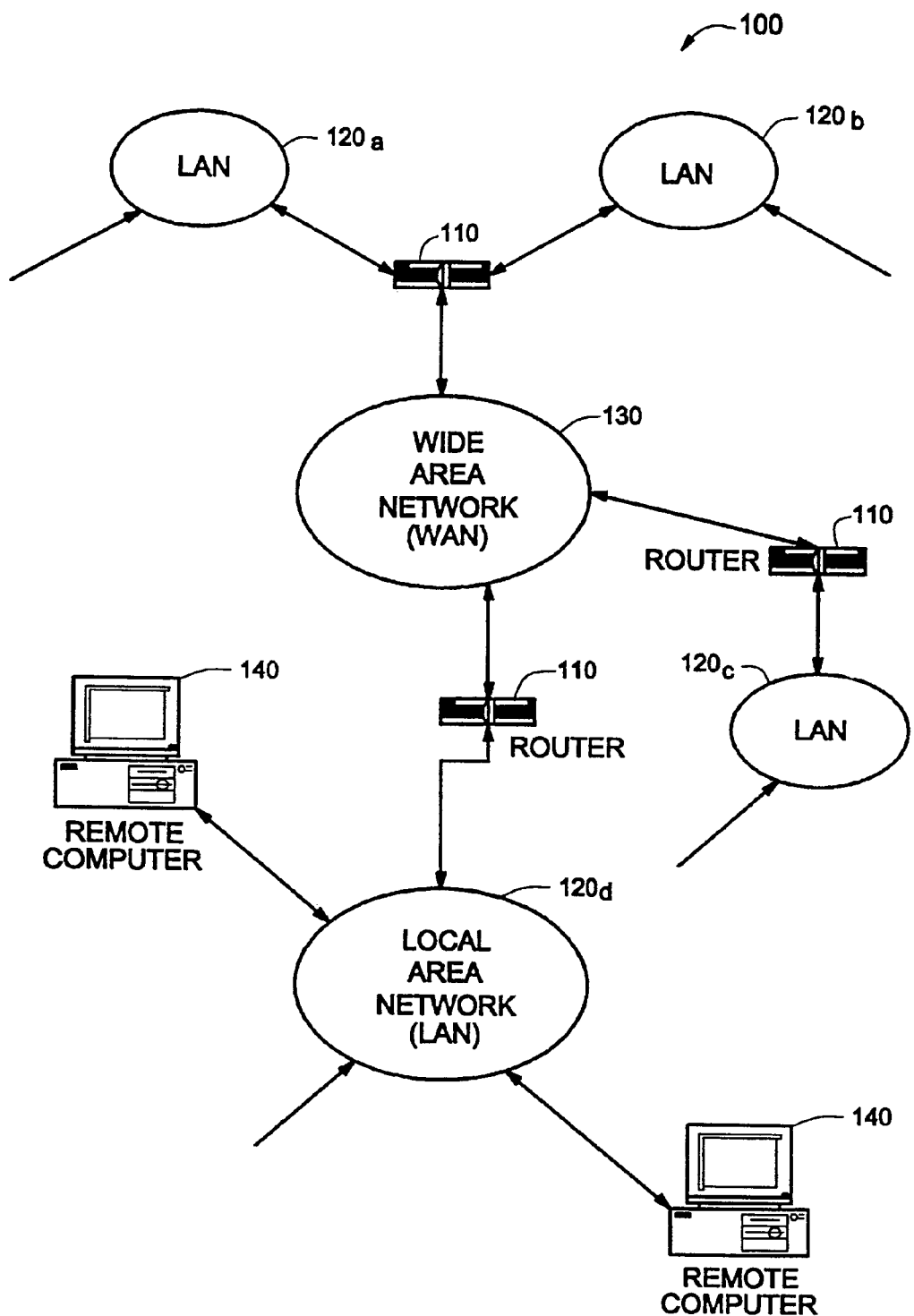
FIGS. 1-3 illustrate an exemplary environment for practicing the invention.
Figure 2:
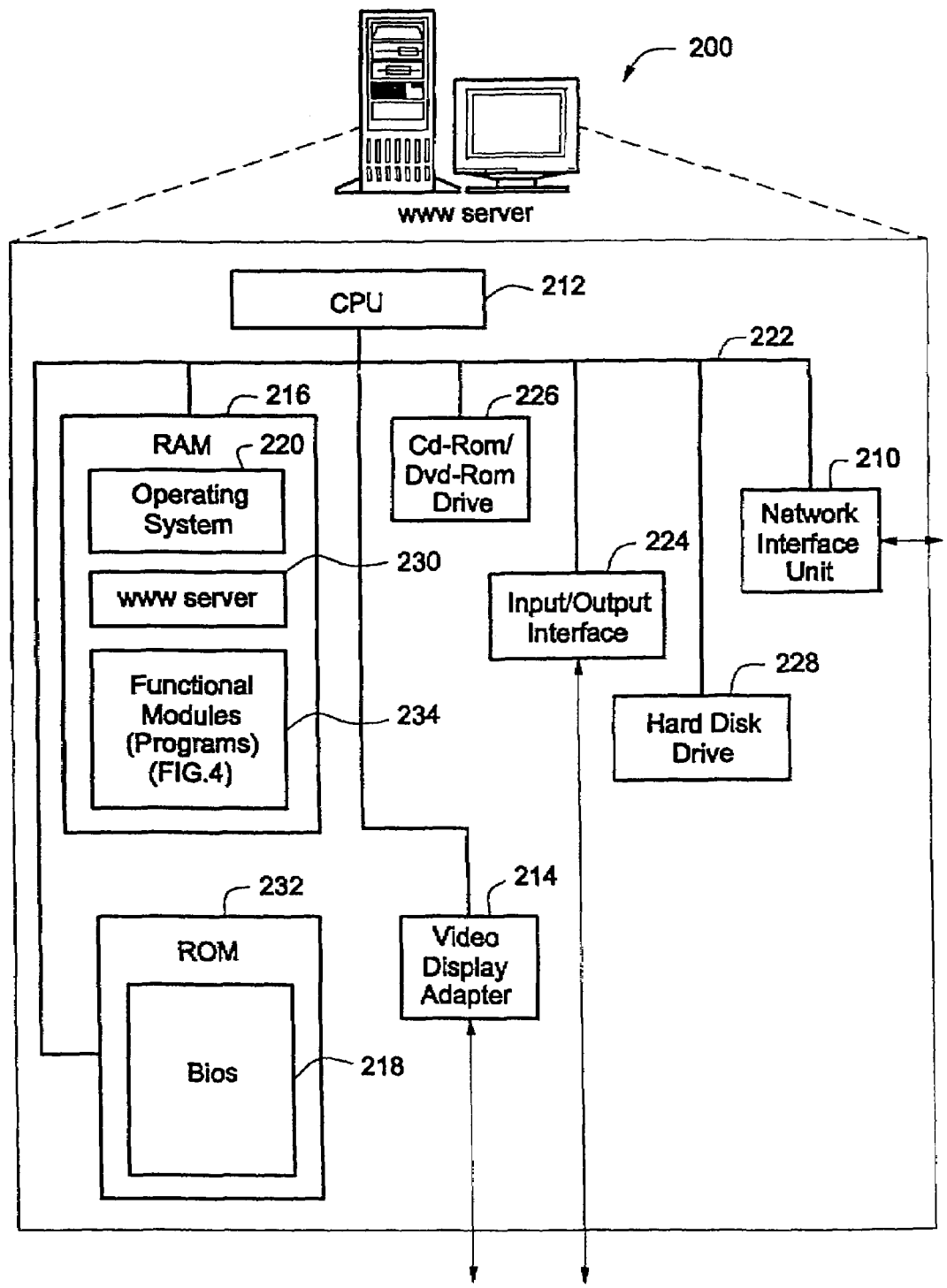
Figure 3:
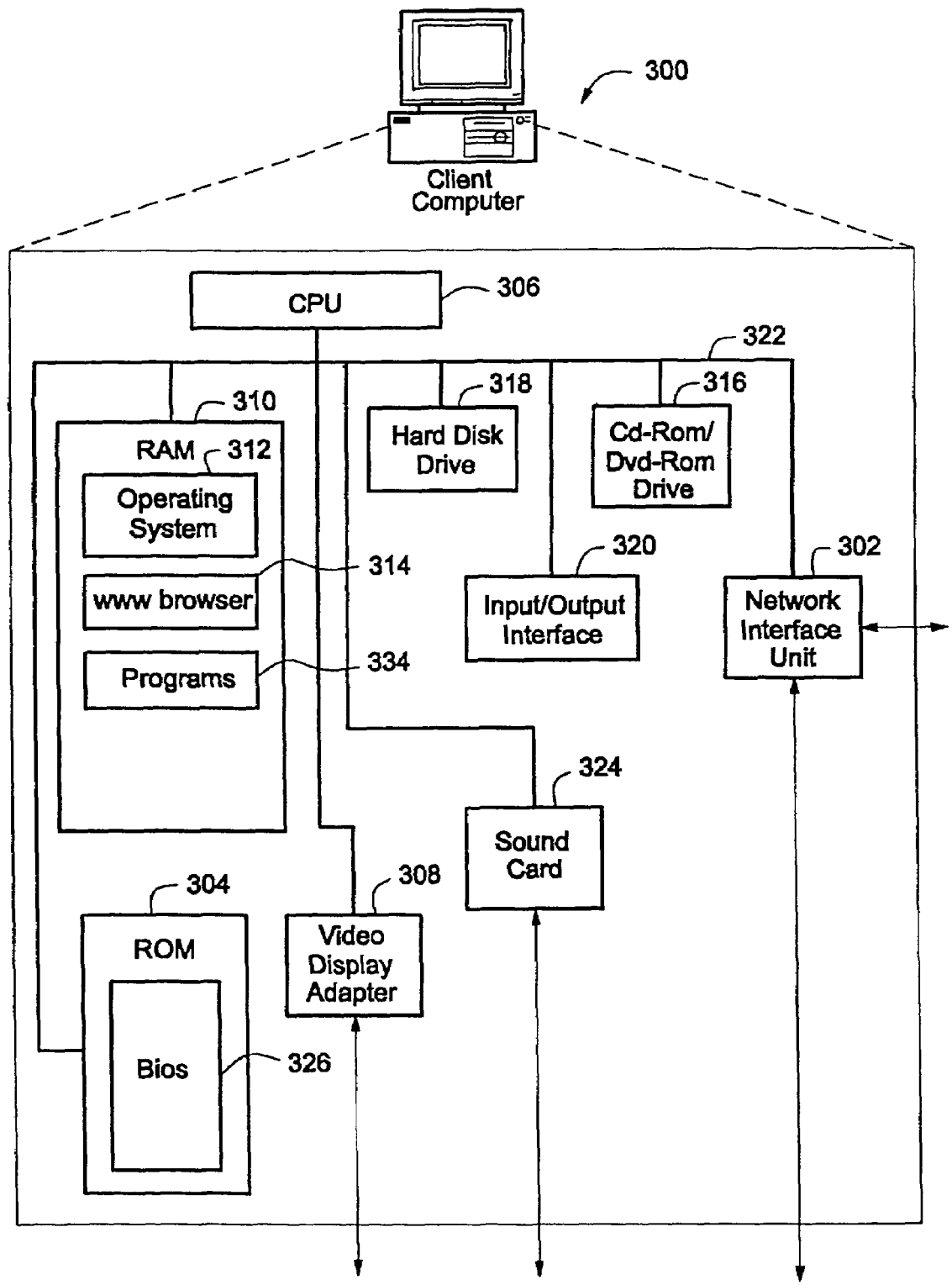

FIGS. 1-3 illustrate an exemplary environment for practicing the invention. Aspects of the present invention are embodied in a World Wide Web (WWW) site accessible via the Internet according to one embodiment of the invention. Generally, the term "Internet" refers to the worldwide collection of networks and gateways that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and messages. A representative section of the Internet 100 is shown in FIG. 1.

FIG. 1 shows a plurality of local area networks ("LANs") $120_{a-d}$ and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, computers, such as remote computer 140, and other related electronic devices can be remotely connected to either LANs 120 or WAN 130 via a modem and temporary telephone link. A remote computer may act in a number of ways, including as a WWW server as described in FIG. 2 or a client computer as described in FIG. 3. It will be appreciated that the Internet 100 comprises a vast number of such interconnected networks, computers, and routers and that only a small, representative section of the Internet 100 is shown in FIG. 1.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media. The Internet 100 may include networks constructed from, coupled to, or connected with any type or combination of communication media.

The Internet has recently seen explosive growth by virtue of its ability to link computers located throughout the world. As the Internet has grown, so has the WWW. Generally, the WWW is the total set of interlinked hypertext documents residing on HTTP servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP (Hypertext Transfer Protocol). Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via e-mail by using links on the Web page.

A WWW server is a computer connected to the Internet having storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 2 shows an exemplary WWW server 200 that is operative to provide a WWW site. Accordingly, WWW server 200 transmits WWw pages to the WWW browser application program executing on client computer 300 (FIG. 3) to carry out this process. For instance, WWW server 200 may transmit pages and forms for receiving information about a user, such as address, telephone number, billing information, credit card number, etc. Moreover, WWW server 200 may transmit WWW pages to client computer 300 that allow a consumer to participate in a WWW site. The transactions may take place over the Internet 100 or some other communications network known to those skilled in the art.

The WWW server 200 may include many more components than those shown in FIG. 2. However, the components shown are sufficient to disclose an illustrative embodiment for practicing the present invention. As shown in FIG. 2, WWW server 200 is connected to Internet 100, or other communications network, via network interface unit 210. Those of ordinary skill in the art will appreciate that network interface unit 210 includes the necessary circuitry for connecting WWW server 200 to Internet 100, and is constructed for use with various communication protocols including the TCP/IP protocol. Typically, network interface unit 210 is a card contained within WWW server 200.

WWW server 200 also includes processing unit 212, video display adapter 214, and a mass memory, all connected via bus 222. The mass memory generally includes RAM 216, ROM 232, and one or more permanent mass storage devices, such as hard disk drive 228, tape drive, optical drive 226, and/or floppy disk drive. The mass memory stores operating system 220 for controlling the operation of WWW server 200. It will be appreciated that this component may comprise a general purpose server operating system as is known to those of ordinary skill in the art, such as UNIX, LNUX™, or Microsoft WINDOWS NT®. Basic input/output system ("BIOS") 232 is also provided for controlling the low-level operation of WWW server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a WWW site. More specifically, the mass memory stores applications including WWw server application program 230. WWW server application program 230 includes computer executable instructions which, when executed by WWW server computer 200, generate WWW browser displays, including performing the logic described above. WWW server 200 also has functional modules 234, which perform logical operations as described below. WWW server application program 230 may also create and transmit displays described in conjunction with FIGS. 4-15. WWW server 200 may also include a JAVA virtual machine, an SMTP handler application for transmitting and receiving e-mail, an HTTP handler application for receiving and handing HTTP requests, JAVA applets for transmission to a WWW browser executing on a client computer, and an HTTPS handler application for handling secure connections. The HTTPS handler application may initiate communication with an external security application or a credit card processing application for communicating with remote financial institutions in a secure fashion.

WWW server 200 also comprises input/output interface 224 for communicating with external devices, such as a mouse, keyboard, scanner, or other input devices not shown in FIG. 2. Likewise, WWW server 200 may further comprise additional mass storage facilities such as CD-ROM/DVD-ROM drive 226 and hard disk drive 228. Hard disk drive 228 is utilized by WWW server 200 to store, among other things, application programs, databases, and program data used by WWW server application 230. For example, customer databases, product databases, image databases, and relational databases may be stored. The operation and implementation of these databases is well known to those skilled in the art.

FIG. 3 depicts several components of client computer 300. Client computer 300 may include many more components than those shown in FIG. 3. However, it is not necessary that those generally conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Those of ordinary skill in the art will appreciate that network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection as known to those skilled in the art.

Client computer 300 also includes BIOS 326, central processing unit 306, video display adapter 308, and memory. The memory generally includes random access memory ("RAM") 310, read-only memory ("ROM") 304 and a permanent mass storage device, such as a disk drive. The memory stores operating system 312 and programs 334 for controlling the operation of client computer 300. Programs 334 may include programs described in conjunction with circuit design and ordering. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy drive (not shown), optical drive 316 or some other optical drive, or hard drive 318. Input/output interface 320 may also be provided for receiving input from a mouse, keyboard, or other input device. The memory, network interface unit 302, video display adapter 308, and input/output interface 320 are all connected to central processing unit 306 via bus 322. Other peripherals may also be connected to central processing unit 306 in a similar manner.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for modifying a schematic over an Internet, comprising:
   establishing a connection between a client and a server;
   automatically determining components for a circuit that is based on circuit requirements obtained from a user interface on the client; wherein thermally enabled components are identified as thermally enabled when presented on the client;
   generating the schematic for the circuit based on a selection of at least one of the determined components;
   displaying the schematic on the client; wherein the schematic includes components that comprise wire components and electrical components that are movable within the schematic; wherein the wires are selectable within the schematic and wherein each endpoint of the wire is independently movable;
   choosing a component to modify;
   modifying the component within the schematic; and
   analyzing the modified schematic using an electrical simulation and a thermal simulation; wherein the thermal simulation and the electrical simulation are performed on a computer that is different from the client.

2. The method of claim 1, wherein modifying the component within the schematic comprises selecting a wire component; determining an endpoint of the wire component to move; and moving the end point of the wire component.

3. The method of claim 1, wherein choosing a component further comprises providing a palette of choices to a user from which to select at least one from a component and a block.

4. The method of claim 3, wherein the component is selected from a wire component, an electrical component, a simulation component and a block.

5. The method of claim 4, wherein modifying the component within the schematic further comprises adjusting one of a wire location, a component location, and a block symbol location.

6. The method of claim 4, wherein modifying the component within the schematic further comprises providing a grid to aid placement of the component within the schematic.

7. The method of claim 4, further comprising generating a netlist in response to the modification of the schematic.

8. The method of claim 4, further comprising generating a component connectivity list which is used to generate a simulation.

9. The method of claim 1, further comprising scaling the schematic to provide a different level of detail.

10. The method of claim 1, further comprising providing user controlled panning and scanning for the schematic on the client.

11. A computer-readable medium that includes computer executable instructions for modifying a schematic over an Internet, comprising:
    establishing a connection between a client and a server;
    automatically determining components for a circuit that is based on circuit requirements obtained from a user interface on the client; wherein thermally enabled components are identified as thermally enabled when presented on the client;
    generating the schematic for the circuit based on a selection of at least one of the determined components;
    displaying the schematic within a web page on the client; wherein the schematic includes components that comprise wire components and electrical components that are movable within the schematic; wherein the wires are selectable within the schematic and wherein each endpoint of the wire is independently movable;
    choosing a component to modify within the web page;
    modifying the component in the schematic within the web page; wherein modifying the component comprises: moving an endpoint of a wire component and removing the component from the schematic within the web page; and
    analyzing the modified schematic using an electrical simulation and a thermal simulation wherein the thermal simulation and the electrical simulation are performed on a computer that is different from the client.

12. The computer-readable medium of claim 11, further comprising generating a block symbol to represent at least a portion of the schematic.

13. The computer-readable medium of claim 12, wherein the component is chosen from a wire component, an electrical component, and a simulation component.

14. The computer-readable medium of claim 13, wherein modifying the component in the schematic further comprises adjusting one of a wire location, a component location, and a block symbol location.

15. The computer-readable medium of claim 11, further comprising generating a netlist on the client in response to the modification of the schematic.

16. A system for modifying a schematic over a network, comprising:
    a client having a client network connection device, the client network connection device operative to connect the client and a user to the network;
    a server having a server network connection device, the server network connection device operative to connect the server to the network; and
    a schematic modification device, operative to perform actions, including:
      automatically determining components for a circuit that is based on circuit requirements obtained from a user interface on the client; wherein thermally enabled components are identified as thermally enabled when presented on the client;
      generating the schematic for the circuit based on a selection of at least one of the determined components;
      displaying the schematic within a web page on the client; wherein the schematic includes components that comprise wire components and electrical components that are movable within the schematic; wherein the wires are selectable within the schematic and wherein each endpoint of the wire is independently movable;
      choosing a component to modify within the web page; and
      modifying the component in the schematic within the web page; and
    analyzing the modified schematic using an electrical simulation and a thermal simulation wherein the thermal simulation and the electrical simulation are performed on a computer that is different from the client.

17. The system of claim 16, wherein the schematic modification device further comprises actions to generate a block symbol to represent at least a portion of the schematic.

18. The system of claim 16, wherein the schematic modification device further comprises actions to choose a component from a wire component, an electrical component, and a simulation component.

19. The system of claim 18, wherein modifying the component in the schematic further comprises adjusting at least one of one of a wire location, a component location, and a block symbol location.

20. The system of claim 16, further comprising generating a netlist in response to the modification of the schematic.

21. The system of claim 16, further comprising generating a component connectivity list which is used to generate a simulation.

22. An apparatus for modifying a schematic over an Internet, comprising:

means for establishing a connection between a client and a server;

means for automatically determining components for a circuit that is based on circuit requirements obtained from a user interface on the client; wherein thermally enabled components are identified as thermally enabled when presented on the client;

means for generating the schematic for the circuit based on a selection of at least one of the determined components;

means for displaying the schematic within a web page on the client; wherein the schematic includes components that comprise wire components and electrical components that are movable within the schematic; wherein the wires are selectable within the schematic and wherein each endpoint of the wire is independently movable;

means for choosing a component to modify within the web page; and means for modifying the component in the schematic within the web page; and means for analyzing the modified schematic using an electrical simulation tool and a thermal simulation tool wherein a thermal simulation and the an electrical simulation are performed on a computer that is different from the client.

* * * * *

UNITED STATES PATENT AND TRADEMARK OFFICE
CERTIFICATE OF CORRECTION

PATENT NO.         : 7,441,219 B1                                    Page 1 of 1
APPLICATION NO.    : 10/603493
DATED              : October 21, 2008
INVENTOR(S)        : Jeffrey Robert Perry et al.

It is certified that error appears in the above-identified patent and that said Letters Patent is hereby corrected as shown below:

Column 2, Line 3: "FIGS. 11A and 11B illustrates" should read --FIGS. 11A and 11B illustrate--

Column 17, Line 27: "The resealing may" should read --The rescaling may--

Column 23, Line 12: "transmits WWw pages" should read --transmits WWW pages--

Column 23, Line 63: "including WWw server" should read --including WWW server--

Column 28, Line 15: "simulation and the an" should read --simulation and an--

Signed and Sealed this

Twenty-fourth Day of March, 2009

JOHN DOLL
*Acting Director of the United States Patent and Trademark Office*